(12) United States Patent
March

(10) Patent No.: US 12,359,066 B2
(45) Date of Patent: Jul. 15, 2025

(54) COLORED TITANIUM DIOXIDE ASPHALT COMPOSITIONS

(71) Applicant: GuardTop, LLC, Dana Point, CA (US)

(72) Inventor: Michael Hamilton March, Tempe, AZ (US)

(73) Assignee: CoolSeal LLC, Laguna Niguel, CA (US)

( * ) Notice: Subject to any disclaimer, the term of this patent is extended or adjusted under 35 U.S.C. 154(b) by 0 days.

(21) Appl. No.: 17/707,594

(22) Filed: Mar. 29, 2022

(65) Prior Publication Data

US 2022/0340758 A1    Oct. 27, 2022

Related U.S. Application Data

(60) Provisional application No. 63/178,870, filed on Apr. 23, 2021.

(51) Int. Cl.
C08L 95/00 (2006.01)
C08K 3/22 (2006.01)
C08K 3/34 (2006.01)
C08K 7/02 (2006.01)

(52) U.S. Cl.
CPC ............ C08L 95/00 (2013.01); C08K 3/22 (2013.01); C08K 3/346 (2013.01); C08K 7/02 (2013.01); C08K 2003/2241 (2013.01)

(58) Field of Classification Search
CPC ............................ C01G 23/047; C01F 7/02
See application file for complete search history.

(56) References Cited

U.S. PATENT DOCUMENTS

| | | |
|---|---|---|
| 3,567,476 A | 3/1971 | Masciantonio et al. |
| 6,077,492 A * | 6/2000 | Anpo ............ B01J 35/002 427/523 |
| 6,214,450 B1 * | 4/2001 | Wickert ............ C09D 7/70 428/323 |
| 6,245,850 B1 * | 6/2001 | Fields ............ C08L 95/005 106/632 |
| 6,309,456 B1 | 10/2001 | Anthony |

| | | | |
|---|---|---|---|
| 2002/0169076 A1* | 11/2002 | Takeshi ............ B01J 37/0238 502/208 |
| 2006/0243167 A1* | 11/2006 | Poole ............ C04B 40/0039 106/638 |
| 2019/0194461 A1* | 6/2019 | Koleas ............ C08L 91/00 |

FOREIGN PATENT DOCUMENTS

| | | | |
|---|---|---|---|
| CN | 1803956 | * | 7/2006 |
| CN | 104312362 A | | 1/2015 |
| CN | 110735371 | * | 1/2020 |
| JP | 2004-091761 | * | 3/2004 |
| JP | 2018-025045 | * | 2/2018 |

OTHER PUBLICATIONS

Translation of JP 2018-025045 (Year: 2018).*
Shen, Ind. Eng. Chem. Res. 2020, 59, 21811-21821 (Year: 2020).*
Translation of JP 2004-091761 (Year: 2004).*
Translation of CN 110735371 (Year: 2020).*
Translation of CN 1803956 (Year: 2006).*
Carey, Liz, "Austin City Council approves CoolSeal treatment pilot program," (Appendix B), Jun. 5, 2024, Transportation Today News, pp. 1-9.
Heiler and Koleas, "Reducing Urban Heat with Inorganic Black Asphalt Coatings," (Appendix A), Dec. 2022, Paint & Coatings Industry's eMagazines, pp. 1-9.
Award Announcement by Climate Resolve: "Coolest in L.A. 2023", (Appendix C), 2023, pp. 1-3.

* cited by examiner

*Primary Examiner* — Robert C Boyle
(74) *Attorney, Agent, or Firm* — MORGAN, LEWIS & BOCKIUS LLP

(57) ABSTRACT

A colored asphalt-based sealcoat composition comprising asphalt emulsion, water, extender, polymer, clay, colorant, and titanium oxide particles is provided. In some embodiments, a highly solar reflective, colored asphalt-based sealcoat composition comprising titanium oxide particles is provided. In some embodiments, a colored asphalt-based sealcoat composition comprising titanium oxide particles capable of reducing surface temperatures of asphalt treated with the composition is provided. In some embodiments, a colored asphalt-based sealcoat composition comprising titanium oxide particles capable of reducing atmospheric pollutants is provided. In some embodiments, methods for preparing colored asphalt-based sealcoat compositions as well as their application to asphalt surfaces is provided.

23 Claims, 3 Drawing Sheets
(3 of 3 Drawing Sheet(s) Filed in Color)

COLORED TITANIUM DIOXIDE ASPHALT COMPOSITIONS

CROSS REFERENCE TO RELATED APPLICATIONS

This application claims priority to U.S. Provisional Patent Application Ser. No. 63/178,870, filed Apr. 23, 2021, which is hereby incorporated by reference in its entirety.

TECHNICAL FIELD

The field of disclosure relates to colored asphalt-based sealcoat compositions comprising titanium oxide ($TiO_2$) particles.

BACKGROUND

The technology to which the invention is directed relates to a sealer used for asphalt substrates, such as a sealer for asphalt of the type employed extensively throughout the United States. Pavement technology has developed a series of asphalt coating compositions. Many of the asphalt compositions have been applied to asphalt, sometimes as a protective coating and sometimes as a re-cover system. Such asphalt mixtures have little or no reflectivity in that they are typically black in color, are not solar reflective, do not reduce surface temperatures, and do not reduce pollutants.

However, it has been found that conventional dark pavements rapidly increase in temperature when exposed to sunlight because they absorb 80-95% of the sunlight and significantly contribute to the creation of heat islands. Heat islands are built up areas that are hotter than nearby rural areas. For example, the annual mean air temperature of a city with one million people or more can be 1.8-5.4° F. (1-3° C.) warmer than its surroundings. In the evening, the difference can be as high as 22° F. (12° C.). Heat islands can affect communities by increasing summertime peak energy demand, air conditioning costs, air pollution and greenhouse gas emissions, heat-related illness and mortality, and water quality. According to Akbari et al., hot pavements aggravate urban heat islands by warming the local air and contribute to global warming by radiating heat into the atmosphere. As pavements comprise about one-third of urban surfaces, they are a significant source of heat in urban environments (see, Akbari H, Rose L S, Taha H. 1999. Characterizing the fabric of the urban environment: A case study of Sacramento, California. Lawrence Berkeley National Laboratory). Moreover, hot pavement can also raise the temperature of storm water runoff, which can cause additional negative impacts. Thus, there exists a real need for lowering asphalt surface temperatures.

In addition, vehicles traveling on asphalt surfaces have been known to produce significant levels of pollutants. While pollutants have long been known to have a negative environmental impact, photocatalytic air cleaning has also been shown to remove polutants including nitrogen oxides (NOx) and volatile organic compounds (VOCs) from polluted urban air, and, consequently, for reducing concentrations of toxic and irritating ozone, a key constituent of smog that forms on hot, sunny days.

Thus, there is a need for technology that reduces asphalt surface temperatures and reduces pollutants via photocatalytic reactions.

SUMMARY

Given the above background, there is a need for asphalt coating compositions that are highly solar reflective, reduce surface temperatures, and reduce pollutants via photocatalytic reactions. For example, there is a need in the art for improved asphalt coating compositions and methods for applying the same to mitigate the effects of increased surface temperature and pollution due to vehicle traffic in urban environments, such as aggravated heat islands, contributions to global warming, and increased temperatures of storm water runoff.

The present disclosure addresses the shortcomings identified in the art by providing novel, high-performance, colored asphalt-based sealcoat compositions comprising titanium oxide ($TiO_2$) particles that are highly solar reflective, reduce surface temperatures, and reduce pollutants via photocatalytic reactions.

Accordingly, in one aspect, the present disclosure provides an asphalt-based sealcoat composition comprising an asphalt emulsion, water, an extender, a polymer, clay, a colorant, and a plurality of titanium oxide ($TiO_2$) particles present in an amount of about 10% to about 60% by weight.

In some embodiments, the colorant is present in an amount of from about 0.001% to about 1% by weight. In some embodiments, the colorant is selected from the group consisting of pigment, paint, ink, dye, and powder. In some embodiments, the colorant is organic or inorganic. In some embodiments, the composition has a color selected from the group consisting of red, orange, yellow, green, blue, violet, brown, black, white, and grey.

In some embodiments, the asphalt-based sealcoat composition further comprises sand. In some embodiments, the asphalt-based sealcoat composition further comprises fiber. In some embodiments, the asphalt-based sealcoat composition further comprises an aggregate. In some embodiments, the asphalt-based sealcoat composition further comprises biocide. In some embodiments, the asphalt-based sealcoat composition further comprises a dispersant. In some embodiments, the asphalt-based sealcoat composition further comprises a plasticizer. In some embodiments, the asphalt-based sealcoat composition further comprises a dirt-resistance additive.

In some embodiments, the asphalt-based sealcoat composition is highly solar reflective.

In some embodiments, the asphalt-based sealcoat has a Solar Reflectivity number (SR #) of at least about 0.20. In some embodiments, the asphalt-based sealcoat has a SR # of at least about 0.33. In some embodiments, the asphalt-based sealcoat of the present disclosure has a Solar Reflective Index number (SRI #) of at least about 20. In some embodiments, the asphalt-based sealcoat of the present disclosure has an SRI # of at least about 33.

In some embodiments, the asphalt-based sealcoat composition is capable of reducing surface temperatures of asphalt treated with the asphalt-based sealcoat composition relative to asphalt not treated with asphalt-based sealcoat composition.

In some embodiments, the asphalt-based sealcoat composition reduces atmospheric pollutants. In some embodiments, the asphalt-based sealcoat composition reduces atmospheric pollutants including an amount of nitrogen oxides (NOx) and volatile organic compounds (VOC) via photocatalytic reactions.

In some embodiments, the asphalt-based sealcoat composition is highly solar reflective, reduces asphalt surface temperatures, and reduces pollutants.

Another aspect of the present disclosure provides a method of treating an asphalt surface by applying an amount of the asphalt-based sealcoat composition disclosed herein to the upper surface of the asphalt surface (e.g., roads, playgrounds, parks, parking lots, driveways, residential areas, schools, bike paths, shade structures, roofing, and LEED-certified building projects).

INCORPORATION BY REFERENCE

All references cited herein are incorporated herein by reference in their entirety and for all purposes to the same extent as if each individual publication or patent or patent application was specifically and individually indicated to be incorporated by reference in its entirety for all purposes. In the event of a conflict between a term herein and a term in an incorporated reference, the term herein controls.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The implementations disclosed herein are illustrated by way of example, and not by way of limitation, in the figures of the accompanying drawings. Like reference numerals refer to corresponding parts throughout the several views of the drawings.

DETAILED DESCRIPTION

I. Definitions

Figure 1:
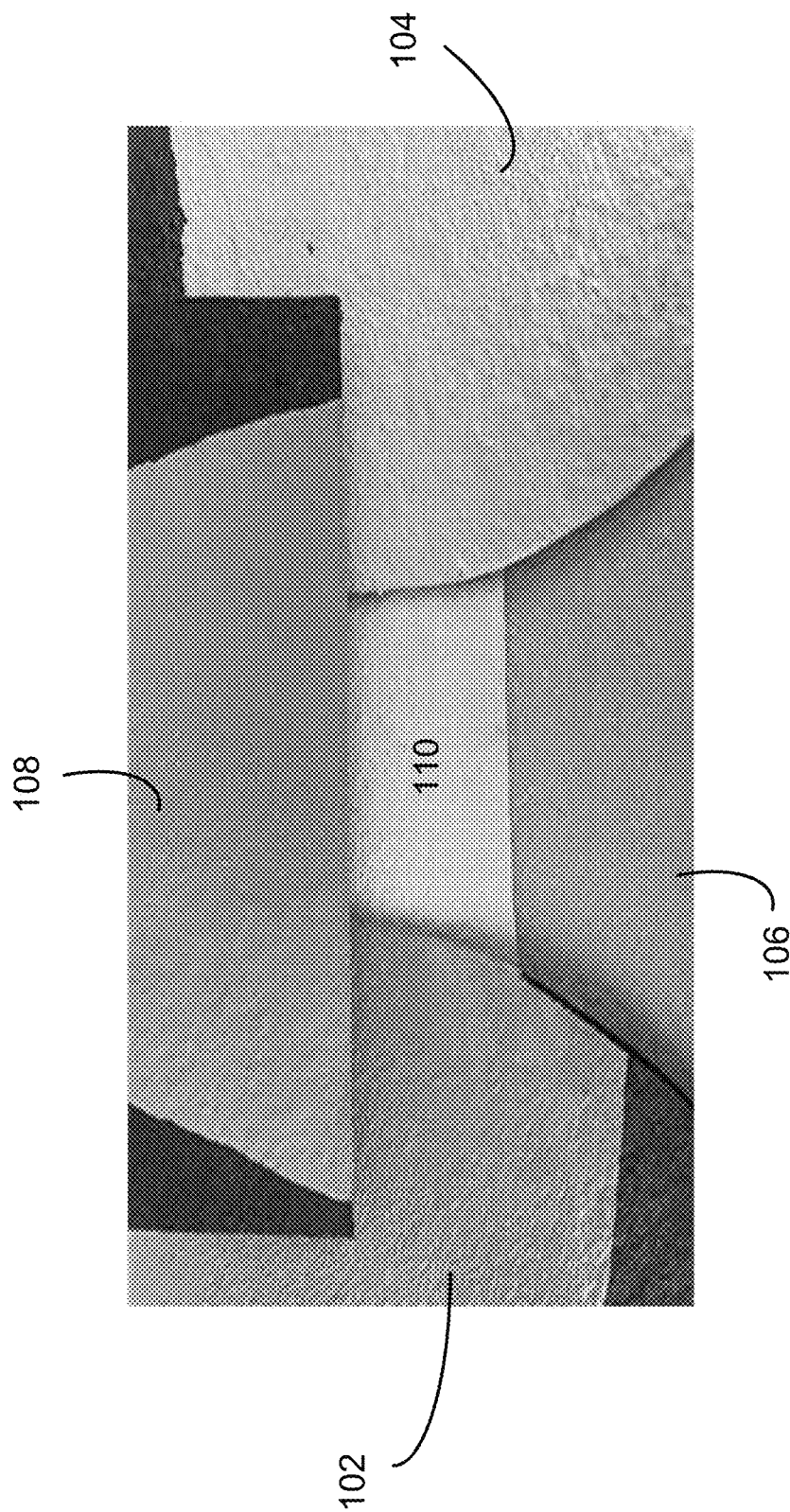
FIG. 1 illustrates example unpigmented (110) and pigmented titanium dioxide asphalt-based sealcoat compositions using blue organic pigment (102), blue inorganic pigment (106), green organic pigment (104), and black inorganic pigment (showing as grey) (108), in accordance with some embodiments of the present disclosure.

As used herein, the terms "about" or "approximately" refer to an acceptable error range for a particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. The term "about" or "approximately" can mean within an order of magnitude, within 5-fold, or within 2-fold, of a value. Where particular values are described in the application and claims, unless otherwise stated the term "about" meaning within an acceptable error range for the particular value should be assumed. The term "about" can have the meaning as commonly understood by one of ordinary skill in the art. The term "about" can refer to ±10%. The term "about" can refer to ±5%.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. For example, as used herein, the term "between" used in a range is intended to include the recited endpoints. For example, a number "between X and Y" can be X, Y, or any value from X to Y.

As used herein, the singular forms "a," "an," and "the" include the plural forms as well, unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or for use of a "negative" limitation. Furthermore, to the extent that the terms "including," "includes," "having," "has," "with," or variants thereof are used in either the detailed description and/or the claims, such terms are intended to be inclusive in a manner similar to the term "comprising."

As used herein, the term "asphalt" or "oil" refers to a bituminous material that is a constituent of petroleum. Asphalt is frequently used as a paving agent, typically in surface applications. Asphalt may be found naturally or manufactured (e.g., refined) from petroleum, and can take a viscous, liquid form (e.g., at high temperatures), semi-solid form (e.g., at room temperature), or solid form. As used herein, the term "asphalt emulsion" refers to liquid asphalt that has been emulsified in water. In some embodiments, an asphalt emulsion further comprises an emulsifying agent (e.g., a surfactant). Typically, an asphalt emulsion consists of from about 40% to about 85% asphalt (e.g., from about 50% to about 75% asphalt). In some embodiments, an asphalt emulsion comprises additional components, including latex, polymers, acids, and/or other additives to further modify the physical or structural characteristics of the emulsion. See, for example, Asphalt Paving Association of Iowa, "Asphalt Paving Design Guide," available on the Internet at apai.net/Files/content/DesignGuide/AsphaltCompositeSmFst.pdf.

As used herein, the term "aggregate" refers to any hard, inert, mineral material used for mixing in graduated fragments. In some embodiments, aggregate can comprise gravel, crushed stone, slag, glass, rubber, and/or other suitable materials not otherwise classified herein or of a finer or coarser grade than those classified herein. In some instances, aggregates function to provide strength and load support in asphalt-based compositions after application and compacting. Aggregate particles can be course, fine, graded, dense, and/or open, depending on the method of production or selection of aggregate materials.

As used herein, the term "extender" or "filler" refers to a component of asphalt-based compositions used to modulate the consistency of the respective composition. For example, in some embodiments, an extender is used to stiffen or toughen asphalt binder in an asphalt-based composition. In some instances, an extender is used to improve the adhesion of the asphalt emulsion to the aggregate, to promote dispersion of the asphalt emulsion in the asphalt-based composition, increase the stiffness of the composition, accelerate the curing of compacted mixture (e.g., after application), and/or reduce stripping or moisture damage in the applied asphalt-based composition. In some embodiments, the extender comprises material that is of a similar or identical substance as that contained in the aggregate. In some embodiments, the extender refers to a portion of aggregate that is suspended in an asphalt binder without a particle-particle contact.

The terms "Solar Reflectivity" "reflectance" and "R" refer to the ability of a material to reflect solar energy from its surface back into the atmosphere. The SR value is a number from 0 to 1.0. A value of 0 indicates that the material absorbs all solar energy and a value of 1.0 indicates total reflectance.

The terms "Solar Reflectance Index" and "SRI" refer to the index used for compliance with LEED requirements and is calculated according to ASTM E 1980 using values for reflectance and emissivity. Emissivity is a material's ability to release absorbed energy.

The abbreviations used herein generally have their conventional meaning and are readily appreciated by those skilled in the art. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. For instance, any of the compositions provided herein may be substituted, modified, added, subtracted, and/or combined with any suitable component of asphalt-based sealcoat compositions, as will be apparent to one skilled in the art. Any recited method can be carried out in the order of events recited or in any other order which is logically possible.

II. Introduction

As described above, there is a need for asphalt-based sealcoat compositions that are highly solar reflective, reduce surface temperatures, and reduce pollutants.

The present disclosure provides novel compositions, as well as formulations containing such compositions or combinations of these compositions and methods for applying such compositions, that can be used for, among other things, treating an asphalt surface. For example, one aspect of the present disclosure provides colored, asphalt-based sealcoat compositions comprising titanium oxide ($TiO_2$) particles that are highly solar reflective, reduce surface temperatures, and reduce pollutants via photocatalytic reactions.

In addition to the shortcomings in the art identified above, applications of asphalt and asphalt coatings are often accompanied by the need for color. For example, colored paving is useful in a variety of contexts, including recreational uses (e.g., tennis courts, basketball courts, running tracks, walking trails, biking paths, etc.), roadways (e.g., delineation of bike lanes, shoulders, lane lines, intersections, and/or other road surface markings), signage (e.g., handicapped parking, loading zones, pedestrian crossings, fire lanes, etc.), and/or aesthetic applications (e.g., driveways, courtyards, playgrounds, etc.). The use of color is not limited to any specific purpose in any given context but can be used for any function in any context known in the art in which paving is used, including but not limited to roads, playgrounds, parks, parking lots, driveways, recreational facilities, outdoor facilities, residential areas, schools, bike paths, shade structures, roofing, and LEED-certified building projects.

Conventional methods for producing colored paving include the use of paint, durable liquid pavement markings such as epoxy and methyl methacrylate, thermoplastic, or embedded colored asphalt. However, these methods are hampered by disadvantages that limit their practicality or ease of application. For instance, paint, although inexpensive and easy to apply, is non-durable and wears easily from moderate road use and weather conditions, resulting in a need for frequent reapplication. Durable liquid pavement markings, including epoxy and methyl methacrylate, can be sensitive to moisture and temperature, requires special installation equipment, and can require long dry times, which may result in the need for additional logistical measures to ensure that application does not interfere with regular traffic. Thermoplastic, although highly durable, can be cost-prohibitive for corridor treatments such as lane lengths or for large-scale applications.

Similarly, traditional methods for applying colored asphalt are limited in that the complexity of paving applications is not well suited for spot treatment and small-scale applications (such as signage), which further prohibits upkeep and/or replacement of any color loss resulting from road maintenance. Moreover, traditional methods for manufacturing asphalt are limited to the production of black or dark "earth tone" colors, typically produced by mixing pigment into standard hot mix asphalt ("blacktop") or by using naturally colored aggregates such as iron, slag, recycled glass, brick, colored rocks, and others. See, for example, "Colored Pavement Material Guidance," National Association of City Transportation Officials, adapted from the Urban Bikeway Design Guide $2^{nd}$ Ed., Island Press, available on the Internet at nacto.org/publication/urban-bikeway-design-guide/bikeway-signing-marking/colored-pavement-material-guidance; and Kawther, "Colored asphalt and street print are decorating paving in public spaces," MATEC Web of Conferences 162, 05027 (2018), doi: 10.1051/matecconf/201816205027, each of which is hereby incorporated herein by reference in its entirety.

Additionally, conventional methods for the production and application of colored paving do not address the issues of poor solar reflectance, creation of urban heat islands, increased contributions to global warming, inability to reduce atmospheric pollutants caused by traffic, and other negative consequences identified above as characteristic of traditional asphalt and asphalt coating compositions.

Accordingly, the present disclosure provides an asphalt-based sealcoat composition comprising asphalt emulsion, water, extender, polymer (e.g., polymer emulsion), clay, colorant, and a plurality of titanium oxide particles. Advantageously, the colorant imparts a color to the composition, thus forming a colored asphalt-based sealcoat composition, and the presence of titanium oxide in the composition allows for the composition to be formulated to any desired color. For instance, in some embodiments, the titanium oxide is present in the asphalt-based sealcoat composition in an amount (e.g., about 10% to about 60% by weight) that renders the composition, in the absence of added colorant, light in color. Specifically, in some embodiments, the asphalt-based sealcoat composition comprising titanium oxide particles in an amount of from about 10% to about 60% by weight, in the absence of added colorant, is white or near-white in color. Thus, colorant of any desired hue can be added to a base (e.g., noncolored and/or white) formulation of the composition comprising titanium oxide particles in order to change the color of the composition to the desired hue. In other words, in contrast to conventional asphalt coating compositions, the color of the presently disclosed asphalt-based sealcoat composition is not limited to black or dark tones but can be adjusted to any shade of any color and used for any purpose such as those described above (e.g., bike lanes, handicapped parking, playgrounds, etc.). See, for instance, the example compositions illustrated in FIG. 1 and the Examples below.

For example, in some embodiments, the asphalt-based sealcoat composition comprises titanium oxide in an amount of from about 10% to about 60% by weight and a colorant such that the composition is a bright blue color suitable for marking handicapped parking spaces.

Advantageously, the presently disclosed asphalt-based sealcoat compositions can be used with any of a variety of colorants, including organic, inorganic, opaque, transparent, and/or near-infrared (NIR) reflective pigments to achieve a wide range of color possibilities. Furthermore, the present disclosure provides methods for preparation of asphalt-based sealcoat compositions in which the colorant is added to a bulk batch of the composition during large-scale manufacturing or to a suitably sized aliquot of the composition prior to application. In this manner, the present disclosure advantageously provides flexible and useful asphalt-based sealcoat compositions that can be tailored for bulk applications, corridor treatments, spot treatments and maintenance, single color applications, and/or multiple color applications, depending on the desired utility.

Notably, in some embodiments, the colored asphalt-based sealcoat compositions disclosed herein further exhibit solar reflective and photocatalytic activity. For example, in some embodiments, the colored asphalt-based sealcoat composition is highly solar reflective with a Solar Reflective Index number of at least about 33. In addition, in some embodiments, the colored asphalt-based sealcoat composition has a Solar Reflectivity number of at least about 0.33. In some embodiments, the colored asphalt-based sealcoat composition has an emissivity of at least about 0.92.

Advantageously, in some embodiments, the colored asphalt-based sealcoat composition is capable of reducing surface temperatures of asphalt treated with the asphalt-based sealcoat composition relative to asphalt not treated with asphalt-based sealcoat composition. Furthermore, in some embodiments, the asphalt-based sealcoat composition reduces atmospheric pollutants via photocatalytic reactions, including such pollutants as nitrogen oxides (NOx) and volatile organic compounds (VOC).

In addition to the benefits identified above, in some embodiments, the present disclosure provides a colored asphalt-based sealcoat composition that improves upon various preparation, application, durability, storage and safety properties over conventional asphalt and asphalt coatings. For instance, in some implementations, sand and/or aggregate is mixed into the composition prior to application. Advantageously, such compositions overcome the limitations of conventional methods for preparing asphalt emulsions. In particular, many types of aggregate, including sand, are difficult to stabilize prior to application of the product to a surface. Conventional approaches for the repair or resurfacing of an existing pavement include either dropping aggregate on top of a binder and pressing the aggregate into the binder (e.g., where the aggregate is not mixed prior to application) or mixing the aggregate with the binder onboard at point of application. Adding aggregate earlier in the process traditionally results in separation and/or undesirable reactions with the emulsion, which can clog equipment and cause uneven application. Moreover, conventional emulsions are typically destabilized upon contact with an aggregate. For instance, traditional asphalt-based compositions suffer from an inability to maintain sand in suspension, especially when the amount of sand is high, e.g., about 5% or more. Thus, the present disclosure provides colored asphalt-based sealcoat compositions comprising aggregate and/or sand that exhibit improved stability and consistency compared to traditional emulsions. Aggregate can also be selected based on the capacity of the material to increase or decrease the hardness of the sealcoat compositions after application.

Furthermore, in some implementations, the present disclosure provides asphalt-based sealcoat compositions that include fiber. In some implementations, the addition of fiber improves the application of the composition to a surface and provides flexibility and longevity to the sealcoat once applied (e.g., by reducing brittleness and cracking). Typically, fiber interactions are dictated by the aspect ratio between length and diameter (among other factors like bend angle, fracture, etc.). Conventional asphalt-related products include long, strong fibers for elongation strength and resistance to cracking or raveling, thus providing mechanical strength in the final products. For instance, fibers in a slurry are typically much longer than the fibers used in a sealcoat so that they can interact with (e.g., "trap") the aggregate. As such, fibers used for a slurry are generally not suitable for a sealcoat.

In contrast, the compositions and methods of the present disclosure improve upon conventional compositions and methods by providing, in some implementations, colored asphalt-based sealcoat compositions comprising fiber. In addition to generating a thickening effect, which can increase the stability of the composition during storage and transportation, the inclusion of fiber in the presently disclosed sealcoat compositions increases the ease and efficacy with which the sealcoat can be applied to a surface. In particular, fibers in solution impart non-Newtonian properties to the product, allowing the composition to flow like a liquid under stress while returning to a solid-like state once force is released. Thus, fiber imparts "dry" properties (e.g., resistance to stretching, formation of a mat-like structure in the sealcoat to improve durability, etc.) as well as "wet" properties to the colored asphalt-based sealcoat composition.

The benefits of the presently disclosed compositions and methods are further highlighted in comparison to the deficiencies in the art. For example, in some implementations, the presently disclosed colored asphalt-based sealcoat compositions are thick enough such that they are much more stable than conventional slurries or other conventional asphalt-based coating products. As described above, conventional asphalt-based products are either not mixed prior to application or mixed onboard with a short workability window (e.g., about 10-30 minutes for a slurry). In contrast, the claimed colored asphalt-based sealcoat compositions are stable for a substantially longer period of time (e.g., at least 1 day, at least 1 week, at least 1 month, at least 3 months, at least 6 months, at least 1 year, and/or at least 2 years). The presently disclosed compositions and methods remove the need for additional mixing equipment or processes and allow the asphalt-based sealcoat compositions to be applied at the convenience of the user with minimal time constraints.

Additionally, while thick enough to allow for long storage times, the presently disclosed colored asphalt-based sealcoat compositions are thin enough to be applied without clogging. As such, the presently disclosed colored asphalt-based sealcoat compositions are stable during storage (e.g., in a vessel such as a can), during application (e.g., via pumping, squeegeeing, or spraying), and after application (e.g., while drying on a surface). In particular, the colored asphalt-based sealcoat compositions are capable of behaving like a solid under low shear or minimal external forces (e.g., such that it will not run off the road into the sewers) and like a liquid under some mechanical force, allowing it to also flow, e.g., to be sprayed or pumped, during application. In some embodiments, the improved stability and applicability is due in part to the inclusion of fiber in the colored asphalt-based sealcoat compositions.

The presently disclosed colored asphalt-based sealcoat compositions also impart improved anti-skid properties to surfaces after application. For instance, the colored asphalt-based sealcoat compositions can achieve a skid number (SN40R) of at least 30, at least 35, or at least 40. In some implementations, the colored asphalt-based sealcoat compositions achieve a dynamic friction test (DFT) value of at least 0.35, at least 0.40, or at least 0.45. In some embodiments, the improved resistance to skid is due in part to the inclusion of sand in the colored asphalt-based sealcoat compositions.

The present technology relates primarily to the treatment of any asphalt surface, including roads, playgrounds, parks, parking lots, driveways, recreational facilities, outdoor facilities, residential areas, schools, bike paths, shade structures, roofing, and LEED-certified building projects.

III. Asphalt-Based Sealcoat Composition

In one aspect, the present disclosure provides a composition. In an exemplary embodiment, the invention is a composition described herein. In an exemplary embodiment, the invention is a composition according to a formulation described herein.

In one aspect, the present disclosure provides an asphalt-based sealcoat composition comprising an asphalt emulsion, water, an extender, a polymer, clay, a colorant, and a plurality of titanium oxide ($TiO_2$) particles present in an amount of about 10% to about 60% by weight.

In an example embodiment, the present disclosure provides an asphalt-based sealcoat composition comprising an asphalt emulsion in an amount of about 21.7% by weight, water in the amount of about 20.7% by weight, clay in an amount of about 4.1% by weight, fiber in an amount of about 0.6% by weight, polymer (e.g., polymer emulsion) in an amount of about 15% by weight, an extender in an amount of about 3.1% by weight, an aggregate (e.g., limestone aggregate) in an amount of about 7.3% by weight, and $TiO_2$ in an amount of between about 25% and 30% by weight, where the clay comprises sepiolite clay, the polymer (e.g., polymer emulsion) comprises acrylic copolymer and/or vinyl acrylic, the extender comprises granulated calcium carbonate, and the aggregate comprises limestone aggregate.

Titanium Oxide

In some embodiments, the asphalt-based sealcoat composition comprises a plurality of titanium oxide particles.

In some embodiments, the titanium oxide ($TiO_2$) particles are present in the composition in an amount of from about 21% to about 60% by weight. In some embodiments, the $TiO_2$ particles are present in an amount of from about 25% to about 50% by weight. In some embodiments, the $TiO_2$ particles are present in an amount of from about 25% to about 40% by weight. In some embodiments, the $TiO_2$ particles are present in an amount of from about 25% to about 30% by weight. In some embodiments, the $TiO_2$ particles are present in an amount of about 26% to about 28% by weight.

In some embodiments, the $TiO_2$ particles are present in an amount of at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, or at least 30% by weight. In some embodiments, the $TiO_2$ particles are present in an amount of at least 35%, at least 40%, at least 45%, at least 50%, at least 55%, at least 60%, at least 65%, at least 70%, or at least 75% by weight.

In some embodiments, the $TiO_2$ particles are present in an amount of no more than 90%, no more than 75%, no more than 70%, no more than 65%, no more than 60%, no more than 55%, no more than 50%, no more than 45%, no more than 40%, no more than 35%, no more than 30%, no more than 29%, no more than 28%, no more than 27%, no more than 26%, no more than 25%, no more than 24%, no more than 23%, no more than 22%, no more than 21%, no more than 20%, no more than 19%, no more than 18%, no more than 17%, no more than 16%, no more than 15%, no more than 10%, or no more than 9% by weight.

In some embodiments, the $TiO_2$ particles are present in an amount of from about 5% to about 80%, from about 5% to about 60%, from about 10% to about 50%, from about 25% to about 40%, from about 10% to about 35%, from about 25% to about 30%, or from about 15% to about 30% by weight. In some embodiments, the $TiO_2$ particles are present in an amount of from about 5% to about 20%, from about 8% to about 15%, from about 3% to about 30%, from about 4% to about 40%, from about 9% to about 25%, or from about 10% to about 20% by weight. In some embodiments, the $TiO_2$ particles are present in an amount of from about 8% to about 40%, from about 10% to about 80%, from about 50% to about 90%, from about 20% to about 70%, from about 25% to about 35%, or from about 20% to about 50% by weight. In some embodiments, the $TiO_2$ particles are present in an amount falling within another range starting no lower than about 5% by weight and ending no higher than about 90% by weight.

In some embodiments, the $TiO_2$ particles comprise an anatase powder form of $TiO_2$. In some embodiments, the $TiO_2$ particles comprise a brookite powder form of $TiO_2$. In some embodiments, the $TiO_2$ particles comprise a rutile powder form of $TiO_2$. In some embodiments, the $TiO_2$ particles comprise anatase powder form of $TiO_2$, a brookite powder form of $TiO_2$, a rutile powder form of $TiO_2$, or any mixture of any combination thereof.

In some embodiments, the $TiO_2$ particles include additions and/or modifications. In some such embodiments, the $TiO_2$ particles are doped. For instance, in some embodiments, the $TiO_2$ particles are doped with metal and/or non-metal ions. Generally, $TiO_2$ particles have a wide band gap, resulting in a weak photocatalytic response. Advantageously, doping of $TiO_2$ particles can modify the electron band gap of the $TiO_2$ particles and influence their photocatalytic efficacy. In some such embodiments, doping reduces the electron band gap by introducing intermediate energy levels in the $TiO_2$ particles, allowing electron transition with lower excitation energies.

In some embodiments, the $TiO_2$ particles are doped at the surface (e.g., surface-doped $TiO_2$ particles). In some embodiments, the $TiO_2$ particles are doped in the bulk of the particles (e.g., bulk-doped $TiO_2$ particles). In some embodiments, the $TiO_2$ particles are doped with transition metal ions and/or trivalent metals. In some embodiments, the doped $TiO_2$ particles are modified with sulfur, vanadium, zinc, silver, aluminum, copper, iron, manganese, nickel, chromium, tin, barium, strontium, magnesium, cobalt, and/or nitrogen. See, for example, Dubey et al., "Synthesis and Characterization of Various Doped $TiO_2$ Nanocrystals for Dye-Sensitized Solar Cells," ACS Omega. 2021 Feb. 9; 6(5): 3470-3482, which is hereby incorporated herein by reference in its entirety.

In some embodiments, the $TiO_2$ particles are not doped. In some embodiments, the $TiO_2$ particles do not include additions and/or modifications.

In some embodiments, each respective $TiO_2$ particle in the plurality of $TiO_2$ particles comprises a modifier. In some embodiments, each respective $TiO_2$ particle in the plurality of $TiO_2$ particles does not comprise a modifier. In some embodiments, the modifier is a surface treatment, where each respective $TiO_2$ particle comprises a coating. In some embodiments, each respective $TiO_2$ particle is not treated (e.g., does not comprise a coating). Advantageously, in some implementations, the coating increases the compatibility of the $TiO_2$ particles with other materials. In some implementations, the coating reduces undesirable interactions of the $TiO_2$ particles with the environment. In some embodiments, the coating provides enhanced mechanical properties for the $TiO_2$ particles such as resistance to chalking, scrubbing, and/or loss of color. Chalking of the applied composition can occur due to degradation or disintegration of a binder and/or resin in a composition (e.g., due to weather and/or UV exposure). Scrub resistance generally refers to the ability of the applied composition to resist wearing or degradation. In some embodiments, the coating improves gloss and opacity of the composition, reduces agglomeration of the composition (e.g., during storage), and/or reduces water absorption on the surface of the $TiO_2$ particles.

In some embodiments, the coating is bonded to the surface of the $TiO_2$ particle and, as a result, is highly durable. In some embodiments, the modifier is an aluminum hydroxide coating. In some embodiments, the modifier is an inorganic coating selected from the group consisting of titanium, zirconium, silicon and aluminum compounds, or a pharmaceutically acceptable salt, solvate, hydrate, cocrystal, or prodrug thereof. Suitable embodiments for modifiers of $TiO_2$ particles are further described, e.g., in "Titanium Dioxide Products," Ishihara Sangyo Kaisha, Ltd., available on the Internet at iskweb.co.jp; Kerr-McGee Chemical LLC, "Tailoring $TiO_2$ Treatment Chemistry To Achieve Desired Performance Properties," PCI Magazine, 2000, available on the Internet at pcimag.com/articles/86202-tailoring-tio2-treatment-chemistry-to-achieve-desired-performance-properties; and Veronovski, "$TiO_2$ Applications as a Function of Controlled Surface Treatment, Titanium Dioxide—Material for a Sustainable Environment," IntechOpen, 2018, doi: 10.5772/intechopen.72945, each of which is hereby incorporated herein by reference in its entirety.

In some embodiments, each respective $TiO_2$ particle in the plurality of $TiO_2$ particles has a size of no more than 20 microns. In some embodiments, each respective $TiO_2$ particle in the plurality of $TiO_2$ particles has a size of no more than 10 microns. In some embodiments, each respective $TiO_2$ particle in the plurality of $TiO_2$ particles has a size of no more than 5 microns. In some embodiments, each respective $TiO_2$ particle in the plurality of $TiO_2$ particles has a size of no more than 1 micron. In some embodiments, each respective $TiO_2$ particle in the plurality of $TiO_2$ particles has a size of no more than 100 nanometers (nm). In some embodiments, each respective $TiO_2$ particle in the plurality of $TiO_2$ particles has a size of no more than 10 nanometers. In some embodiments, each respective $TiO_2$ particle in the plurality of $TiO_2$ particles has a size of no more than 25, no more than 20, no more than 18, no more than 15, no more than 12, no more than 10, no more than 8, no more than 5, no more than 4, no more than 3, or no more than 2 microns.

In some embodiments, each respective $TiO_2$ particle in the plurality of $TiO_2$ particles has a size of no more than 1000, no more than 100, no more than 10, or no more than 5 nanometers. In some embodiments, each respective $TiO_2$ particle in the plurality of $TiO_2$ particles has a size of at least 0.1, at least 0.5, at least 1, at least 5, at least 10, at least 50, at least 100, at least 500, or at least 1000 nanometers. In some embodiments, each respective $TiO_2$ particle in the plurality of $TiO_2$ particles has a size of at least 0.05, at least 0.08, at least 0.1, at least 0.3, at least 0.5, at least 0.8, at least 1, or at least 1.5 microns. In some embodiments, each respective $TiO_2$ particle in the plurality of $TiO_2$ particles has a size of from about 0.5 nanometers to about 10 nanometers, from about 1 nanometers to about 1000 nanometers, from about 0.1 nanometers to about 10 microns, from about 10 nanometers to about 500 nanometers, from about 100 nanometers to about 2 microns, from about 0.05 microns to about 5 microns, from about 0.1 microns to about 8 microns, from about 0.5 microns to about 10 microns, from about 0.5 microns to about 5 microns, from about 1 microns to about 3 microns, from about 1 microns to about 20 microns, or from about 5 microns to about 15 microns. In some embodiments, each respective $TiO_2$ particle in the plurality of $TiO_2$ particles has a size that falls within another range starting no lower than 0.1 nanometers and ending no higher than 25 microns.

For instance, in some embodiments, the plurality of $TiO_2$ particles comprises a subset of photocatalytic $TiO_2$ particles. In some embodiments, each respective photocatalytic $TiO_2$ particle in the subset of photocatalytic $TiO_2$ particles has a size of no more than 5000, no more than 1000, no more than 500, no more than 100, no more than 10, or no more than 5 nanometers. In some embodiments, each respective photocatalytic $TiO_2$ particle in the subset of photocatalytic $TiO_2$ particles has a size of at least 0.1, at least 0.5, at least 1, at least 5, at least 10, at least 50, at least 100, at least 500, or at least 1000 nanometers. In some embodiments, each respective photocatalytic $TiO_2$ particle in the subset of photocatalytic $TiO_2$ particles has a size of from about 0.5 nanometers to about 10 nanometers, from about 1 nanometers to about 1000 nanometers, from about 0.1 nanometers to about 2 microns, from about 10 nanometers to about 500 nanometers, or from about 100 nanometers to about 5 microns. In some embodiments, each respective photocatalytic $TiO_2$ particle in the subset of photocatalytic $TiO_2$ particles has a size that falls within another range starting no lower than 0.1 nanometers and ending no higher than 5000 nanometers.

In some embodiments, at least 50% of the $TiO_2$ particles in the plurality of $TiO_2$ particles have the same or nearly the same particle size (e.g., the size of the $TiO_2$ particles have a tight distribution). In some embodiments, at least 30%, at least 40%, at least 50%, at least 60%, at least 70%, at least 75%, at least 80%, at least 85%, at least 90%, at least 95%, at least 98%, or at least 99% of the $TiO_2$ particles in the plurality of $TiO_2$ particles have the same or nearly the same particle size.

In some embodiments, all of the $TiO_2$ particles have a particle size of no more than 10 microns (e.g., from about 1 to about 3 microns). Advantageously, in some embodiments, the particle size of no more than 10 microns provides improved stability of the presently disclosed compositions and allows for a more even application of the product to a surface. For example, in some implementations, the $TiO_2$ particles having a particle size of no more than 10 microns allows for a homogenous distribution of $TiO_2$ particles in the asphalt-based sealcoat composition and results in fewer microdomains having uneven distributions of various components (e.g., asphalt, pigment, polymer, etc.).

In some embodiments, the plurality of $TiO_2$ particles has a unimodal distribution of particle size. In some embodiments, the plurality of $TiO_2$ particles has a bimodal distribution of particle size. In other words, in some such embodiments, the plurality of $TiO_2$ particles comprises at least a first subset of $TiO_2$ particles and a second subset of $TiO_2$ particles, where at least a first respective proportion of the $TiO_2$ particles in the first subset of $TiO_2$ particles has a same or nearly the same first particle size, and where at least a second respective proportion of the $TiO_2$ particles in the second subset of $TiO_2$ particles has a same or nearly the same second particle size. In some embodiments, the first particle size is from about 2 microns to about 20 microns, and the second particle size is from about 1 nanometer to about 100 nanometers. In some embodiments, the first particle size is from about 0.1 microns to about 8 microns, from about 0.5 microns to about 10 microns, from about 0.5 microns to about 5 microns, from about 1 microns to about 3 microns, from about 1 microns to about 20 microns, or from about 5 microns to about 15 microns. In some embodiments, the second particle size is from about 0.5 nanometers to about 10 nanometers, from about 1 nanometers to about 1000 nanometers, from about 0.1 nanometers to about 2 microns, from about 10 nanometers to about 500 nanometers, or from about 100 nanometers to about 5 microns.

In some embodiments, the first respective proportion of the first subset of $TiO_2$ particles is at least 30%, at least 40%, at least 50%, at least 60%, at least 70%, at least 75%, at least 80%, at least 85%, at least 90%, at least 95%, at least 98%, or at least 99%. In some embodiments, the second respective proportion of the second subset of $TiO_2$ particles is at least 30%, at least 40%, at least 50%, at least 60%, at least 70%, at least 75%, at least 80%, at least 85%, at least 90%, at least 95%, at least 98%, or at least 99%.

In some embodiments, the first subset of $TiO_2$ particles comprises visual and infrared-reflective $TiO_2$ particles. In some embodiments, the first subset of $TiO_2$ particles consists of visual and infrared-reflective $TiO_2$ particles. In some embodiments, the second subset of $TiO_2$ particles comprises photocatalytic $TiO_2$ particles. In some embodiments, the second subset of $TiO_2$ particles consists of photocatalytic $TiO_2$ particles. According, in an example embodiment, the plurality of $TiO_2$ particles comprises a mixture of a first subset of visual and infrared-reflective $TiO_2$ particles having a first particle size of from about 2 microns to about 20 microns, and a second subset of photocatalytic $TiO_2$ particles having a second particle size of from about 1 nanometer to about 100 nanometers, where each of the first subset and the second subset have separate individual distributions, and where the mixture has a bimodal distribution including a first peak at about 10 microns (10,000 nm) and a second peak at about 50 nm (0.05 microns).

Asphalt

In some embodiments, the asphalt-based sealcoat composition comprises asphalt emulsion.

In some embodiments, the asphalt emulsion is present in an amount of from about 5% to about 40% by weight. In some embodiments, the asphalt emulsion is present in an amount of from about 10% to about 35% by weight. In some embodiments, the asphalt emulsion is present in an amount of from about 15% to about 30% by weight. In some embodiments, the asphalt emulsion is present in an amount of from about 15% to about 25% by weight. In some embodiments, the asphalt emulsion is present in an amount of from about 20% to about 24% by weight. In some embodiments, the asphalt emulsion is present in an amount of about 20.5% to about 22.5% by weight.

In some embodiments, the asphalt emulsion is present in an amount of at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 45%, at least 50%, at least 55%, at least 60%, at least 65%, or at least 70% by weight.

In some embodiments, the asphalt emulsion is present in an amount of no more than 80%, no more than 75%, no more than 70%, no more than 65%, no more than 60%, no more than 55%, no more than 50%, no more than 45%, no more than 40%, no more than 35%, no more than 30%, no more than 29%, no more than 28%, no more than 27%, no more than 26%, no more than 25%, no more than 24%, no more than 23%, no more than 22%, no more than 21%, no more than 20%, no more than 19%, no more than 18%, no more than 17%, no more than 16%, no more than 15%, or no more than 10% by weight.

In some embodiments, the asphalt emulsion is present in an amount of from about 5% to about 80%, from about 10% to about 60%, from about 15% to about 50%, from about 15% to about 40%, from about 18% to about 30%, from about 20% to about 25%, from about 8% to about 20%, from about 10% to about 30%, from about 5% to about 25%, from about 30% to about 50%, or from about 10% to about 70% by weight. In some embodiments, the asphalt emulsion is present in an amount falling within another range starting no lower than about 5% by weight and ending no higher than about 80% by weight.

In some embodiments, the asphalt emulsion is selected from the group consisting of CSS-1h, CSS-1, SS-1h, SS-1, clay-based emulsions, and/or any mixture thereof. In some embodiments, the asphalt emulsion is a variation or modification of any of the asphalt emulsions disclosed herein, as will be apparent to one skilled in the art (e.g., having a harder or softer residue penetration). In some embodiments, the asphalt emulsion is selected from another category of asphalt emulsion. In some embodiments, the asphalt emulsion is a rapid set (RS), medium set (MS), slow set (SS), or quick set (QS) emulsion. In some embodiments, the asphalt emulsion is a cationic emulsion or an anionic emulsion. In some embodiments, the asphalt emulsion is a non-ionic emulsion. In some implementations, the asphalt emulsion comprises a mixture of anionic, cationic, and/or non-ionic emulsions. Advantageously, in some such embodiments, the asphalt emulsion that is a mixture of anionic, cationic, and/or non-ionic emulsions has increased stability. In some embodiments, the asphalt emulsion is a high float (HF) emulsion.

Any asphalt emulsion suitable for the preparation of asphalt-based compositions is contemplated in the amounts disclosed herein for the compositions of the present disclosure, as will be apparent to one skilled in the art, including but not limited to RS-1, RS-2, MS-1, MS-2, MS-2h, HFMS-1, HFMS-2, HFMS-2h, HFMS-2s, SS1, SS1h, CRS-1, CRS-2, CRS-2p, CM2, CM2h, CMS-2, CMS-2h, CSS-1, CSS-1h, CSS-1hp, and/or CQS-1h, or any substitutions, modifications, additions, deletions, and/or combinations thereof.

In some embodiments, the asphalt emulsion is selected from the group consisting of penetration grade 0-30 emulsions, penetration grade 40-50 emulsions, penetration grade 60-70 emulsions, penetration grade 85-100 emulsions, penetration grade 120-150 emulsions, penetration grade 200-300 emulsions, and/or any mixture thereof. In some embodiments, the asphalt emulsion is a penetration grade 60 emulsion. In some embodiments, the asphalt emulsion is a blend of two or more penetration grade emulsions (e.g., 0 penetration grade and 30 penetration grade). In some embodiments, the asphalt emulsion is a blend of two or more penetration grade emulsions, and the final penetration grade is at least 10, at least 20, at least 30, at least 40, at least 50, at least 60, at least 80, at least 100, at least 120, at least 150, at least 200, or at least 250. In some embodiments, the asphalt emulsion is a blend of two or more penetration grade emulsions, and the final penetration grade is no more than 300, no more than 200, no more than 150, no more than 100, no more than 80, no more than 70, no more than 60, no more than 50, no more than 40, no more than 30, or no more than 20.

Penetration grading is used to characterize the consistency of asphalt mixes, particularly as measured with respect to penetration depth (e.g., of a 100 g needle at 25° C.). For instance, penetration grades 40-50 indicate the hardest grades, penetration grades 60-70 and 85-100 refer to commonly used grades in temperate climates, and penetration grades 200-300 indicate the softest grades, typically used for cold climates. See, for example, Roberts et al., 1996, *Hot Mix Asphalt Materials, Mixture Design, and Construction*. National Asphalt Pavement Association Education Foundation, Lanham, MD, which is hereby incorporated herein by reference in its entirety.

In some embodiments, the asphalt emulsion comprises a single type (e.g., penetration grade, mixing grade, ionic classification, etc.) of asphalt emulsion. In some embodiments, the asphalt emulsion comprises a plurality of types of asphalt emulsion. In some embodiments, where the composition comprises a plurality of types of asphalt emulsions, each type of asphalt emulsion in the plurality of asphalt emulsions is present in an amount (e.g., percent by weight) disclosed herein. In some such embodiments, each type of asphalt emulsion in the plurality of asphalt emulsions is present in the same amount (e.g., percent by weight) relative to the composition. In some such embodiments, two or more types of asphalt emulsion in the plurality of asphalt emulsions are present in different amounts (e.g., percent by weight) relative to the composition. In some embodiments, where the composition comprises a plurality of types of asphalt emulsions, the amount of asphalt emulsion present in the composition (e.g., as disclosed herein) indicates the total amount of asphalt emulsion in the plurality of asphalt emulsions.

In some embodiments, the asphalt emulsion further includes one or more components for asphalt reinforcement. In some embodiments, the one or more asphalt reinforcement components are selected from the group consisting of mineral asphaltenes (e.g., gilsonite), clarified asphalt (e.g., clear asphalts), and bio-based asphalt-like binders (e.g., soy, corn, palm, flax, etc.). In some embodiments, the one or more asphalt reinforcement components include bio-rejuvenators. In some embodiments, the one or more asphalt reinforcement components include tire rubber modification (e.g., tire rubber modified asphalt). Advantageously, asphalt reinforcement components can provide flexibility in the asphalt-based sealcoat composition, allowing for modification of harder asphalt types and/or the inclusion of a variety of different asphalt types. Moreover, in some implementations, asphalt reinforcement components such as tire rubber modification provides an improved LEED recycleability score.

In some embodiments, the asphalt emulsion is a polymer-modified asphalt emulsion. For instance, as described below, in some implementations, polymer (e.g., a polymer emulsion) is included in the asphalt emulsion prior to adding the asphalt emulsion to the asphalt-based sealcoat composition. For instance, asphalt emulsions classified with a "P" suffix generally refer to asphalt emulsions that have been supplemented with polymer. In another example, asphalt emulsions classified with an "L" suffix generally refer to asphalt emulsions that have been supplemented with a latex polymer.

In some embodiments, the asphalt emulsion does not contain added polymers, and polymers are added to the asphalt-based sealcoat composition separately from the asphalt emulsion. Suitable polymers contemplated for use in the present disclosure are discussed in greater detail in the section entitled "Polymer Emulsion," below.

Water

In some embodiments, the asphalt-based sealcoat composition comprises water. In some embodiments, the water is treated to remove one or more minerals and/or ions (e.g., water softening). In some embodiments, the treatment is performed to control mineral and ion content in the water. For example, in some embodiments, the water is treated to remove one or more metal cations (e.g., calcium, magnesium, etc.).

In some embodiments, the water is present in an amount of from about 15% to about 45% by weight. In some embodiments, the water is present in an amount of from about 18% to about 35% by weight. In some embodiments, the water is present in an amount of from about 20% to about 30% by weight. In some embodiments, the water is present in an amount of from about 20% to about 25% by weight. In some embodiments, the water is present in an amount of about 20.5% to about 23% by weight.

In some embodiments, the water is present in an amount of at least 5%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 45%, or at least 50% by weight.

In some embodiments, the water is present in an amount of no more than 60%, no more than 55%, no more than 50%, no more than 45%, no more than 40%, no more than 35%, no more than 30%, no more than 29%, no more than 28%, no more than 27%, no more than 26%, no more than 25%, no more than 24%, no more than 23%, no more than 22%, no more than 21%, no more than 20%, no more than 19%, no more than 18%, no more than 17%, no more than 16%, no more than 15%, or no more than 10% by weight.

In some embodiments, the water is present in an amount of from about 5% to about 10%, from about 10% to about 30%, from about 15% to about 50%, from about 15% to about 40%, from about 18% to about 25%, from about 20% to about 23%, or from about 30% to about 60% by weight. In some embodiments, the water is present in an amount falling within another range starting no lower than about 5% by weight and ending no higher than about 60% by weight.

Polymer

In some embodiments, the asphalt-based sealcoat composition comprises a polymer. In some embodiments, the asphalt-based sealcoat composition does not comprise a polymer. In some embodiments, the polymer is a polymer emulsion. In some embodiments, the polymer is present in the asphalt-based sealcoat composition as polymeric fibers (e.g., recycled nylon and/or polyethylene). In some embodiments, the polymer is present in the asphalt-based sealcoat composition as solid polymer. In some embodiments, the solid polymer is at least 80%, at least 90%, at least 95%, at least 99%, or 100% solid polymer.

In some embodiments, the asphalt-based sealcoat composition comprises polymer emulsion. In some embodiments, the asphalt-based sealcoat composition does not comprise polymer emulsion.

In some embodiments, the polymer (e.g., polymer emulsion) is present in an amount of from about 1% to about 35% by weight. In some embodiments, the polymer (e.g., polymer emulsion) is present in an amount of from about 2% to about 30% by weight. In some embodiments, the polymer (e.g., polymer emulsion) is present in an amount of from about 3% to about 25% by weight. In some embodiments, the polymer (e.g., polymer emulsion) is present in an amount of from about 4% to about 20% by weight. In some embodiments, the polymer (e.g., polymer emulsion) is present in an amount of from about 4.5% to about 16% by weight. In some embodiments, the polymer (e.g., polymer emulsion) is present in an amount of from about 5% to about 10% by weight. In some embodiments, the polymer (e.g., polymer emulsion) is present in an amount of from about 6% to about 8% by weight. In some embodiments, the polymer (e.g., polymer emulsion) is present in an amount of about 6.5% to about 7.8% by weight. In some embodiments, the polymer (e.g., polymer emulsion) is present in an amount of about 15% by weight.

In some embodiments, the polymer (e.g., polymer emulsion) is present in an amount of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 45%, or at least 50% by weight.

In some embodiments, the polymer (e.g., polymer emulsion) is present in an amount of no more than 60%, no more than 55%, no more than 50%, no more than 45%, no more than 40%, no more than 35%, no more than 30%, no more than 25%, no more than 24%, no more than 23%, no more than 22%, no more than 21%, no more than 20%, no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, or no more than 5% by weight.

In some embodiments, the polymer (e.g., polymer emulsion) is present in an amount of from about 1% to about 50%, from about 10% to about 60%, from about 5% to about 20%, from about 5% to about 10%, from about 10% to about 20%, from about 5% to about 25%, or from about 3% to about 18% by weight. In some embodiments, the polymer (e.g., polymer emulsion) is present in an amount falling within another range starting no lower than about 1% by weight and ending no higher than about 60% by weight.

In some embodiments, the polymer (e.g., polymer emulsion) comprises an acrylic polymer, a styrene acrylic, vinyl acetate ethylene, a styrene-butadiene copolymer resin (SBR), a polyvinyl acetate, and/or a mixture thereof. In some embodiments, the polymer (e.g., polymer emulsion) comprises acrylic copolymer, vinyl acrylic, acrylic latex, polyurethane, SBR (styrene-buladiene rubber), SBS (styrene-butadiene-styrene), polychloroprene, polyvinyl acetate, polyvinyl acetate ether, polyvinyl alcohols, parboxylic acid, synthetic Rubber, natural rubber, recycled tire rubber, LDP (low density polyethylene), EVA (ethylene vinyl acetate), nitrile latex, DuPont Elvaloy Polymer Modifier, and/or any mixture thereof.

In some embodiments, the polymer (e.g., polymer emulsion) comprises acrylic copolymer. In some embodiments, the polymer (e.g., polymer emulsion) comprises vinyl acrylic. In some embodiments, the polymer (e.g., polymer emulsion) comprises a self-crosslinking acrylic latex. In some embodiments, the polymer (e.g., polymer emulsion) comprises ethylene vinyl acrylic latex.

In some embodiments, the polymer is a polymer emulsion that further comprises additional water. In some embodiments, the polymer emulsion further comprises water that is present in the polymer emulsion in an amount of at least 15%, at least 20%, at least 25%, at least 28%, at least 30%, at least 33%, at least 35%, at least 38%, at least 40%, at least 45%, at least 50%, at least 53%, at least 55%, at least 58%, at least 60%, or at least 70% by weight. In some embodiments, the polymer emulsion further comprises water that is present in the polymer emulsion in an amount of no more than 80%, no more than 70%, no more than 60%, no more than 55%, no more than 50%, no more than 45%, no more than 40%, no more than 35%, no more than 30%, or no more than 25% by weight. In some embodiments, the polymer emulsion further comprises water that is present in the polymer emulsion in an amount of from about 15% to about 50%, from about 20% to about 70%, from about 15% to about 20%, from about 25% to about 60%, from about 40% to about 80%, from about 45% to about 55%, or from about 47% to about 53% by weight. In some embodiments, the polymer emulsion further comprises water that is present in the polymer emulsion in an amount falling within another range starting no lower than about 15% by weight and ending no higher than about 80% by weight.

In some embodiments, the polymer (e.g., polymer emulsion) comprises a single type of polymer. In some embodiments, the polymer (e.g., polymer emulsion) comprises a plurality of types of polymer. In some embodiments, where the composition comprises a plurality of types of polymer, each type of polymer in the plurality of polymers is present in an amount (e.g., percent by weight) disclosed herein. In some such embodiments, each type of polymer in the plurality of polymers is present in the same amount (e.g., percent by weight) relative to the composition. In some such embodiments, two or more types of polymer in the plurality of polymers are present in different amounts (e.g., percent by weight) relative to the composition. In some embodiments, where the composition comprises a plurality of types of polymer, the amount of polymer present in the composition (e.g., as disclosed herein) indicates the total amount of polymer in the plurality of polymers.

By way of example, in some embodiments, the polymer comprises a first type of polymer (e.g., present in an amount of about 6.9% by weight) and a second type of polymer (e.g., present in an amount of about 6.9% by weight), where the total amount of polymer present in the composition is an amount and/or falls within a range of amounts disclosed herein (e.g., a total amount of about 13.8% by weight). As another example, in some embodiments, the polymer is a polymer emulsion that comprises formaldehyde (e.g., less than 0.05% by weight), styrene butadiene polymer (e.g., from about 17% to about 29% by weight), vinyl acetate (e.g., less than 0.05% by weight), acrylic polymer (e.g., from about 28% to about 48% by weight), ammonia (e.g., less than 0.05% by weight), and water (e.g., from about 47% to about 53% by weight).

Advantageously, in some implementations, the inclusion of polymers in the asphalt-based sealcoat composition enhances the "wet" characteristics (e.g., stability and/or compatibility) and the "dry" characteristics (e.g., improved adhesion, abrasion, resistance, and/or other mechanical properties) of the composition. For instance, as described above, polymers can impart enhanced resistance to stretching (e.g., reduced brittleness and cracking) of the applied sealcoat, thus increasing the durability and longevity of the sealcoat. Moreover, as described above, in some implementations, the polymer comprises a plurality of types of polymer (e.g., a self-crosslinking acrylic latex and an ethylene vinyl acetate latex). In some such embodiments, the use of a mixture of polymers advantageously results in a combination of characteristics that enhances the overall performance of the asphalt-based sealcoat composition over any one individual polymer.

In some embodiments, the polymer is obtained as a component in a polymer-modified asphalt emulsion. For instance, as described above, in some implementations, a polymer emulsion is present in the obtained asphalt emulsion prior to the mixing of the asphalt-based sealcoat composition. Generally, asphalt emulsions classified with a "P" suffix refer to asphalt emulsions that have been supplemented with polymer. In another example, asphalt emulsions classified with an "L" suffix generally refer to asphalt emulsions that have been supplemented with a latex polymer. Typically, polymers are added to the asphalt emulsion to enhance the strength, adhesion, and/or durability of any asphalt-based composition including the asphalt emulsion.

In some embodiments, the asphalt emulsion is not modified with polymers, and the polymer (e.g., polymer emulsion) and asphalt emulsion are individually added to the asphalt-based sealcoat composition. An example process for the preparation of asphalt-based sealcoat compositions, in which a polymer (e.g., polymer emulsion) is mixed with an asphalt emulsion, is described in further detail in the section entitled "Preparation of asphalt-based sealcoat composition," below. In some implementations, the use of separate polymer (e.g., not included as part of a modified asphalt emulsion) advantageously allows for greater flexibility and variety in the selection of compatible polymers with desired properties. Accordingly, in some embodiments, the polymer (e.g., polymer emulsion) is introduced as a polymer latex or water-borne polymer as a component separate and independent from the asphalt.

Any polymer (e.g., polymer emulsion) suitable for the preparation of asphalt-based compositions is contemplated in the amounts disclosed herein for the compositions of the present disclosure, as will be apparent to one skilled in the art.

Clay

In some embodiments, the asphalt-based sealcoat composition comprises clay. In some embodiments, the asphalt-based sealcoat composition does not comprise clay.

In some embodiments, the clay is present in an amount of from about 1% to about 10% by weight. In some embodiments, the clay is present in an amount of from about 2% to about 8% by weight. In some embodiments, the clay is present in an amount of from about 3% to about 6% by weight. In some embodiments, the clay is present in an amount of from about 4% to about 5% by weight. In some embodiments, the clay is present in an amount of from about 4% to about 4.5% by weight.

In some embodiments, the clay is present in an amount of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, or at least 30% by weight. In some embodiments, the clay is present in an amount of no more than 40%, no more than 30%, no more than 25%, no more than 24%, no more than 23%, no more than 22%, no more than 21%, no more than 20%, no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, or no more than 5% by weight.

In some embodiments, the clay is present in an amount of from about 1% to about 40%, from about 1% to about 10%, from about 5% to about 20%, from about 10% to about 30%, from about 2% to about 6%, from about 3% to about 5%, or from about 3% to about 12% by weight. In some embodiments, the clay is present in an amount falling within another range starting no lower than about 1% by weight and ending no higher than about 40% by weight.

In some embodiments, the clay comprises a silicate mineral. Silicate minerals generally refer to rock-forming minerals comprising silicate groups. Various groups of silicate minerals include nesosilicates, sorosilicates, cyclosilicates, inosilicates (single chain), inosilicates (double chain), phyllosilicates, and tectosilicates. In particular, phyllosilicates refer to a broad category of minerals including such clay minerals as antigorite, chrysotile, lizardite, halloysite, kaolinite, pyrophyllite, talc, illite, chlorite, vermiculite, palygorskite, biotite, fuchsite, muscovite, phlogopite, lepidolite, margarite, glauconite, sepiolite and montmorillonite, the main component of bentonite. See, e.g., Nelson, "Phyllosilicates (Micas, Chlorite, Talc, & Serpentine)," 2015, available on the Internet at tulane.edu/~sanelson/eens211/phyllosilicates.htm, which is hereby incorporated herein by reference in its entirety.

Accordingly, in some implementations, the clay comprises phyllosilicates. In some embodiments, the clay is selected from the group consisting of bentonite clay, ball clay, fire clay, sepiolite clay, illite, montmorillonite, hawthorn clay, American colloid clay, hickory clay, Lincoln clay, and/or any mixture thereof. In some embodiments, the clay is Bentonite clay. In some embodiments, the clay is sepiolite clay.

In some embodiments, the clay is a single type of clay. In some embodiments, the clay comprises more than one type of clay (e.g., bentonite clay and sepiolite clay). In some implementations, the clay includes a mixture of clays selected from the group consisting of bentonite clay, ball clay, fire clay, sepiolite clay, illite, montmorillonite, hawthorn clay, American colloid clay, hickory clay, and/or Lincoln clay. In some embodiments, the clay comprises two or more, three or more, four or more, five or more, six or more, seven or more, eight or more, nine or more, ten or more, eleven or more, twelve or more, thirteen or more, fourteen or more, fifteen or more, or twenty or more types of clay. In some embodiments, where the composition comprises a plurality of types of clay, each type of clay in the plurality of types of clay is present in an amount (e.g., percent by weight) disclosed herein. In some such embodiments, each type of clay in the plurality of types of clay is present in the same amount (e.g., percent by weight) relative to the composition. In some such embodiments, two or more types of clay in the plurality of types of clay are present in different amounts (e.g., percent by weight) relative to the composition. In some embodiments, where the composition comprises a plurality of types of clay, the amount of clay present in the composition (e.g., as disclosed herein) indicates the total amount of clay in the plurality of types of clay.

Any clay suitable for the preparation of asphalt-based compositions is contemplated in the amounts disclosed herein for the compositions of the present disclosure, as will be apparent to one skilled in the art.

Sand

In some embodiments, the asphalt-based sealcoat composition comprises sand. In some embodiments, the asphalt-based sealcoat composition does not comprise sand.

In some embodiments, the composition further comprises sand present in an amount of about 5% to about 20% by weight. In some embodiments, the sand is present in an amount of from about 8% to about 15% by weight. In some embodiments, the sand is present in an amount of from about 9% to about 12% by weight. In some embodiments, the sand is present in an amount of from about 10% to about 11.5% by weight.

In some embodiments, the sand is present in an amount of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, or at least 30% by weight. In some embodiments, the sand is present in an amount of no more than 40%, no more than 30%, no more than 25%, no more than 24%, no more than 23%, no more than 22%, no more than 21%, no more than 20%, no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, or no more than 5% by weight.

In some embodiments, the sand is present in an amount of from about 1% to about 40%, from about 2% to about 15%, from about 5% to about 20%, from about 10% to about 30%, from about 4% to about 18%, from about 30% to about 40%, or from about 3% to about 12% by weight. In some embodiments, the sand is present in an amount falling within another range starting no lower than about 1% by weight and ending no higher than about 40% by weight.

In some embodiments, the sand has a particle size mesh from about 16 to about 300. In some embodiments, the sand has a particle size mesh from about 30 to about 280. In some embodiments, the sand has a particle size mesh from about 60 to about 260. In some embodiments, the sand has a particle size mesh from about 80 to about 240. In some embodiments, the sand has a particle size mesh from about 100 to about 220. In some embodiments, the sand has a particle size mesh of about 200. In some embodiments, the sand has a particle size mesh from about 20 to about 80. In some embodiments, the sand has a particle size mesh of about 20/40.

In some embodiments, the sand has a particle size mesh of at least 10, at least 12, at least 16, at least 20, at least 30, at least 40, at least 50, at least 60, at least 70, at least 80, at least 90, at least 100, at least 150, or at least 200. In some embodiments, the sand has a particle size mesh of no more than 300, no more than 200, no more than 100, no more than 70, no more than 50, or no more than 40. In some embodiments, the sand has a particle size mesh of from about 12 to about 50, from about 16 to about 70, from about 20 to about 40, from about 70 to about 300, from about 100 to about 200, or from about 150 to about 300. In some embodiments, the sand has a particle size mesh that falls within another range starting no lower than 10 and ending no higher than 300.

In some embodiments, the sand comprises a material that is similar or identical in type to a material used for one or more other components of the asphalt-based sealcoat composition (e.g., aggregate, extender, etc.). For instance, in some embodiments, the sand comprises limestone sand.

In some embodiments, the sand is a mixture of materials. For instance, in some implementations, the sand is a mixture of materials, one or more of which is similar or identical in type to a material used for one or more other components of the asphalt-based sealcoat composition (e.g., aggregate, extender, etc.). In some embodiments, the sand comprises two or more, three or more, four or more, five or more, six or more, seven or more, eight or more, nine or more, ten or more, eleven or more, twelve or more, thirteen or more, fourteen or more, fifteen or more, or twenty or more types of sand.

In some embodiments, the sand is a mixture of materials having different particle size (e.g., as determined by a particle size mesh). In some embodiments, the sand is a mixture of two or more, three or more, four or more, five or more, six or more, seven or more, eight or more, nine or more, ten or more, eleven or more, twelve or more, thirteen or more, fourteen or more, fifteen or more, or twenty or more different particle sizes. In some embodiments, the sand has a uniform particle size as determined by a particle size mesh.

In some embodiments, where the composition comprises a plurality of types (e.g., materials and/or particle sizes) of sand, each type of sand in the plurality of types of sand is present in an amount (e.g., percent by weight) disclosed herein. In some such embodiments, each type of sand in the plurality of types of sand is present in the same amount (e.g., percent by weight) relative to the composition. In some such embodiments, two or more types of sand in the plurality of types of sand are present in different amounts (e.g., percent by weight) relative to the composition. In some embodiments, where the composition comprises a plurality of types of sand, the amount of sand present in the composition (e.g., as disclosed herein) indicates the total amount of sand in the plurality of types of sand.

Any sand suitable for the preparation of asphalt-based compositions is contemplated in the amounts disclosed herein for the compositions of the present disclosure, as will be apparent to one skilled in the art.

Advantageously, in some embodiments, the sand provides anti-skid properties to the asphalt-based sealcoat upon application of the asphalt-based sealcoat composition. As described below with reference to Example 3, anti-skid properties can be determined using standardized testing protocols measured at a predetermined speed. For instance, ASTM standard method E274 is used to determine skid numbers SN40R and SN40S at 64 km/h (40 mph) using ribbed tires and smooth tires, respectively (see, e.g., ASTM E274/E274M-11, 2011; and Fwa, 2017, "Skid resistance determination for pavement management and wet-weather road safety," Int J Trans Sci Tech 6(3): 217-227, each of which is hereby incorporated herein by reference in its entirety.

Generally, measurements of pavement friction are used for pavement management purposes, such as monitoring pavement conditions and performing necessary maintenance for safety, efficiency, comfort, and durability of roads and other surfaces under various weather conditions. Skid resistance refers to the force developed when a locked tire (e.g., a tire that is prevented from rotating) slides on a paved surface. Higher skid resistance decreases the risk of vehicle skidding and hydroplaning upon surfaces, thus reducing accidents caused by, e.g., weather conditions and/or emergency braking.

While safety parameters vary between regions (e.g., states, countries, etc.), a common practice for highway agencies is to specify a minimum skid resistance for pavement management and maintenance. Accordingly, the minimum standard in some jurisdictions includes a skid number of at least 20 (e.g., 23 to 30 on highways and other high-speed surfaces). See, e.g., Fwa, 2017, "Skid resistance determination for pavement management and wet-weather road safety," Int J Trans Sci Tech 6(3): 217-227.

Accordingly, in some embodiments, the compositions and methods of the present disclosure provide an asphalt-based sealcoat having a skid number (SN40R) of at least about 25. In some embodiments, the asphalt-based sealcoat has a skid number SN40R of at least about 30. In some embodiments, the asphalt-based sealcoat has a skid number SN40R of at least about 35. In some embodiments, the asphalt-based sealcoat has an SN40R of at least 20, at least 21, at least 22, at least 23, at least 24, at least 25, at least 26, at least 28, at least 29, at least 30, at least 35, at least 40, at least 45, at least 50, or at least 55. In some embodiments, the asphalt-based sealcoat has an SN40R of no more than 70, no more than 60, no more than 55, no more than 50, no more than 45, no more than 40, no more than 35, no more than 30, or no more than 25. In some embodiments, the asphalt-based sealcoat has an SN40R of from about 20 to about 40, from about 25 to about 60, from about 22 to about 35, from about 30 to about 45, or from about 35 to about 65. In some embodiments, the asphalt-based sealcoat has an SN40R that falls within another range starting no lower than 20 and ending no higher than 70.

Another method of measuring pavement safety includes determining pavement friction values. Generally, higher friction values are inversely correlated with vehicle crash rates, with several studies recommending a minimum friction coefficient of 0.40 measured at 30 mph or higher. In some cases, friction coefficients are related to the microtexture of paving materials and are measured using a device for microtexture (e.g., a circular track meter (CTM) and/or a dynamic friction test (DFT)). See, for example, Hall et al., "Guide for Pavement Friction," 2006, NCHRP Project 01-43, which is hereby incorporated herein by reference in its entirety. For instance, the DFT is a portable device consisting a horizontal spinning disk fitted with three spring-loaded rubber slides. The disk is rotated at tangential velocities of up to 80 kph while in contact with a surface over which water is flowed. The coefficient of friction on the wet surface is continually measured as the disk slows, starting from speeds of 20-80 kph. Circular track meters, the dynamic friction test, and friction values suitable for use in the present disclosure are further described, for instance, in Wasilewska et al., "Evaluation of skid resistance using CTM, DFT and SRT-3 devices," 2016, Transportation Research Procedia 14, 3050-3059, which is hereby incorporated herein by reference in its entirety.

Accordingly, in some embodiments, the asphalt-based sealcoat has a dynamic friction test (DFT) value of at least about 0.35. In some embodiments, the asphalt-based sealcoat has a dynamic friction test (DFT) value of at least about 0.4. In some embodiments, the asphalt-based sealcoat has a dynamic friction test (DFT) value of at least about 0.45. In some embodiments, the asphalt-based sealcoat has a DFT value of at least about 0.20, at least about 0.25, at least about 0.30, at least about 0.35, at least about 0.40, at least about 0.45, at least about 0.50, at least about 0.55, at least about 0.60, or at least about 0.65. In some embodiments, the asphalt-based sealcoat has a DFT value of no more than 0.75, no more than 0.70, no more than 0.65, no more than 0.60, no more than 0.50, no more than 0.40, no more than 0.35, or no more than 0.30. In some embodiments, the asphalt-based sealcoat has a DFT value of from about 0.20 to about 0.50, from about 0.20 to about 0.70, from about 0.30 to about 0.55, from about 0.35 to about 0.50, or from about 0.40 to about 0.48. In some embodiments, the asphalt-based sealcoat has a DFT value that falls within another range starting no lower than 0.20 and ending no higher than 0.75.

Moreover, in some embodiments, the sand provides a coloring effect to the asphalt-based sealcoat composition. In some embodiments, for example, the sand provides a lightening effect or a darkening effect to the color of the asphalt-based sealcoat composition. In some embodiments, the sand imparts a particular color to the asphalt-based sealcoat composition. For instance, in some implementations, the sand is a light color (e.g., white, off-white, beige, yellow, or a similar color), such that the addition of sand to the asphalt-based sealcoat composition results in a lighter colored sealcoat composition (e.g., grey and/or salt-and-pepper). Advantageously, a lighter colored sand can increase the solar reflectivity of the asphalt-based sealcoat composition and/or the asphalt-based sealcoat upon application to a surface.

Extenders

In some embodiments, the asphalt-based sealcoat composition comprises an extender. In some embodiments, the asphalt-based sealcoat composition does not comprise an extender.

In some embodiments, the extender is present in an amount of from about 0.5% to about 15% by weight. In some embodiments, the extender is present in an amount of from about 1% to about 10% by weight. In some embodiments, the extender is present in an amount of from about 2% to about 8% by weight. In some embodiments, the extender is present in an amount of from about 2.5% to about 5% by weight. In some embodiments, the extender is present in an amount of from about 3% to about 4% by weight.

In some embodiments, the extender is present in an amount of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, or at least 25% by weight. In some embodiments, the extender is present in an amount of no more than 30%, no more than 25%, no more than 24%, no more than 23%, no more than 22%, no more than 21%, no more than 20%, no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1% by weight.

In some embodiments, the extender is present in an amount of from about 0.1% to about 5%, from about 1% to about 5%, from about 5% to about 10%, from about 8% to about 20%, from about 0.05% to about 3%, or from about 0.5% to about 8%, by weight. In some embodiments, the extender is present in an amount falling within another range starting no lower than about 0.01% by weight and ending no higher than about 30% by weight.

In some embodiments, the extender is selected from the group consisting of marble white, granulated calcium carbonate, kaolin, kaolinite, imerys talcs, Grace SYLOWHITE™, Burgess Pigment Company kaolins, limestone dust, hydrated lime, asbestos, fuller's earth, and/or any mixture thereof. In some embodiments, the extender is marble white. In some embodiments, the extender is granulated calcium carbonate. In some embodiments, the extender is any extender suitable for the preparation of asphalt-based compositions, as will be apparent to one skilled in the art. See, for example, Kallas et al., 1962, "Mineral Fillers in Asphalt Paving Mixtures," Highway Research Board Bulletin, 329: 6-29; and Remisova, 2015, "Study of mineral filler effect on asphalt mixtures properties," Bituminous Mixtures & Pavements VI, doi: 10.1201/b18538-9, each of which is hereby incorporated herein by reference in its entirety.

Generally, extenders are also referred to herein as fillers. Accordingly, in some embodiments, the extender includes any material suitable for use as a filler for asphalt-based compositions, as will be apparent to one skilled in the art. In some embodiments, the extender comprises a material that is similar or identical in type to a material used for one or more other components of the asphalt-based sealcoat composition (e.g., aggregate, sand, etc.). For instance, in some implementations, the extender comprises limestone dust. In some embodiments, the extender comprises diatomaceous earth.

In some embodiments, the extender includes a mixture of materials. For example, in some embodiments, the extender comprises two or more types of materials selected from the group consisting of marble white, granulated calcium carbonate, kaolin, kaolinite, imerys talcs, Grace SYLOWHITE™, Burgess Pigment Company kaolins, limestone dust, hydrated lime, asbestos, and/or fuller's earth. In some embodiments, the extender comprises two or more, three or more, four or more, five or more, six or more, seven or more, eight or more, nine or more, ten or more, eleven or more, twelve or more, thirteen or more, fourteen or more, fifteen or more, or twenty or more types of materials. In some implementations, the extender includes a mixture of materials, one or more of which is similar or identical in type to a material used for one or more other components of the asphalt-based sealcoat composition (e.g., aggregate, sand, etc.).

In some embodiments, where the composition comprises a plurality of types of extenders, each type of extender in the plurality of types of extenders is present in an amount (e.g., percent by weight) disclosed herein. In some such embodiments, each type of extender in the plurality of types of extenders is present in the same amount (e.g., percent by weight) relative to the composition. In some such embodiments, two or more types of extenders in the plurality of types of extenders are present in different amounts (e.g., percent by weight) relative to the composition. In some embodiments, where the composition comprises a plurality of types of extenders, the amount of extender present in the composition (e.g., as disclosed herein) indicates the total amount of extender in the plurality of types of extenders.

Extenders can be used to supplement other components and materials in the asphalt-based sealcoat composition, thus advantageously reducing the overall cost of the composition. For instance, in some implementations, the asphalt-based sealcoat composition includes a lower proportion by weight of $TiO_2$ particles, where the difference in composition is made up by the inclusion of additional extenders.

Any extenders and/or fillers suitable for the preparation of asphalt-based compositions are contemplated in the amounts disclosed herein for the compositions of the present disclosure, as will be apparent to one skilled in the art.

Fiber

In some embodiments, the asphalt-based sealcoat composition comprises fiber. In some embodiments, the asphalt-based sealcoat composition does not comprise fiber.

In some embodiments, the composition further comprises fiber present in an amount of about 0.1% to about 5% by weight. In some embodiments, the fiber is present in an amount of from about 0.3% to about 3% by weight. In some embodiments, the fiber is present in an amount of from about 0.5% to about 2% by weight. In some embodiments, the fiber is present in an amount of from about 0.5% to about 1% by weight.

In some embodiments, the fiber is present in an amount of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, or at least 20% by weight. In some embodiments, the fiber is present in an amount of no more than 25%, no more than 24%, no more than 23%, no more than 22%, no more than 21%, no more than 20%, no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, no more than 1%, no more than 0.9%, no more than 0.8%, no more than 0.7%, no more than 0.6%, or no more than 0.5% by weight.

In some embodiments, the fiber is present in an amount of from about 0.05% to about 5%, from about 0.1% to about 15%, from about 0.2% to about 10%, from about 0.3% to about 2%, from about 0.4% to about 1%, or from about 0.5% to about 3%, by weight. In some embodiments, the fiber is present in an amount falling within another range starting no lower than about 0.01% by weight and ending no higher than about 25% by weight.

In some embodiments, the fiber is basalt fiber, lignin fiber, polyester fiber, asbestos fiber, carbon fiber, diatomite fiber, nylon fiber, polyethylene fiber, and/or polypropylene fiber. For instance, in some embodiments, the fiber is any fiber suitable for the preparation of asphalt-based compositions, as will be apparent to one skilled in the art. See, for example, Guo et al., "Evaluation of the Effect of Fiber Type, Length, and Content on Asphalt Properties and Asphalt Mixture Performance," Materials (Basel), 2020; 13(7):1556, doi: 10.3390/ma13071556, which is hereby incorporated herein by reference in its entirety.

In some embodiments, the fiber is obtained from natural and/or synthetic materials. In some embodiments, the fiber is obtained from recycled materials. For instance, in some embodiments, the fiber is shredded nylon. In some embodiments, the fiber is recycled paper.

In some embodiments, the fiber includes a mixture of materials. For instance, in some embodiments, the fiber comprises two or more types of materials selected from the group consisting of basalt fiber, lignin fiber, polyester fiber, asbestos fiber, carbon fiber, diatomite fiber, nylon fiber, polyethylene fiber, and/or polypropylene fiber. In some embodiments, the fiber comprises two or more, three or more, four or more, five or more, six or more, seven or more, eight or more, nine or more, ten or more, eleven or more, twelve or more, thirteen or more, fourteen or more, fifteen or more, or twenty or more types of materials.

In some embodiments, where the composition comprises a plurality of types of fiber, each type of fiber in the plurality of types of fiber is present in an amount (e.g., percent by weight) disclosed herein. In some such embodiments, each type of fiber in the plurality of types of fiber is present in the same amount (e.g., percent by weight) relative to the composition. In some such embodiments, two or more types of fiber in the plurality of types of fiber are present in different amounts (e.g., percent by weight) relative to the composition. In some embodiments, where the composition comprises a plurality of types of fiber, the amount of fiber present in the composition (e.g., as disclosed herein) indicates the total amount of fiber in the plurality of types of fiber.

Advantageously, as described above, the asphalt-based sealcoat composition has a thick and/or creamy consistency that is due at least in part to the fiber. The fiber, in some implementations, increases the stability of the composition during storage and transportation, as well as the ease and efficacy with which the asphalt-based sealcoat compositions can be applied to a surface. In particular, fibers in solution can impart non-Newtonian properties to the product, allowing the composition to flow like a liquid under stress while returning to a solid-like state once force is released. Thus, in some implementations, fiber imparts "dry" properties (e.g., resistance to stretching, formation of a mat-like structure in the sealcoat to improve durability, etc.) as well as "wet" properties to the composition. As such, in some implementations, the asphalt-based sealcoat compositions are stable during storage (e.g., in a vessel such as a can), during application (e.g., via pumping, squeegeeing, or spraying), and after application (e.g., while drying on a surface). In other words, in some implementations, the asphalt-based sealcoat compositions are capable of behaving like a solid under low shear or minimal external forces (e.g., such that it will not run off the road into the sewers) and like a liquid under some mechanical force, allowing it to flow, e.g., to be sprayed or pumped, during application. In some embodiments, the improved stability and applicability is due in part to the inclusion of fiber in the asphalt-based sealcoat compositions.

Aggregates

In some embodiments, the asphalt-based sealcoat composition comprises an aggregate. In some embodiments, the asphalt-based sealcoat composition does not comprise an aggregate.

In some embodiments, the composition further comprises an aggregate present in an amount of about 0.1% to about 25% by weight. In some embodiments, the aggregate is present in an amount of from about 0.5% to about 20% by weight. In some embodiments, the aggregate is present in an amount of from about 0.9% to about 15% by weight. In some embodiments, the aggregate is present in an amount of from about 6% to about 8% by weight.

In some embodiments, the aggregate is present in an amount of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 35%, at least 40%, or at least 50% by weight. In some embodiments, the aggregate is present in an amount of no more than 60%, no more than 50%, no more than 40%, no more than 30%, no more than 25%, no more than 24%, no more than 23%, no more than 22%, no more than 21%, no more than 20%, no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, or no more than 5% by weight.

In some embodiments, the aggregate is present in an amount of from about 0.1% to about 5%, from about 1% to about 10%, from about 5% to about 15%, from about 3% to about 20%, from about 0.05% to about 25%, or from about 10% to about 60%, by weight. In some embodiments, the aggregate is present in an amount falling within another range starting no lower than about 0.01% by weight and ending no higher than about 60% by weight.

In some embodiments, the aggregate is selected from the group consisting of slate, baghouse fines (rock dust), fly ash, silica sand, calcium carbonite, clay, paper fiber, fiberglass fiber, limestone aggregate, copper slag, recycled roofing shingles, granite aggregate, ground tire rubber, ground up tennis balls, recycled cardboard, recycled glass, wood chips, wood fiber, scrabbled stone, pumice, basaltic aggregate, perlite, vermiculite, marble white, calcinated bauxite, and/or any mixture thereof. In some embodiments, the aggregate is slate. In some embodiments, the aggregate is limestone aggregate. For instance, in some embodiments, the aggregate is any aggregate suitable for the preparation of asphalt-based compositions, as will be apparent to one skilled in the art. See, for example, Asphalt Paving Association of Iowa, "Asphalt Paving Design Guide," available on the Internet at apai.net/Files/content/DesignGuide/AsphaltComposite SmFst.pdf.

In some embodiments, the aggregate comprises a material that is similar or identical in type to a material used for one or more other components of the asphalt-based sealcoat composition (e.g., extender, sand, etc.). For instance, in some embodiments, the aggregate comprises limestone aggregate.

In some embodiments, the aggregate includes a mixture of materials. For example, in some embodiments, the aggregate comprises two or more types of materials selected from the group consisting of slate, baghouse fines (rock dust), fly ash, silica sand, calcium carbonite, clay, paper fiber, fiberglass fiber, limestone aggregate, copper slag, recycled roofing shingles, granite aggregate, ground tire rubber, ground up tennis balls, recycled cardboard, recycled glass, wood chips, wood fiber, scrabbled stone, pumice, basaltic aggregate, perlite, vermiculite, marble white, calcinated bauxite, and/or any mixture thereof. In some implementations, the aggregate is a mixture of materials, one or more of which is similar or identical in type to a material used for one or more other components of the asphalt-based sealcoat composition (e.g., extender, sand, etc.). In some embodiments, the aggregate comprises two or more, three or more, four or more, five or more, six or more, seven or more, eight or more, nine or more, ten or more, eleven or more, twelve or more, thirteen or more, fourteen or more, fifteen or more, or twenty or more types of aggregate.

In some embodiments, where the composition comprises a plurality of types of aggregate, each type of aggregate in the plurality of types of aggregate is present in an amount (e.g., percent by weight) disclosed herein. In some such embodiments, each type of aggregate in the plurality of types of aggregate is present in the same amount (e.g., percent by weight) relative to the composition. In some such embodiments, two or more types of aggregate in the plurality of types of aggregate are present in different amounts (e.g., percent by weight) relative to the composition. In some embodiments, where the composition comprises a plurality of types of aggregate, the amount of aggregate present in the composition (e.g., as disclosed herein) indicates the total amount of aggregate in the plurality of types of aggregate.

Advantageously, in some embodiments, the aggregate includes a material that has anti-skid properties. For example, in some embodiments, the aggregate includes a material that imparts improved anti-skid properties to the asphalt-based sealcoat. As an example, calcinated bauxite can be used in asphalt-based high friction surface treatments (HFST) for problematic turns and inclines. Additional materials that impart anti-skid properties to the asphalt-based sealcoat are disclosed further herein (see, e.g., the section entitled, "Sand," above).

In some embodiments, the aggregate is selected based on an ability to increase or decrease the hardness of the asphalt-based sealcoat. For instance, harder aggregates will impart increased hardness to the asphalt-based sealcoat.

Biocide

In some embodiments, the composition comprises biocide. In some embodiments, the composition does not comprise biocide.

In some embodiments, the biocide is present in an amount of from about 0.01% to about 5% by weight. In some embodiments, the biocide is present in an amount of from about 0.1% to about 2% by weight. In some embodiments, the biocide is present in an amount of from about 0.2% to about 0.6% by weight.

In some embodiments, the biocide is present in an amount of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, or at least 10% by weight. In some embodiments, the biocide is present in an amount of no more than 15%, no more than 10%, no more than 5%, no more than 4%, no more than 3%, no more than 2%, no more than 1%, no more than 0.9%, no more than 0.8%, no more than 0.7%, no more than 0.6%, no more than 0.5%, no more than 0.4%, no more than 0.3%, no more than 0.2%, or no more than 0.1% by weight.

In some embodiments, the biocide is present in an amount of from about 0.05% to about 5%, from about 0.1% to about 10%, from about 0.2% to about 1%, from about 0.1% to about 2%, from about 0.01% to about 15%, or from about 0.1% to about 0.5%, by weight. In some embodiments, the biocide is present in an amount falling within another range starting no lower than about 0.01% by weight and ending no higher than about 15% by weight.

In some embodiments, the biocide comprises a single type of biocide. In some embodiments, the biocide comprises a plurality of types of biocide. In some embodiments, where the composition comprises a plurality of types of biocide, each type of biocide in the plurality of types of biocide is present in an amount (e.g., percent by weight) disclosed herein. In some such embodiments, each type of biocide in the plurality of types of biocide is present in the same amount (e.g., percent by weight) relative to the composition. In some such embodiments, two or more types of biocide in the plurality of types of biocide are present in different amounts (e.g., percent by weight) relative to the composition. In some embodiments, where the composition comprises a plurality of types of biocide, the amount of biocide present in the composition (e.g., as disclosed herein) indicates the total amount of biocide in the plurality of types of biocide.

Colorants

In some embodiments, the asphalt-based sealcoat composition comprises a colorant. In some embodiments, the asphalt-based sealcoat composition does not comprise a colorant.

In some embodiments, the colorant is selected from the group consisting of pigment, paint, ink, dye, and powder. In some embodiments, the colorant is organic or inorganic. In some embodiments, the colorant is opaque or transparent. In some embodiments, the colorant is infrared (IR) or near-infrared (NIR) reflective.

In some embodiments, the colorant is a pigment.

Generally, pigments refer to inorganic or organic colorants with little to no solubility in most application mediums (e.g., compositions). In contrast, dyes refer to colorants that are generally soluble in most application mediums. For instance, in some embodiments, organic pigments comprise synthetic materials based on carbon and can be derived from petrochemicals. Typically, organic pigments are not stable at elevated temperatures and have partial solubility in strong solvents but are not soluble in water. In some embodiments, inorganic pigments comprise metal salts and oxides (e.g., natural and/or synthetic), are generally stable at elevated temperatures, and do not dissolve in solvents. Inorganic pigments have generally stable chemical structures and thus, in some embodiments, are characterized by better weatherability, dispersibility and opacity than organic pigments, albeit with lower chromaticity and tinctorial strength.

In some embodiments, the colorant is an inorganic, opaque pigment (e.g., a near-IR reflective pigment). In some embodiments, the colorant is an organic, transparent pigment. In some embodiments, the colorant is an inorganic, transparent pigment (e.g., red iron oxide, color index PR101). In some embodiments, the colorant is an organic, opaque pigment (e.g., benzimidazolone, color index P036).

In some embodiments, the composition has a color selected from the group consisting of red, orange, yellow, green, blue, violet, brown, black, and white. In some embodiments, the composition is grey.

In some embodiments, the composition has a color selected from the group consisting of color index names PW7, PBR29, PB28, PY74, PY184, PO73, PR254, PV23, PR101, PR112, PO36, PB15.6, PB15.3, PG7, PY138, PY154, PY110, PR168, PR122, PY42, PG17, and PBk11. For instance, in some embodiments, the composition has a color selected from Table 1.

TABLE 1

Example Colors for Titanium Oxide
Asphalt-based Sealcoat Compositions

| Pigment | Type | Color | Color Index |
| --- | --- | --- | --- |
| Titanium Dioxide | Inorganic | White | PW7 |
| Chrome Iron Brown Hematite | Inorganic | Brown/Black | PBR29 |
| Cobalt Aluminate Blue Spinel | Inorganic | Blue | PB28 |
| Acrylide Yellow | Organic | Yellow | PY74 |
| Bismuth Vanadate | Inorganic | Yellow | PY184 |
| Pyrrole Orange | Organic | Orange | PO73 |
| Diketopyrrolpyrol (DPP) | Organic | Red | PR254 |
| Carbazole Violet | Organic | Violet | PV23 |
| Iron Oxide | Inorganic | Brown/Red | PR101 |
| Monoazo Naftol Red | Organic | Red | PR112 |
| Benzimidazolone | Organic | Orange | PO36 |
| Phthalocyanine Blue, special crystal | Organic | Blue | PB15.6 |
| Phthalocyanine Blue | Organic | Blue | PB15.3 |
| Phthalocyanine Green | Organic | Green | PG7 |
| Quinophtalone Yellow | Organic | Yellow | PY138 |
| Benzimidazolone Yellow | Organic | Yellow | PY154 |
| Isoindolinone Yellow | Organic | Yellow | PY110 |
| Dibromoanthanthrone | Organic | Red | PR168 |
| Quinacridone | Organic | Magenta | PR122 |
| Yellow Iron Oxide | Inorganic | Yellow | PY42 |
| Chrome Oxide Green | Inorganic | Green | PG17 |
| Black Iron Oxide | Inorganic | Black | PBk11 |

In some embodiments, the composition has a color that is classified by a color index name. The Colour Index International is a reference database that includes over 13,000 color index names corresponding to different color products and is used in some applications as a classification system for colorants. See, for example, "Colour Index Explained," Society of Dyers and Colourists, available on the Internet at colour-index.com.

In some such embodiments, the composition is red, and the color index name is selected from the group consisting of NR 1. NR 2, NR 3, NR 4, NR 6, NR 8, NR 9, NR 10, NR 11, NR 12, NR 16, NR 20, NR 22, NR 23, NR 24, NR 25, NR 26, NR 28, NR 31, PR 1, PR 2, PR 3, PR 4, PR 5, PR 6, PR 7, PR 8, PR 9, PR 12, PR 13, PR 14, PR 15, PR 17, PR 19, PR 21, PR 22, PR 23, PR 31, PR 32, PR 38, PR 39, PR 47, PR 48, PR 48:1, PR 48:2, PR 48:3, PR 48:4, PR 49, PR 49:1, PR 49:2, PR 52:1, PR 52:2, PR 53, PR 53:1, PR 57, PR 57:1, PR 57:2, PR 58:4, PR 60, PR 60:1, PR 61, PR 62, PR 63, PR 63:1, PR 69, PR 81, PR 81:1, PR 81:2, PR 81:3, PR 81:4, PR 83, PR 83:1, PR 83:3, PR 85, PR 88, PR 89, PR 90, PR 90:1, PR 101, PR 101:1, PR 102, PR 103, PR 104, PR 105, PR 106, PR 107, PR 108, PR 108:1, PR 109, PR 112, PR 113, PR 113:1, PR 114, PR 119, PR 120, PR 121, PR 122, PR 123, PR 139, PR 144, PR 146, PR 147, PR 148, PR 149, PR 150, PR 160, PR166, PR 168, PR 169, PR 170, PR 170:1, PR 171, PR 172, PR 173, PR 174, PR 175, PR 176, PR 177, PR 178, PR 179, PR 180, PR 181, PR 183, PR 184, PR 185, PR 187, PR 188, PR 190, PR 192, PR 193, PR 194, PR197; PR 200, PR 202, PR 204, PR 206, PR 207, PR 208, PR 209, PR 210, PR 211, PR 212, PR 213, PR214, PR 216, PR220 PR221, PR 223, PR 224, PR 226, PR 230, PR 231, PR 232, PR 233, PR 235, PR 236, PR 238, PR 239, PR 242, PR 243, PR 245, PR 251, PR 252, PR 253, PR 254, PR 255, PR 256, PR 257, PR 258, PR 259, PR 260, PR 262, PR 264, PR 265, PR 266, PR 268, PR 269, PR 270, PR 271, PR 272, PR 273, PR 274, PR 275, PR 276, PR 279, PR 282, PR 286, PR 287, and PR 288.

In some embodiments, the composition is orange, and the color index name is selected from the group consisting of NO 2. NO 4, NO 5, NO 6, PO 1, PO 2, PO 3, PO 5, PO 13, PO 16, PO 17, PO 17:1, PO 20, PO 20:1, PO 22, PO 21, PO 21:1, PO 23, PO 23:1, P031, PO 34, PO 36, PO 38, PO 40, PO 41, PO 43, PO 45, PO 46, PO 47, PO 48, PO 49, PO 51, PO 52, PO 53, PO 59, PO 60, PO 61, PO 62, PO 64, PO 65, PO 66, PO 67, PO 68, PO 69, PO 71, PO 72, PO 73, PO 74, PO 75, PO 77, PO 78, PO 79, PO 80, PO 81, PO 82; PO 84, PO 85, and PO 86.

In some embodiments, the composition is yellow, and the color index name is selected from the group consisting of NY 2, NY 3, NY 6, NY8, NY 10. NY 11, NY 12, NY 13, NY 14, NY 20, NY 24, PY 1, PY 1:1, PY 2, PY 3, PY 4, PY 5, PY 6, PY 9, PY 10, PY 12. PY 13, PY 14, PY 16, PY 17, PY 21, PY 24, PY 30, PY 31, PY 32, PY 33, PY 34, PY 34:1, PY 35, PY 35:1, PY 36, PY 36:1, PY 37, PY 37:1, PY 38, PY 39, PY 39, PY 40, PY 41, PY 42, PY 43 PY44, PY45, PY 46, PY 47, PY 48, PY 53, PY 55, PY 61, PY 62, PY 62:1, PY 63, PY 65, PY 73, PY 74, PY 75, PY 77, PY 81, PY 83, PY 87, PY 93, PY 94, PY 95, PY 97, PY 98, PY 100, PY 101, PY 104, PY 105, PY 108, PY 109, PY 110, PY 111, PY 112, PY 113, PY 115, PY 116. PY 117, PY 118, PY 119, PY 120, PY 126, PY 127, PY 127:1, PY 128, PY 129, PY 130, PY 133, PY 134, PY 136, PY 137, PY138, PY 139, PY 147, PY 148, PY 150, PY 151, PY 152, PY 153, PY 154, PY 155, PY 156, PY 172, PY 173, PY 174, PY 175, PY 176, PY 179, PY 180, PY 181, PY 182, PY 183, PY 184, PY 185, PY 188, PY 189, PY 190, PY 191, PY 191:1, PY 192, PY 193. PY 194, PY 200, PY 203, PY 204, PY 207, PY213 PY 216, PY 219, PY 223, PY 224, PY 226, and PY227.

In some embodiments, the composition is green, and the color index name is selected from the group consisting of NG-1, NG-2, PG-1, PG-2, PG-4, PG-7, PG-8, PG-10, PG-13, PG-14, PG-15, PG-16, PG-17, PG-17 Blk, PG-18, PG-19, PG-20, PG-21, PG-22, PG-23, PG-24, PG-26, PG-36, PG-38, PG-39, PG-41, PG-42, PG-45, PG-48, PG-50, PG-51, PG-55, and PG-56.

In some embodiments, the composition is blue, and the color index name is selected from the group consisting of NB 1, NB 2, PB 1, PB 1:2; PB 9, PB 15; PB 15:1, PB 15:2, PB 15:3, PB 15:4, PB 15:6, PB 16, PB 17, PB 17:1, PB22, PB 24, PB 25, PB 27, PB 28, PB 29, PB 30, PB 31, PB 34, PB 35; PB 36; PB 36:1, PB 50 Nada, PB 60, PB 61, PB 61:1, PB 62, PB 63, PB 66, PB 68, PB 71, PB 72, PB 73, PB 74, PB 75, PB 76, PB 79, PB 80, PB 81, PB 82, PB 84, PB 86, and PB 128.

In some embodiments, the composition is violet, and color index name is selected from the group consisting of NV 1, PV 1, PV 1:1, PV 1:2, PV 2, PV 2:2, PV 3, PV 3:1, PV 3:3 PV 5, PV 5:1, PV 7, PV 13, PV 14, PV 15, PV 16, PV 18, PV 19, PV 23, PV 25, PV 27, PV 29, PV 31, PV 32, PV 36, PV 37, PV39, PV 42, PV 44, PV 47, PV 48, PV 49, PV 50, PV55, PV 58, and PV 171.

In some embodiments, the composition is brown, and the color index name is selected from the group consisting of NBk 6, NBr 3, NBr 6, NBr 7, NBr 8, NBr 9, NBr 11, PBr 1, PBr 6, PBr 7, PBr 8, PBr 9, PBr 10, PBr 11, PBr 12, PBr 22, PBr 23, PBr 24, PBr 25, PBr 27, PBr 29, PBr 30, PBr 31, PBr 33, PBr 34, PBr 35, PBr 37, PBr 39, PBr 40, PBr 41, PBr 42; PBr 43, PBr 44, PBr 45, PBr 46, and PBr48.

In some embodiments, the composition is black, and the color index name is selected from the group consisting of NBk 1, NBk 2, NBk 3, NBk 4, NBk 6, PBk 1, PBk 6, PBk 7, PBk 8, PBk 9, PBk 10, PBk 11, PBk 12, PBk 13, PBk 14, PG 17 Blk, PBk 17, PBk 18, PBk 19, PBk 22, PBk 23, PBk 24, PBk 25, PBk 26, PBk 27, PBk 28, PBk 29, PBk 30, PBk 31, PBk 32, PBk 33, PBk 34, and PBk 35.

In some embodiments, the composition is white, and the color index name is selected from the group consisting of NW 1, PW 1, PW 2. PW 3, PW 4, PW 5, PW 6, PW 6:1, PW 7, PW 8, PW 10, PW 11, PW 12, PW 13, PW 14, PW 15, PW 16, PW 17, PW 18, PW 18:1, PW 19, PW 20, PW 21, PW 22, PW 23, PW 24, PW 25, PW 26, PW 27, PW 28, PW 30, PW 32, and PW 33.

In some embodiments, the composition has a color that is classified by a Pantone color system.

The Pantone color system is a method for determining the hue of a colorant using a reference "Pantone book," available from Pantone LLC (USA). The Pantone book assigns a unique number for each color and simultaneously provides the corresponding color according to the Pantone color number.

In some such embodiments, the composition is red, and the composition has a Pantone color selected from the group consisting of Pantone 169-Pantone 171, Pantone 176-Pantone 227, Pantone 483-Pantone 485, Pantone 490-Pantone 510, Pantone 670-Pantone 680, Pantone 691-Pantone 711, Pantone 805-Pantone 806, Pantone 1765-Pantone 1955, Pantone 2365-Pantone 2385, Pantone 4985-Pantone 5035, and RAL 3000-RAL 3033.

In some such embodiments, the composition is orange, and the composition has a Pantone color selected from the group consisting of Pantone 148-Pantone 154, Pantone 156-Pantone 168, Pantone 172-Pantone 175, Pantone 470-Pantone 475, Pantone 486-Pantone 489, Pantone 712-Pantone 721, Pantone 804, Pantone 811, Pantone 1205-Pantone 1685, and RAL 2000-RAL 2013.

In some such embodiments, the composition is yellow, and the composition has a Pantone color selected from the group consisting of Pantone 100-Pantone 147, Pantone 155, Pantone 379-Pantone 380, Pantone 386-Pantone 388, Pantone 393-Pantone 399, Pantone 454-Pantone 461, Pantone 585-Pantone 620, Pantone 803, Pantone 809-Pantone 810, Pantone 3935-Pantone 3985, and RAL 1000-RAL 1037.

In some such embodiments, the composition is green, and the composition has a Pantone color selected from the group consisting of Pantone 315-Pantone 316, Pantone 321-Pantone 324, Pantone 327-Pantone 378, Pantone 381-Pantone 385, Pantone 389-Pantone 392, Pantone 553-Pantone 584, Pantone 621-Pantone 627, Pantone 802, Pantone 3385-Pantone 3435, Pantone 5463-Pantone 5747, Pantone 7478-Pantone 7498, and RAL 6000-RAL 6038.

In some such embodiments, the composition is blue, and the composition has a Pantone color selected from the group consisting of Pantone 277-Pantone 314, Pantone 317-Pantone 320, Pantone 325-Pantone 326, Pantone 532-Pantone 552, Pantone 628-Pantone 662, Pantone 801, Pantone 808, Pantone 2702-Pantone 2708, Pantone 2717-Pantone 2718, Pantone 2727-Pantone 2728, Pantone 2747-Pantone 2748, Pantone 2757-Pantone 2758, Pantone 2767-Pantone 2768, Pantone 2905-Pantone 3165, Pantone 3242-Pantone 3278, Pantone 5395-Pantone 5435, Pantone 7453-Pantone 7477, Pantone 7541-Pantone 7547, and RAL 5000-RAL 5026.

In some such embodiments, the composition is purple, and the composition has a Pantone color selected from the group consisting of Pantone 228-Pantone 275, Pantone 511-Pantone 531, Pantone 663-Pantone 669, Pantone 681-Pantone 690, Pantone 807, Pantone 813-Pantone 814, Pantone 2395-Pantone 2695, Pantone 2715, Pantone 2725, Pantone 2735-Pantone 2746, Pantone 5115-Pantone 5315, and RAL 4001-RAL 4012.

In some embodiments, the color of the composition is selected based on design preferences, material constraints, desired operating temperatures, and/or other manufacturing or application parameters.

In some embodiments, the composition comprises a single colorant. In some embodiments, the composition comprises two or more colorants. In some embodiments, the composition comprises two or more, three or more, four or more, five or more, six or more, seven or more, eight or more, nine or more, or ten or more colorants. Addition of multiple colorants can be performed, for example, to achieve a desired hue from a mixture of colors.

In some embodiments, the composition comprises no colorants. In some such embodiments, the composition is white or near-white.

In some embodiments, the color of the composition is determined by visual comparison of the composition to a reference (e.g., the Colour Index and/or the Pantone Book). In some embodiments, the color of the composition is selected using the color of the unapplied (e.g., wet) composition as the target color. In some embodiments, the color of the composition is selected using the color of the applied (e.g., dry) composition as the target color. For example, in some instances, the color of the unapplied (e.g., wet) composition can be different from the color of the applied (e.g., dry) composition.

In some embodiments, the colorant is present in an amount of from about 0.001% to about 50% by weight. In some embodiments, the colorant is present in an amount of from about 0.001% to about 1% by weight. In some embodiments, the colorant is present in an amount of from about 0.01% to about 0.5% by weight.

In some embodiments, the colorant is present in an amount of at least 0.0005%, at least 0.0006%, at least 0.0007%, at least 0.0008%, at least 0.0009%, at least 0.001%, at least 0.002%, at least 0.003%, at least 0.004%, at least 0.005%, at least 0.006%, at least 0.007%, at least 0.008%, at least 0.009%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, or at least 10% by weight. In some embodiments, the colorant is present in an amount of at least 15%, at least 20%, at least 25%, at least 30%, at least 35%, at least 40%, at least 45%, or at least 50% by weight.

In some embodiments, the colorant is present in an amount of no more than 75%, no more than 50%, no more than 45%, no more than 40%, no more than 35%, no more than 30%, no more than 25%, no more than 20%, no more than 15%, no more than 10%, no more than 5%, no more than 4%, no more than 3%, no more than 2%, no more than 1%, no more than 0.9%, no more than 0.8%, no more than 0.7%, no more than 0.6%, no more than 0.5%, no more than 0.4%, no more than 0.3%, no more than 0.2%, no more than 0.1%, no more than 0.09%, no more than 0.08%, no more than 0.07%, no more than 0.06%, no more than 0.05%, no more than 0.04%, no more than 0.03%, no more than 0.02%, or no more than 0.01% by weight.

In some embodiments, the colorant is present in an amount of from about 0.0005% to about 40%, from about 0.0005% to about 25%, from about 10% to about 40%, from about 0.01% to about 10%, from about 0.1% to about 20%, or from about 0.05% to about 5%, by weight. In some embodiments, the colorant is present in an amount falling within another range starting no lower than about 0.0005% by weight and ending no higher than about 75% by weight.

In some embodiments, the colorant added to the composition can be adjusted in order to achieve a desired shade of a given color. For example, different shades of a respective color can be obtained by using different color products (e.g., of specific shades), by selecting pigments with varying levels of transparency (e.g., of the respective color), and/or by increasing or decreasing the amount by weight of the colorant in the composition. For instance, a lighter shade of a respective color can be achieved by decreasing the amount by weight of the colorant in the composition, and a darker shade of the respective color can be achieved by increasing the amount by weight of the colorant in the composition. Other methods of combining, adjusting, and metering amounts of colorants to achieve desired hues are possible, as will be apparent to one skilled in the art.

Dispersants

In some embodiments, the asphalt-based sealcoat composition comprises a dispersant. In some embodiments, the asphalt-based sealcoat composition does not comprise a dispersant.

In some embodiments, the dispersant is present in an amount of about 0.01% to about 10% by weight. In some embodiments, the dispersant is present in an amount of from about 0.05% to about 3% by weight. In some embodiments, the dispersant is present in an amount of from about 0.09% to about 1% by weight. In some embodiments, the dispersant is present in an amount of from about 0.1% to about 0.5% by weight.

In some embodiments, the dispersant is present in an amount of at least 0.001%, at least 0.002%, at least 0.003%, at least 0.004%, at least 0.005%, at least 0.006%, at least 0.007%, at least 0.008%, at least 0.009%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 11%, at least 12%, at least 13%, at least 14%, or at least 15% by weight.

In some embodiments, the dispersant is present in an amount of no more than 20%, no more than 15%, no more than 10%, no more than 9%, no more than 8%, no more than 7%, no more than 6%, no more than 5%, no more than 4%, no more than 3%, no more than 2%, no more than 1%, no more than 0.9%, no more than 0.8%, no more than 0.7%, no more than 0.6%, no more than 0.5%, no more than 0.4%, no more than 0.3%, no more than 0.2%, no more than 0.1%, no more than 0.09%, no more than 0.08%, no more than 0.07%, no more than 0.06%, no more than 0.05%, no more than 0.04%, no more than 0.03%, no more than 0.02%, or no more than 0.01% by weight.

In some embodiments, the dispersant is present in an amount of from about 0.05% to about 5%, from about 0.1% to about 15%, from about 0.2% to about 10%, from about 0.001% to about 2%, from about 0.01% to about 1%, from about 0.05 to about 0.1, from about 0.03 to about 0.5, or from about 0.5% to about 3% by weight. In some embodiments, the dispersant is present in an amount falling within another range starting no lower than about 0.001% by weight and ending no higher than about 20% by weight.

In some embodiments, the dispersant comprises a single type of dispersant. In some embodiments, the dispersant comprises a plurality of types of dispersant. In some embodiments, where the composition comprises a plurality of types of dispersant, each type of dispersant in the plurality of types of dispersant is present in an amount (e.g., percent by weight) disclosed herein. In some such embodiments, each type of dispersant in the plurality of types of dispersant is present in the same amount (e.g., percent by weight) relative to the composition. In some such embodiments, two or more types of dispersant in the plurality of types of dispersant are present in different amounts (e.g., percent by weight) relative to the composition. In some embodiments, where the composition comprises a plurality of types of dispersant, the amount of dispersant present in the composition (e.g., as disclosed herein) indicates the total amount of dispersant in the plurality of types of dispersant.

In some embodiments, the dispersant is used to disperse colorants (e.g., pigments) in the composition. In some embodiments, the dispersant is used to disperse $TiO_2$ in the composition. In some embodiments, the dispersant is mixed with a colorant to disperse (e.g., homogenize) the colorant prior to adding the dispersant and the colorant to the composition. In some embodiments, the dispersant is mixed with $TiO_2$ particles to disperse (e.g., homogenize) the $TiO_2$ particles prior to adding the dispersant and the $TiO_2$ particles to the composition. In some embodiments, the dispersant is supplied pre-reacted with the colorant (e.g., from a colorant supplier). In some embodiments, the dispersant and the colorant are separately obtained prior to mixing the dispersant with the colorant.

In some embodiments, the dispersant contributes to the stability of the composition. For instance, in some embodiments, a dispersant is used to stabilize an asphalt emulsion. In some implementations, stabilization advantageously allows for a wider variety of asphalt sources, improved product stability, and better control of drying and reactivity. In some embodiments, the dispersant contributes to the pH stability of the composition.

In some embodiments, the dispersant is selected from the group consisting of polyacrylic acid, copolymers, polyurethanes, polyacrylates, star-shaped dispersing polymers, block copolymers, controlled free radical polymerization (CFRP), and amines. In some embodiments, the dispersant is 2-amino-2-methyl-1-propanol. For instance, in some embodiments, the dispersant is any dispersant suitable for the preparation of asphalt-based compositions, as will be apparent to one skilled in the art.

In some embodiments, the dispersant is selected depending on the colorant that is to be dispersed throughout the composition. For instance, a recommended type of dispersants can depend on the surface characteristics of the desired pigment. Thus, different dispersants can exhibit different levels of effectiveness for different pigments. Accordingly, in some embodiments, the colorant is an organic pigment (e.g., aromatic compounds), and the dispersant contains phenyl or naphthyl groups. In some embodiments, the colorant is an inorganic pigment (e.g., oxides, sulfides, silicates, etc.), and the dispersant contains acidic groups (e.g., phosphate, carboxy, and/or sulfate). In some embodiments, the colorant is carbon black (e.g., diazonium reactive), and the dispersant contains nitrogen.

Plasticizer

In some embodiments, the asphalt-based sealcoat composition comprises a plasticizer. In some embodiments, the asphalt-based sealcoat composition does not comprise a plasticizer.

In some embodiments, the plasticizer is present in an amount of about 0.1% to about 20% by weight. In some embodiments, the plasticizer is present in an amount of from about 0.5% to about 10% by weight. In some embodiments, the plasticizer is present in an amount of from about 1% to about 5% by weight. In some embodiments, the plasticizer is present in an amount of from about 1.2% to about 3% by weight.

In some embodiments, the plasticizer is present in an amount of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, or at least 20% by weight. In some embodiments, the plasticizer is present in an amount of no more than 25%, no more than 24%, no more than 23%, no more than 22%, no more than 21%, no more than 20%, no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, no more than 1%, no more than 0.9%, no more than 0.8%, no more than 0.7%, no more than 0.6%, or no more than 0.5% by weight.

In some embodiments, the plasticizer is present in an amount of from about 0.05% to about 5%, from about 0.1% to about 15%, from about 0.2% to about 10%, from about 0.3% to about 2%, from about 0.4% to about 1%, or from about 0.5% to about 3%, by weight. In some embodiments, the plasticizer is present in an amount falling within another range starting no lower than about 0.01% by weight and ending no higher than about 25% by weight.

In some embodiments, the plasticizer is selected from the group consisting of low molecular weight ortho phthalates, high molecular weight ortho phthalates, trimellitates, adipates, sebacates, glycerol triacetate, alkyl citrates, azelates, dibenzoates, terephthalates, gluterates, organophosphates, polycarboxylate ether, polycarboxylate, sulfonated naphthalene condensate, and sulfonated melamine formaldehyde. In some embodiments, the plasticizer is a low volatile organic compound (VOC) plasticizer.

In some embodiments, the plasticizer is any plasticizer suitable for the preparation of asphalt-based compositions, as will be apparent to one skilled in the art. For example, low molecular weight ortho phthalates include, but are not limited to, Diisobutyl phthalate (DIBP), Di-n-butyl phthalate (DBP), Butyl benzyl phthalate (BBzP), and/or Bis(2-ethylhexyl) phthalate (DEHP). High molecular weight ortho phthalates include, but are not limited to, Diisononyl phthalate (DINP), Bis(2-propylheptyl) phthalate (DPHP), Diisodecyl phthalate (DIDP), Diisoundecyl phthalate (DIUP), and/or Ditridecyl phthalate (DTDP). Trimellitates include, but are not limited to, Tri-(2-ethylhexyl)trimellitate (TEHTM)(TOTM), Tri-(isononyl)trimellitate (TINTM), Tri-(isodecyl)trimellitate (TIDTM), and/or Tri-(isotridecyl)trimellitate (TITDTM).

In some embodiments, the plasticizer comprises a single type of plasticizer. In some embodiments, the plasticizer comprises a plurality of types of plasticizer. In some embodiments, where the composition comprises a plurality of types of plasticizer, each type of plasticizer in the plurality of types of plasticizer is present in an amount (e.g., percent by weight) disclosed herein. In some such embodiments, each type of plasticizer in the plurality of types of plasticizer is present in the same amount (e.g., percent by weight) relative to the composition. In some such embodiments, two or more types of plasticizer in the plurality of types of plasticizer are present in different amounts (e.g., percent by weight) relative to the composition. In some embodiments, where the composition comprises a plurality of types of plasticizer, the amount of plasticizer present in the composition (e.g., as disclosed herein) indicates the total amount of plasticizer in the plurality of types of plasticizer.

In some embodiments, for example, plasticizers are used to promote softness, plasticity, and/or flexibility, and to reduce viscosity, friction, and/or brittleness in the asphalt-based sealcoat composition. In some implementations, plasticizers reduce the glass transition temperature of the asphalt-based sealcoat composition. Lower glass transition temperatures are beneficial in that they result in a more resilient, rubbery product with increased resistance to mechanical stress (e.g., cracking, elongation, fracture, and/or general film failure). This advantageously improves the ease with which the asphalt-based sealcoat composition forms a consistent film during drying.

Dirt-Resistance Additives

In some embodiments, the asphalt-based sealcoat composition further comprises a dirt-resistance additive. In some embodiments, the asphalt-based sealcoat composition does not comprise a dirt-resistance additive.

In some embodiments, the dirt-resistance additive is present in an amount of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, or at least 20% by weight.

In some embodiments, the dirt-resistance additive is present in an amount of no more than 25%, no more than 24%, no more than 23%, no more than 22%, no more than 21%, no more than 20%, no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, no more than 1%, no more than 0.9%, no more than 0.8%, no more than 0.7%, no more than 0.6%, or no more than 0.5% by weight.

In some embodiments, the dirt-resistance additive is present in an amount of from about 0.05% to about 5%, from about 0.1% to about 15%, from about 0.2% to about 10%, from about 0.3% to about 2%, from about 0.4% to about 1%, or from about 0.5% to about 3%, by weight. In some embodiments, the dirt-resistance additive is present in an amount falling within another range starting no lower than about 0.01% by weight and ending no higher than about 25% by weight.

In some embodiments, the dirt-resistance additive is colloidal silica. In some embodiments, the dirt-resistance additive is methyl-o-benzoyl benzoate (MBB). In some embodiments, the dirt-resistance additive is a silane and/or epoxy-silane crosslinking additive. In some embodiments, the dirt-resistance additive is an epoxy functional silane oligomer. Suitable embodiments for dirt-resistance additives contemplated for use in the present disclosure are further disclosed in, e.g., U.S. patent application Ser. No. 16/910,743, filed Jun. 24, 2020, which is hereby incorporated herein by reference in its entirety.

The compositions and various components disclosed herein are not intended to be limiting. For example, any of the compositions provided herein may be substituted, modified, added, subtracted, and/or combined with any suitable component of asphalt-based sealcoat compositions, as will be apparent to one skilled in the art. Additional embodiments for asphalt-based sealcoat compositions and components of the same are contemplated, as further described in International Application No. PCT/US2018/066431, filed 19 Dec. 2018, and U.S. Provisional Patent Application No. 62/608,881, filed 21 Dec. 2017, each of which is hereby incorporated herein by reference in its entirety.

IV. Reflectance of Asphalt-Based Sealcoat Composition

In one aspect, the present disclosure relates to an asphalt-based sealcoat composition that is highly solar reflective. In some embodiments, the asphalt-based sealcoat has a Solar Reflectivity number (SR #) of at least about 0.10. In some embodiments, the asphalt-based sealcoat has a SR #of at least about 0.20. In some embodiments, the asphalt-based sealcoat has a SR #of at least about 0.30. In some embodiments, the asphalt-based sealcoat has a SR #of at least about 0.33. In some embodiments, the asphalt-based sealcoat has a SR #of about 0.33. In some embodiments, the asphalt-based sealcoat has a SR #of about 0.35.

In some embodiments, the asphalt-based sealcoat has a SR #of at least about 0.10, at least about 0.11, at least about 0.12, at least about 0.13, at least about 0.14, at least about 0.15, at least about 0.16, at least about 0.17, at least about 0.18, at least about 0.19, at least about 0.20, at least about 0.21, at least about 0.22, at least about 0.23, at least about 0.24, at least about 0.25, at least about 0.26, at least about 0.27, at least about 0.28, at least about 0.29, at least about 0.30, at least about 0.31, at least about 0.32, at least about 0.33, at least about 0.34, at least about 0.35, at least about 0.36, at least about 0.37, at least about 0.38, at least about 0.39, at least about 0.40, at least about 0.41, at least about 0.42, at least about 0.43, at least about 0.44, at least about 0.45, at least about 0.46, at least about 0.47, at least about 0.48, at least about 0.49, at least about 0.50, at least about 0.55, at least about 0.60, at least about 0.65, or at least about 0.70.

In some embodiments, the asphalt-based sealcoat has a SR #of from about 0.20 to about 0.60. In some embodiments, the asphalt-based sealcoat has a SR #of from about 0.10 to about 0.45, from about 0.20 to about 0.40, from about 0.25 to about 0.38, from about 0.30 to about 0.36, from about 0.30 to about 0.50, from about 0.35 to about 0.45, from about 0.42 to about 0.50, or from about 0.45 to about 0.65. In some embodiments, the asphalt-based sealcoat has a SR #that falls within another range starting no lower than 0.10 and ending no higher than 0.70.

In some embodiments, the asphalt-based sealcoat has Solar Reflective Index (SRI #) of at least about 10. In some embodiments, the asphalt-based sealcoat has an SRI #of at least about 20. In some embodiments, the asphalt-based sealcoat has an SRI #of at least about 30. In some embodiments, the asphalt-based sealcoat has an SRI #of at least about 33. In some embodiments, the asphalt-based sealcoat has an SRI #of at least about 35.

In some embodiments, the asphalt-based sealcoat has a SRI #of at least about 10, at least about 11, at least about 12, at least about 13, at least about 14, at least about 15, at least about 16, at least about 17, at least about 18, at least about 19, at least about 20, at least about 21, at least about 22, at least about 23, at least about 24, at least about 25, at least about 26, at least about 27, at least about 28, at least about 29, at least about 30, at least about 31, at least about 32, at least about 33, at least about 34, at least about 35, at least about 36, at least about 37, at least about 38, at least about 39, at least about 40, at least about 41, at least about 42, at least about 43, at least about 44, at least about 45, at least about 46, at least about 47, at least about 48, at least about 49, at least about 50, at least about 55, at least about 60, at least about 65, or at least about 70.

In some embodiments, the asphalt-based sealcoat has an SRI #of from about 20 to about 60. In some embodiments, the asphalt-based sealcoat has an SRI #of from about 10 to about 45, from about 20 to about 40, from about 25 to about 38, from about 30 to about 36, from about 30 to about 50, from about 35 to about 45, from about 42 to about 50, or from about 45 to about 65. In some embodiments, the asphalt-based sealcoat has an SRI #that falls within another range starting no lower than 10 and ending no higher than 70.

In some embodiments, the asphalt-based sealcoat has an emissivity of at least about 0.70. In some embodiments, the asphalt-based sealcoat has an emissivity of at least about 0.80. In some embodiments, the asphalt-based sealcoat has an emissivity of at least about 0.90. In some embodiments, the asphalt-based sealcoat has an emissivity of at least about 0.92. In some embodiments, the asphalt-based sealcoat has an emissivity of about 0.92. In some embodiments, the asphalt-based sealcoat has an emissivity of from about 0.70 to about 0.99.

In some embodiments, the asphalt-based sealcoat composition reduces surface temperatures of asphalt treated with the asphalt-based sealcoat composition compared to asphalt not treated with asphalt-based sealcoat composition.

In some embodiments, the reflectance of the asphalt-based sealcoat composition is determined using a pyrometer at different times of day over a two-month period according to ASTM E1918-16, Standard Test Method for Measuring Solar Reflectance of Horizontal and Low-Sloped Surfaces in the Field, ASTM International, West Conshohocken, PA, 2016, www.astm.org. Due to the varying position and angle of the sun during these times, this allows measurements of multiple different areas within test sections of the asphalt-based sealcoat composition.

In some embodiments, the reflectance and thermal emissivity of the asphalt-based sealcoat composition is determined by subjecting a core of a section of the composition to ASTM C 1549 (ASTM C1549-16, "Standard Test Method for Determination of Solar Reflectance Near Ambient Temperature Using a Portable Solar Reflectometer," ASTM International, West Conshohocken, PA, 2016, www.astm.org) and ASTM C1371 (ASTM C1371-15, "Standard Test Method for Determination of Emittance of Materials Near Room Temperature Using Portable Emissometers," ASTM International, West Conshohocken, PA, 2015, www.astm.org), respectively. SRI values can then be calculated according to ASTM E1980-11 ("Standard Practice for Calculating Solar Reflectance Index of Horizontal and Low-Sloped Opaque Surfaces," ASTM International, West Conshohocken, PA, 2001, www.astm.org).

In some implementations, the asphalt-based sealcoat composition has an SRI #that satisfies LEED requirements while using low amounts of $TiO_2$ particles. Further details on LEED requirements are disclosed in, e.g., "LEED ND: Plan v4-LEED v4 Heat island reduction," available on the Internet at usgbc.org/credits/neighborhood-development-plan-neighborhood-development/v4-draft/gibc-9, which is hereby incorporated herein by reference in its entirety. As described above, the reduction in the amount of $TiO_2$ particles can be supplemented by low-cost materials, such as extenders or fillers.

In some such implementations, the asphalt-based sealcoat compositions advantageously reduce the cost of sealcoat compositions while maintaining high solar reflectivity and thus reducing surface temperatures of asphalt treated with the asphalt-based sealcoat compositions compared to asphalt not treated with asphalt-based sealcoat compositions. Accordingly, in some implementations, the asphalt-based sealcoat composition includes $TiO_2$ particles present in an amount of no more than 30% by weight and has an SRI # of at least 30. In some implementations, the asphalt-based sealcoat composition includes $TiO_2$ particles present in an amount of no more than 20% by weight and has an SRI # of at least 33. In some implementations, the asphalt-based sealcoat composition includes $TiO_2$ particles present in an amount of no more than 15% by weight and has an SRI # of at least 35.

In some embodiments, the asphalt-based sealcoat composition includes $TiO_2$ particles present in an amount of no more than 35%, no more than 30%, no more than 25%, no more than 20%, or no more than 15% by weight and has an SRI # of at least 23, at least 25, at least 30, at least 33, or at least 35. In an example embodiment, the asphalt-based sealcoat composition includes $TiO_2$ particles present in an amount of about 10% by weight and has an SRI # of about 38.

In some embodiments, the asphalt-based sealcoat composition further includes a pigment. In some embodiments, the pigment is present in an amount of from about 0.01% to about 5% by weight. In some embodiments, the pigment is present in an amount of from about 0.05% to about 1% by weight. In some embodiments, the pigment is present in an amount of from about 0.1% to about 0.5% by weight. In some embodiments, the pigment is present in an amount of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, or at least 10% by weight. In some embodiments, the pigment is present in an amount of no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, no more than 1%, no more than 0.9%, no more than 0.8%, no more than 0.7%, no more than 0.6%, or no more than 0.5% by weight. In some embodiments, the pigment is present in an amount of from about 0.05% to about 5%, from about 1% to about 5%, from about 0.2% to about 10%, from about 0.3% to about 2%, from about 0.4% to about 1%, or from about 0.5% to about 3%, by weight. In some embodiments, the pigment is present in an amount falling within another range starting no lower than about 0.01% by weight and ending no higher than about 15% by weight.

Generally, as described above, pigments refer to inorganic or organic colorants with little to no solubility in most application mediums (e.g., compositions). Accordingly, in some embodiments, the pigment is organic or inorganic. In some embodiments, the pigment is opaque or transparent. In some embodiments, the pigment is an inorganic, opaque pigment. In some embodiments, the pigment is an organic, transparent pigment. In some embodiments, the pigment is an inorganic, transparent pigment. In some embodiments, the pigment is an organic, opaque pigment.

In some embodiments, the pigment is infrared (IR) or near-infrared (NIR) reflective. In some embodiments, the pigment is a dark-colored pigment. In some such implementations, the pigment is an infrared reflective, dark pigment. Darkly pigmented asphalt-based sealcoat compositions may be desirable for various applications where paving is typically dark, such as roads, parking lots, driveways, and/or roofing. As such, dark pigments can provide greater functionality to asphalt-based sealcoat compositions by facilitating visual compatibility and consistency upon application to existing paved surfaces.

Advantageously, dark pigments have been reported to exhibit high infrared or near infrared reflectance in the electromagnetic spectrum. For example, in some embodiments, products containing IR-reflective dark pigments have been reported to exhibit IR reflectance on a scale comparable to that produced by white-pigmented products. See, e.g., Miller et al., 2004, "Special Infrared Reflective Pigments Make a Dark Roof Reflect Almost Like a White Roof," in Thermal Performance of the Exterior Envelopes of Buildings, IX, proceedings of ASHRAE THERM VIII, Clearwater, FL, which is hereby incorporated herein by reference in its entirety.

Accordingly, the presently disclosed compositions and methods include dark-pigmented asphalt-based sealcoat compositions that maintain high solar reflectivity and can also be applied in situations where a dark color is preferred. For example, as described above, it may be desirable to maintain a consistent color or shading when applying sealcoat compositions to paved surfaces such as roads, playgrounds, parking lots, and/or driveways.

In some embodiments, the pigment is selected from the group consisting of red iron oxides, yellow iron oxides, phthalocyanine blue, paliogen black, chromic oxides ($Cr_2O_3$), ferric oxides ($Fe_2O_3$), white titanates, yellow titanates, green titanates, brown titanates, brown iron oxides, cadmium orange, cadmium yellow, and chromium iron oxides. In some embodiments, the pigment is Chromium Green-Black Hematite.

In some implementations, the pigment is black and/or brown. In some such implementations, the pigment is selected from the group consisting of [B01] Carbon Black, [B02] Ivory Black, [B03] Copper Chromite Black, [B04] Mars Black, [B05] Chrome Iron Nickel Black Spinel, [B06] Chromium Green-Black Hematite, [B07] Chromium Green-Black Hematite Modified (i), [B08] Chromium Green-Black Hematite Modified (ii), [B09] Chromium Green-Black Hematite Modified (iii), [B10] Chromium Iron Oxide (i), [B11] Chromium Iron Oxide (ii), [B12] Perylene Black, [B13] Burnt Sienna, [B14] Raw Sienna, [B15] Raw Umber, [B16] Iron Titanium Brown Spinel (i), [B17] Iron Titanium Brown Spinel (ii), [B18] Iron Titanium Brown Spinel (iii), [B19] Manganese Antimony Titanium Buff Rutile, [B20] Zinc Iron Chromite Brown Spinel (i), and [B21] Zinc Iron Chromite Brown Spinel (ii).

In some implementations, the pigment is blue and/or purple. In some such implementations, the pigment is selected from the group consisting of [U01] Cobalt Aluminate Blue Spinel (i), [U02] Cobalt Aluminate Blue Spinel (ii), [U03] Cobalt Aluminate Blue Spinel (iii), [U04] Cobalt Aluminum Blue, [U05] Cobalt Blue, [U06] Cerulean Blue, [U07] Cobalt Chromite Blue, [U08] Cobalt Chromite Blue-Green Spinel (i), [U09] Cobalt Chromite Blue-Green Spinel (ii), [U10] Prussian Blue, [U11] French Ultramarine Blue, [U12] Phthalo Blue (i), [U13] Phthalo Blue (ii), and [U14] Dioxazine Purple.

In some implementations, the pigment is green. In some such implementations, the pigment is selected from the group consisting of [G01] Chrome Green, [G02] Chromium Oxide Green, [G03] Chromium Green-Black Modified, [G04] Cobalt Chromite Blue-Green Spinel (iii), [G05] Cobalt Chromite Green Spinel (i), [G06] Cobalt Chromite Green Spinel (ii), [G07] Cobalt Teal, [G08] Cobalt Titanate Green Spinel (i), [G09] Cobalt Titanate Green Spinel (ii), [G10] Phthalo Green (i), and [G11] Phthalo Green (ii).

In some implementations, the pigment is red and/or orange. In some such implementations, the pigment is selected from the group consisting of [R01] Red Iron Oxide (i), [R02] Red Iron Oxide (ii), [R03] Red Iron Oxide (iii), [R04] Red Oxide, [R05] Cadmium Orange, [R06] Acra Burnt Orange, [R07] Acra Red, [R08] Monastral Red, and [R09] Naphthol Red Light.

In some implementations, the pigment is yellow. In some such implementations, the pigment is selected from the group consisting of [Y01] Yellow Oxide, [Y02] Cadmium Yellow Light, [Y03] Chrome Yellow, [Y04] Chrome Antimony Titanium Buff Rutile (i), [Y05] Chrome Antimony Titanium Buff Rutile (ii), [Y06] Chrome Antimony Titanium Buff Rutile (iii), [Y07] Chrome Titanate Yellow, [Y08] Nickel Antimony Titanium Yellow Rutile (i), [Y09] Nickel Antimony Titanium Yellow Rutile (ii), [Y10] Nickel Antimony Titanium Yellow Rutile (iii), [Y11] Nickel Titanate Yellow, [Y12] Primer, [Y13] Yellow Medium Azo, and [Y14] Yellow Orange Azo.

In some implementations, the pigment is pearlescent. In some such implementations, the pigment is selected from the group consisting of [P01] Bright Gold (Pearlescent), [P02] Bright White (Pearlescent), [P03] Interference Blue, [P04] Interference Gold, [P05] Interference Green, [P06] Interference Orange, [P07] Interference Red, [P08] Interference Violet, [P09] Iridescent White, [P10] Brass (Pearlescent), [P11] Bright Bronze (Pearlescent), [P12] Bright Copper (Pearlescent), [P13] Rich Bronze, and [P14] Russet (Pearlescent).

Pigments suitable for use in the present disclosure are further described in, e.g., Levinson et al., 2005, "Solar spectral properties of pigments, or how to design a cool nonwhite coating," presented at Cool Roofing—Cutting Through the Glare, available on the Internet at coolcolors.lbl.gov/assets/docs/OtherTalks/HowToDesignACoolNonwhiteCoating.pdf.

V. Reducing Atmospheric Pollutants with an Asphalt-Based Sealcoat Composition It has been found that titanium dioxide ($TiO_2$) nanoparticles can absorb the ultraviolet component of sunlight, acting as a catalyst to form reactive hydroxyl (OH) radicals in the presence of atmospheric moisture. These radicals have been found to oxidize and destroy most pollutant molecules.

The present technology, in some embodiments, is a method of reducing nitrogen oxides (NOx), volatile organic compounds (VOC), and other pollutants by an asphalt-based sealcoat composition comprising high levels of titanium oxide particles. The titanium oxide particles form a photocatalytic layer within the asphalt surface that oxidizes NOx and other pollutants when the treated asphalt surface is exposed to ultraviolet sunlight and airborne $H_2O$ molecules. This process chemically alters the aforementioned pollutants, rendering them non-hazardous to the environment.

$TiO_2$ is a semiconductor material that when exposed to ultraviolet (UV) radiation, as from sunlight, expels an electron from the valence band to the conduction band, leaving behind a positively charged hole. In the presence of water, as in atmospheric humidity, these positively charged holes create hydroxyl radicals as shown:

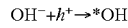
$$OH^- + h^+ \rightarrow {}^*OH$$

The hydroxyl radicals in turn oxidize nitrogen oxides as follows:

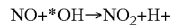
$$NO + {}^*OH \rightarrow NO_2 + H+$$

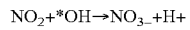
$$NO_2 + {}^*OH \rightarrow NO_{3-} + H+$$

Other reactive effects occur with volatile organic compounds (VOC) and some other pollutants. Since $TiO_2$ functions as a catalyst and is not consumed in the reaction, the photocatalytic effect continues. If the $TiO_2$ is in place at the surface of an asphalt roadway, it removes a significant quantity of NOx and VOCs from the environment nearest their source.

In one aspect, the present disclosure relates to an asphalt-based sealcoat composition that reduces pollutants. In some embodiments, the asphalt-based sealcoat composition reduces atmospheric pollutants including an amount of nitrogen oxides (NOx) and volatile organic compounds (VOC) via photocatalytic reactions. In some embodiments, the asphalt-based sealcoat composition is highly solar reflective and reduces asphalt surface temperatures and pollutants. In some embodiments, the asphalt-based sealcoat composition has a SR (Solar Reflectivity) # of at least about 0.33 and reduces asphalt surface temperatures and pollutants. Moreover, in some embodiments, the asphalt-based sealcoat composition degrades dirt, grime, and/or debris that comes into contact with the asphalt-based sealcoat composition. For instance, as described above, in some embodiments, the asphalt-based sealcoat composition comprises photocatalytic $TiO_2$, which provides a self-cleaning effect to the asphalt-based sealcoat composition. Without being bound to any one theory of operation, dirt, grime, and/or debris that accumulates on the asphalt based sealcoat composition can be degraded via exposure to the surface of photocatalytic $TiO_2$ and UV light. In some embodiments, the asphalt-based sealcoat composition degrades organic material and/or inorganic material.

In some embodiments, the titanium dioxide can act as a catalyst, which reacts with nitrogen oxides and other pollutants to chemically alter them into non-hazardous or less hazardous materials through photocatalytic oxidation (PCO) and/or reduction reaction.

In some embodiments, the techniques disclosed in Berdahl and Akbari, 2008, "Evaluation of Titanium Dioxide as a Photocatalyst for Removing Air Pollutants," California Energy Commission, PIER Energy-Related Environmental Research Program, CEC-500-2007-112, the references cited therein, and the appendices thereof, can be used to determine the amount by which the compositions of the present disclosure can reduce air pollutants such as nitrogen oxide.

VI. Preparation of Asphalt-Based Sealcoat Composition

In some embodiments, the asphalt-based sealcoat composition is prepared by mixing together a plurality of the components disclosed herein (e.g., selected from the group consisting of $TiO_2$ particles, asphalt emulsion, water, polymer, clay, sand, extender, fiber, aggregate, biocide, colorant, dispersant, plasticizer, and/or dirt-resistance additive). In some embodiments, the asphalt-based sealcoat composition is prepared by mixing together at least an asphalt emulsion, water, an extender, a polymer, clay, a colorant, and titanium oxide ($TiO_2$) particles present in an amount of about 10% to about 60% by weight.

In some embodiments, the asphalt-based sealcoat composition is prepared by mixing together one or more of $TiO_2$ particles (including, e.g., any of the embodiments and/or amounts disclosed herein, as in the section entitled "Titanium oxide," above), asphalt emulsion (including, e.g., any of the embodiments and/or amounts disclosed herein, as in the section entitled "Asphalt," above), water (including, e.g., any of the embodiments and/or amounts disclosed herein, as in the section entitled "Water," above), polymer (including, e.g., any of the embodiments and/or amounts disclosed herein, as in the section entitled "Polymer," above), clay (including, e.g., any of the embodiments and/or amounts disclosed herein, as in the section entitled "Clay," above), sand (including, e.g., any of the embodiments and/or amounts disclosed herein, as in the section entitled "Sand," above), extender (including, e.g., any of the embodiments and/or amounts disclosed herein, as in the section entitled "Extenders," above), fiber (including, e.g., any of the embodiments and/or amounts disclosed herein, as in the section entitled "Fiber," above), aggregate (including, e.g., any of the embodiments and/or amounts disclosed herein, as in the section entitled "Aggregates," above), biocide (including, e.g., any of the embodiments and/or amounts disclosed herein, as in the section entitled "Biocide," above), colorant (including, e.g., any of the embodiments and/or amounts disclosed herein, as in the section entitled "Colorant," above), dispersant (including, e.g., any of the embodiments and/or amounts disclosed herein, as in the section entitled "Dispersants," above), plasticizer (including, e.g., any of the embodiments and/or amounts disclosed herein, as in the section entitled "Plasticizer," above), and/or dirt-resistance additives (including, e.g., any of the embodiments and/or amounts disclosed herein, as in the section entitled "Dirt-Resistance Additives," above). In some embodiments, the asphalt-based sealcoat composition is prepared by further adding a pigment (including, e.g., any of the embodiments and/or amounts disclosed herein, as in the section entitled "Reflectance of asphalt-based sealcoat composition," above).

In some embodiments, the composition is prepared in a single mixing step.

In some embodiments, the composition is prepared in a plurality of mixing steps (e.g., phases).

In some embodiments, the composition is prepared by obtaining one or more intermediate mixtures. For example, intermediate mixtures can be obtained by mixing together two or more components of the composition in a separate step, prior to combining the intermediate mixture with the remaining components of the composition. In some embodiments, intermediate mixtures comprise any two or more components of the composition disclosed herein (e.g., $TiO_2$ particles, an asphalt emulsion, water, polymer, clay, sand, extender, fiber, aggregate, biocide, colorant, dispersant, plasticizer, and/or dirt-resistance additive). For example, an intermediate mixture can be an asphalt binder mixture comprising asphalt emulsion and polymer emulsion. In some embodiments, an intermediate mixture is a slurry comprising fiber, clay, water, and, optionally, sand. In some embodiments, an intermediate mixture comprises colorant and dispersant (e.g., to homogenize the colorant for dispersal throughout the asphalt-based sealcoat composition). In some embodiments, an intermediate mixture comprises $TiO_2$ particles and dispersant (e.g., to homogenize the $TiO_2$ particles for dispersal throughout the asphalt-based sealcoat composition), and, optionally, extender and/or pigment. For instance, in some implementations, the preparation comprises mixing a pigment with water and/or a dispersant, emulsifying the pigment to homogenize the pigment, and adding the intermediate mixture to the batch composition.

In some embodiments, a plurality of intermediate mixtures is obtained, and the plurality of intermediate mixtures are combined, together with any remaining components of the composition, to form the asphalt-based sealcoat composition. For instance, in some implementations, the preparation comprises (i) obtaining a first intermediate mixture comprising asphalt emulsion and polymer emulsion, a second intermediate mixture comprising fiber, clay, and water, and a third intermediate mixture comprising $TiO_2$ particles, dispersant, extender, and pigment, and (ii) combining the plurality of intermediate mixtures with the remaining components of the composition (e.g., sand, aggregate, plasticizer, colorant, and/or biocide).

An example asphalt-based sealcoat composition preparation is described as follows: Colored titanium dioxide pigmented asphalt emulsion is prepared by forming a slurry. The slurry comprises about 80.6% water by weight, about 2.9% by weight fiber, about 4.8% by weight sepiolite, and about 11.6% by weight clay. This slurry is used as a starting point to make the colored titanium dioxide pigmented asphalt emulsion. To the slurry is added a mixture of ingredients such that the final amount of the slurry after addition of these ingredients is about 22.3% by weight. One such ingredient added to the slurry is $TiO_2$, such that the final composition of $TiO_2$ in the product by weight after all ingredients are added is about 27.8% by weight. The $TiO_2$ is prepared by mixing the $TiO_2$ particles with water and a dispersant in an amount of 0.25% by weight relative to the amount of $TiO_2$. After the $TiO_2$ has been thoroughly mixed into the slurry, additional ingredients are added including an asphalt binder mixture comprising oil and polymer emulsion such that the composition of the titanium dioxide pigmented asphalt emulsion includes about 21.7% by weight oil (asphalt emulsion) and about 15% by weight polymer emulsion, and such that the amount of asphalt binder mixture in the colored titanium dioxide pigmented asphalt emulsion is about 36.75%. Additional components are then added, including an extender, an aggregate, and additional water, such that that the final composition of the extender, the aggregate, and the water in the product by weight after all ingredients are added are about 3%, 7.4%, and 22.7% by weight, respectively. In some embodiments, plasticizer and colorant are added to the product as desired using any of the amounts and/or ranges disclosed herein. The disclosed compositions can be made using comparable methods.

In another example preparation, titanium dioxide pigmented asphalt emulsion is prepared by forming a slurry. The slurry comprises between 75% to 85% water by weight, between 1% to 6% by weight fiber, and between 10% and 20% by weight clay. This slurry is used as a starting point to make the titanium dioxide pigmented asphalt emulsion. To the slurry is added a mixture of ingredients such that the final amount of the slurry after addition of these ingredients is between 20% and 30% by weight. One such ingredient added to the slurry is $TiO_2$, such that the final composition of $TiO_2$ in the product by weight after all ingredients are added is between 31% to about 40% by weight. Another such ingredient that is added to the slurry is sand, such that the final composition of sand in the product by weight after all ingredients are added is between 5% and 20% by weight. After the $TiO_2$ and sand have been thoroughly mixed into the slurry, additional ingredients are added including oil, latex, polymer emulsion and additional water such that the composition of the titanium dioxide pigmented asphalt emulsion includes between 5% and 40% oil (asphalt, e.g., CSS-1h), and between 4% and 20% by weight polymer emulsion.

In some embodiments, the components of the asphalt-based sealcoat composition are added to the product as desired using any of the embodiments, amounts, and/or ranges disclosed herein. The disclosed compositions can be made using any suitable methods or in any order as will be apparent to one skilled in the art. For instance, the order of addition can be modified to any other order logically possible.

In some embodiments, the asphalt-based sealcoat composition has a pH of at least 8, at least 9, at least 10, at least 11, at least 12, or at least 13. In some embodiments, the asphalt-based sealcoat composition has a pH of from about 8 to about 14. In some embodiments, the asphalt-based sealcoat composition has a pH of about 10.

In some embodiments, prior to adding the asphalt emulsion, a mixture containing all other components of the asphalt-based sealcoat composition has a pH of at least 5, at least 6, at least 7, at least 8, at least 9, at least 10, at least 11, or at least 12. In some embodiments, a mixture containing all other components of the asphalt-based sealcoat composition except the asphalt emulsion has a pH of from about 5 to about 12. In some embodiments, a mixture containing all other components of the asphalt-based sealcoat composition except the asphalt emulsion has a pH of about 8.

Accordingly, in some embodiments, the asphalt-based sealcoat composition comprises an anionic emulsion. Advantageously, anionic emulsions can provide longer term stability for storage and transportation but may impact the drying time of the applied sealcoat composition. As described above, the addition of materials that impart enhanced stability allows for a wider variety of asphalt sources that can be used in the composition, resulting in improved product stability for storage and transportation and better control of drying and reactivity.

In some embodiments, the asphalt-based sealcoat composition is stable (e.g., can be stored) for at least 90 days. In some embodiments, the asphalt-based sealcoat composition is stable for at least 2 years. In some embodiments, the asphalt-based sealcoat composition is stable for at least 1 day, at least 2, days, at least 3 days, at least 4 days, at least 5 days, at least 6 days, or at least 1 week. In some embodiments, the asphalt-based sealcoat composition is stable for at least 2 weeks, at least 3 weeks, at least 1 month, at least 2 months, at least 3 months, at least 6 months, at least 1 year, at least 2 years, at least 3 years, at least 4 years, or at least 5 years. In some embodiments, the asphalt-based sealcoat composition is stable for no more than 10 years, no more than 5 years, no more than 2 years, no more than 1 year, no more than 6 months, or no more than 3 months. In some embodiments, the asphalt-based sealcoat composition is stable for between 1 day and 1 month, between 1 month and 6 months, between 2 months and 2 years, or between 6 months and 5 years. In some embodiments, the asphalt-based sealcoat composition is stable for another period of time starting no lower than 1 day and ending no higher than 10 years.

In some embodiments, the composition is prepared using a vertical high sheer mixer and/or a colloid mill. In some embodiments, the composition is prepared mechanically and/or manually. In some embodiments, one or more mixing steps (e.g., phases) are prepared using a vertical high sheer mixer. For instance, in some embodiments, the preparation of the asphalt-based sealcoat composition includes performing an asphalt emulsion using a vertical high sheer mixer. In some embodiments, one or more mixing steps (e.g., phases) are prepared using a colloid mill. For instance, in some embodiments, the preparation of the asphalt-based sealcoat composition includes performing an asphalt emulsion using a colloid mill.

In some embodiments, the composition is prepared (e.g., mixed) prior to transport to the point of application (e.g., in a factory). In some embodiments, the composition is stored for a period of time before being transported to the point of application (e.g., for a period of time starting no lower than 1 day and ending no higher than 10 years, as described above).

In some implementations, one or more components are added at a point of application. For example, in some implementations, one or more components of the asphalt-based sealcoat composition are added to the mixture no more than a predetermined period of time prior to application. In some embodiments, the predetermined period of time is no more than 1 day, no more than 12 hours, no more than 6 hours, no more than 3 hours, no more than 1 hours, or no more than 30 minutes. In some embodiments, the predetermined period of time is at least 5 minutes, at least 10 minutes, at least 20 minutes, at least 30 minutes, at least 1 hour, or at least 6 hours. In some embodiments, the predetermined period of time is from 10 minutes to 30 minutes, from 10 minutes to 1 hour, from 30 minutes to 6 hours, from 30 minutes to 12 hours, or from 6 hours to 1 day. In some embodiments, the predetermined period of time falls within another range starting no lower than 5 minutes and ending no higher than 1 day.

Any suitable means for mixing and/or adding components of the asphalt-based sealcoat composition are contemplated, as will be apparent to one skilled in the art. In some embodiments, any suitable unit of measurement can be used for adding components to the composition (e.g., weight, volume). In some embodiments, the composition is scaled to any desired batch size.

In some embodiments, colored titanium oxide asphalt-based sealcoat compositions are prepared by adding a colorant at any point during the manufacturing process (e.g., during or after the addition of any of the components of the composition). In some embodiments, the colorant is added after the manufacturing process (e.g., to an uncolored or white base titanium oxide asphalt-based sealcoat composition). In some embodiments, the colorant is added in preparation for application (e.g., at an application site prior to treating an asphalt surface).

In some embodiments, the asphalt-based sealcoat composition has a weight (e.g., density) of at least 8.0, at least 8.5, at least 9.0, at least 9.5, at least 10.0, at least 10.5, at least 11.0, at least 11.2, at least 11.4, at least 11.5, at least 12.0, at least 12.5, at least 13.5, at least 14.0, at least 14.5, at least 15.0, at least 16.0, or at least 17.0 pounds per gallon. In some embodiments, the asphalt-based sealcoat composition has a weight of no more than 20.0, no more than 18.0, no more than 15.0, no more than 14.0, no more than 13.0, no more than 12.0, or no more than 11.0 pounds per gallon. In some embodiments, the asphalt-based sealcoat composition has a weight of from about 9.0 to about 12.0, from about 10.0 to about 14.0, from about 11.1 to about 11.8, from about 10.5 to about 13.5, or from about 8.0 to about 15.0 pounds per gallon. In some embodiments, the asphalt-based sealcoat composition has a weight falling within another range starting no lower than 8.0 pounds per gallon and ending no higher than 20.0 pounds per gallon. In some embodiments, the disclosed weights and/or weight ranges of the asphalt-based sealcoat composition reflect the weight of the composition just prior to application (e.g., ready-to-use). In some embodiments, the disclosed weights and/or weight ranges of the asphalt-based sealcoat composition reflect the weight of the composition prior to dilution (e.g., during manufacturing). In some embodiments, the weight is determined by the components included in the asphalt-based sealcoat composition (e.g., higher $TiO_2$ loadings result in proportionally higher densities). Advantageously, asphalt-based sealcoat compositions having higher weights can exhibit enhanced characteristics, including improved quality of application and sealcoat performance.

In some embodiments, as described below, the preparation comprises diluting the titanium oxide asphalt-based sealcoat composition after mixing the components together. In some embodiments, the preparation comprises diluting the titanium oxide asphalt-based sealcoat composition prior to application (e.g., to treat an asphalt surface).

VII. Method of Treating Asphalt Surface with an Asphalt-Based Sealcoat Composition In yet another aspect, the present disclosure relates to a method for treating an asphalt surface, the method comprising applying an amount of an asphalt-based sealcoat composition (e.g., any of the asphalt-based sealcoat compositions disclosed herein) to an upper surface of the asphalt surface. In some embodiments, the asphalt-based sealcoat composition is diluted with 1% to 50% additional water at the time of application. In some embodiments, the asphalt-based sealcoat composition is diluted with 10% to 30% additional water at the time of application. In some embodiments, the asphalt-based sealcoat composition is diluted with 15% to 25% additional water at the time of application. In some embodiments, the asphalt-based sealcoat composition is diluted with about 20% additional water at the time of application.

In some embodiments, the method comprises adding colorant to the asphalt-based sealcoat composition at the time of application.

An example method for application comprises using a first aliquot of an uncolored, titanium oxide asphalt-based sealcoat composition to treat a first portion of an asphalt surface, combining a second aliquot of the sealcoat composition with a desired colorant, and using the colored second aliquot of the sealcoat composition to treat a different, second portion of the asphalt surface.

Another example method for application comprises obtaining a plurality of aliquots of the uncolored, titanium oxide asphalt-based sealcoat composition and, for each respective aliquot in the plurality of aliquots, combining the respective aliquot with a different respective colorant. Each respective colored aliquot of the sealcoat composition can be used to treat a different portion of an asphalt surface (e.g., where a plurality of colors is desired in the final application).

In some embodiments, the method comprises treating any asphalt surface, including roads, sidewalks, playgrounds, parks, parking lots, driveways, recreational facilities, outdoor facilities, residential areas, schools, bike paths, shade structures, roofing, and LEED-certified building projects. In some embodiments, the method comprises treating an asphalt surface for any purpose, including recreational uses (e.g., tennis courts, basketball courts, running tracks, walking trails, biking paths, etc.), road markings (e.g., delineation of bike lanes, shoulders, lane lines, intersections, etc.), signage (e.g., handicapped parking, loading zones, pedestrian crossings, fire lanes, etc.), and/or aesthetic applications (e.g., driveways, courtyards, playgrounds, etc.).

In some embodiments, the method comprises applying an amount of a colored asphalt-based sealcoat composition (e.g., any of the asphalt-based sealcoat compositions disclosed herein) to an asphalt surface that has undergone wear (e.g., cracking, discoloration, elongation, fracture, and/or general failure). The use of the asphalt-based sealcoat compositions disclosed herein is not limited to any specific purpose in any given context but can be used for any function in any context known in the art in which paving is used. Moreover, the use of color is not limited to any specific purpose in any given context but can be used for any function in any context known in the art in which paving is used.

Additional embodiments for asphalt-based sealcoat compositions, methods of preparing and applying the same, and accompanying characteristics with respect to reflectivity values and reduction of pollutants are contemplated, as further described in International Application No. PCT/US2018/066431, filed 19 Dec. 2018, and U.S. Provisional Patent Application No. 62/608,881, filed 21 Dec. 2017, each of which is hereby incorporated herein by reference in its entirety.

EXAMPLES

The following Examples illustrate the synthesis of representative compounds used in the invention and the following Reference Examples illustrate the synthesis of intermediates in their preparation. These examples are not intended, nor are they to be construed, as limiting the scope of the invention. It will be clear that the invention may be practiced otherwise than as particularly described herein. Numerous modifications and variations of the invention are possible in view of the teachings herein and, therefore, are within the scope of the invention.

In the examples below, unless otherwise indicated, all temperatures are set forth in degrees Celsius and all parts and percentages are by weight. Reagents may be purchased from commercial suppliers and may be used without further purification unless otherwise indicated. Reagents may also be prepared following standard literature procedures known to those skilled in the art. Solvents may be purchased from commercial suppliers and may be used as received unless otherwise indicated. All solvents may be purified using standard methods known to those skilled in the art, unless otherwise indicated.

Starting materials used were either available from commercial sources or prepared according to literature procedures and had experimental data in accordance with those reported.

Example 1—Preparation of Asphalt-Based Sealcoat Compositions in Accordance with the Present Disclosure Coolseal—UP 7814. A batch of titanium dioxide pigmented asphalt emulsion entitled batch "Coolseal UP 7814" was prepared by forming 37,010 pounds of a slurry in a vertical high sheer mixer. The slurry consisted of 3,532 gallons of water, 1,588 pounds of fiber, and 6,004 pounds of clay. A total of 12,390 pounds (1,332 gallons) of this slurry was then used as a starting point to make the titanium dioxide pigmented asphalt emulsion. To the 12,390 pounds of slurry was added 17,139 pounds of $TiO_2$ and 3,545 pounds of sand. After thorough mixing, 11,568 pounds (1,389 gallons) of oil (CSS), 3,184 pounds (375 gallons) of latex, 943 pounds (118 gallons) of polymer emulsion (UP7814), and 1,479 pounds (178 gallons) of additional water were added, resulting in a batch of 50,248 pounds of titanium dioxide pigmented asphalt emulsion. The composition of the batch by weight was about 22.59 percent water, 1.06 percent fiber, 4.01 percent clay, 34.18 percent $TiO_2$, 7.07 percent sand, 23.07 percent oil (CSS), 6.35 percent latex, and 1.88 percent polymer emulsion (UP7814).

Rose Paving. A batch of titanium dioxide pigmented asphalt emulsion entitled batch "Rose Paving" was prepared by forming 37,008 pounds of a slurry in a vertical high sheer mixer. The slurry consisted of 3,531 gallons of water, 1,588 pounds of fiber, and 6,003 pounds of clay. A total of 12,638 pounds (1,359 gallons) of this slurry was then used as a starting point to make the titanium dioxide pigmented asphalt emulsion. To the 12,638 pounds of slurry was added 16,339 pounds of $TiO_2$ and 5,125 pounds of sand. After thorough mixing, 11,469 pounds (1,377 gallons) of oil (CSS), 3,576 pounds (421 gallons) of latex (Etonis 142), and 1,003 pounds (120 gallons) of additional water were added, resulting in a batch of 50,150 pounds of titanium dioxide pigmented asphalt emulsion. The composition of the batch by weight was 22.03 percent water, 1.08 percent fiber, 4.09 percent clay, 32.58 percent $TiO_2$, 10.22 percent sand, 22.87 percent oil (CSS), and 7.13 percent latex (Etonis 142).

Batch GT-102. A batch of titanium dioxide pigmented asphalt emulsion entitled batch "GT-102" was prepared by forming 37,008 pounds of a slurry in a vertical high sheer mixer. The slurry consisted of 3,531 gallons of water, 1,588 pounds of fiber, and 6,003 pounds of clay. A total of 1,890 pounds (203 gallons) of this slurry was then used as a starting point to make the titanium dioxide pigmented asphalt emulsion. To the 1,890 pounds of slurry was added 2,444 pounds of $TiO_2$ and 767 pounds of sand. After thorough mixing, 1,715 pounds (206 gallons) of oil (CSS), 535 pounds (63 gallons) of latex (Etonis 142), and 150 pounds (18 gallons) of additional water were added, resulting in a batch of 7,500 pounds of titanium dioxide pigmented asphalt emulsion. The composition of the batch by weight was 22.03 percent water, 1.08 percent fiber, 4.09 percent clay, 32.58 percent $TiO_2$, 10.22 percent sand, 22.87 percent oil (CSS), and 7.13 percent latex (Etonis 142).

Batch Coolseal 2. A batch of titanium dioxide pigmented asphalt emulsion entitled batch "Coolseal 2" was prepared by forming 37,014 pounds of a slurry in a vertical high sheer mixer. The slurry consisted of 3,765 gallons of water, 751 pounds of fiber, and 4,893 pounds of clay (sepiolite). A total of 12,081 pounds (1,299 gallons) of this slurry was then used as a starting point to make the titanium dioxide pigmented asphalt emulsion. To the 12,081 pounds of slurry was added 17,206 pounds of $TiO_2$ and 3546 pounds of sand. After thorough mixing, 11,775 pounds (1,414 gallons) of oil (CSS), 3,867 pounds of latex (Etonis 142), and 1,535 pounds (184 gallons) of additional water were added, resulting in a batch of 50,010 pounds of titanium dioxide pigmented asphalt emulsion. The composition of the batch by weight was about 23.47 percent water, 0.49 percent fiber, 3.18 percent clay, 34.31 percent $TiO_2$, 7.07 percent sand, 23.48 percent oil (CSS), and 7.71 percent latex (Etonis 142).

Color-Base Coolseal—LA Unified. A batch of titanium dioxide pigmented asphalt emulsion for use in colored titanium dioxide asphalt compositions entitled batch "LA Unified" was prepared by forming 11,178 pounds of a slurry in a vertical high sheer mixer. The slurry consisted of 1,082 gallons of water, 324 pounds of fiber, 541 pounds of sepiolite, and 1,299 pounds of clay. A total of 9,732 pounds (1,046 gallons) of this slurry was then used as a starting point to make the titanium dioxide pigmented asphalt emulsion. To the 9,732 pounds of slurry was added 12,121 pounds of $TiO_2$, 3,205 pounds of aggregate (Vical), and 1,347 pounds of filler (Omya UF). After thorough mixing, 9,457 pounds (1,135 gallons) of 60 grade oil (860), 3,283 pounds (369 gallons) of acrylic copolymer emulsion, 3,283 pounds (361 gallons) of vinyl acrylic emulsion, and 1,177 pounds (141 gallons) of additional water were added, resulting in a batch of 43,604 pounds of titanium dioxide pigmented asphalt emulsion. The composition of the batch by weight was about 20.7 percent water, 0.65 percent fiber, 3.67 percent clay, 27.8 percent $TiO_2$, 3.09 percent filler, 7.35 percent aggregate, 21.69 percent oil (860), and 15 percent polymer emulsion. 43,600 pounds of the batch composition were then mixed with 8.72 pounds of dispersant (AMP-95), 699.91 pounds of plasticizer (Celanese PLX), and an additional 3,052 pounds of water, resulting in a final batch of 47,360.63 pounds of titanium dioxide pigmented asphalt emulsion. The emissivity of the final batch composition was 0.92 and the solar reflective index was 45. The base composition was used to prepare colored titanium dioxide asphalt-based sealcoat compositions using addition of pigments, including a blue organic pigment (e.g., copper phthalocyanine, color index PB15.3), a blue inorganic pigment (e.g., cobalt aluminate blue spineal, color index PB28), a green organic pigment (e.g., phthalocyanine green, color index PG7), and a black inorganic pigment (e.g., color index PBR29) for grey.

Example 2—Preparation of Colored Asphalt-Based Sealcoat Compositions

FIG. 1 provides examples of pigmented titanium dioxide asphalt-based sealcoat compositions obtained by the addition of pigments to an unpigmented color-base titanium dioxide asphalt-based sealcoat composition, using blue organic pigment (e.g., copper phthalocyanine, color index PB15.3) (102), blue inorganic pigment (e.g., cobalt aluminate blue spineal, color index PB28) (106), green organic pigment (e.g., phthalocyanine green, color index PG7) (104), and black inorganic pigment (e.g., chrome iron brown hematite, color index PBR29, showing as grey) (108), in accordance with some embodiments of the present disclosure. Unpigmented titanium dioxide asphalt-based sealcoat is illustrated by the cream-colored sample in the center (110).

FIGS. 2A, 2B, 2C, and 2D provide examples of colored titanium dioxide asphalt-based sealcoat compositions obtained using various loadings of titanium dioxide and pigment in an unpigmented asphalt-based sealcoat composition. Each palette depicted in FIGS. 2A-2D is a 3×4 grid containing different amounts of titanium dioxide and a respective pigment, as indicated by Table 2 below. Sealcoat compositions were prepared with 80-100% $TiO_2$ loading (increasing amounts from left to right) and 1-10% pigment added on the initial weight of the unpigmented asphalt-based sealcoat composition (increasing amounts from top to bottom).

TABLE 2

Titanium Dioxide and Pigment Loadings for Sample Compositions

| | 80% $TiO_2$ | 90% $TiO_2$ | 100% $TiO_2$ |
|---|---|---|---|
| 1% | | | |
| 2.5% | | | |
| 5% | | | |
| 10% | | | |

Figure 2B:
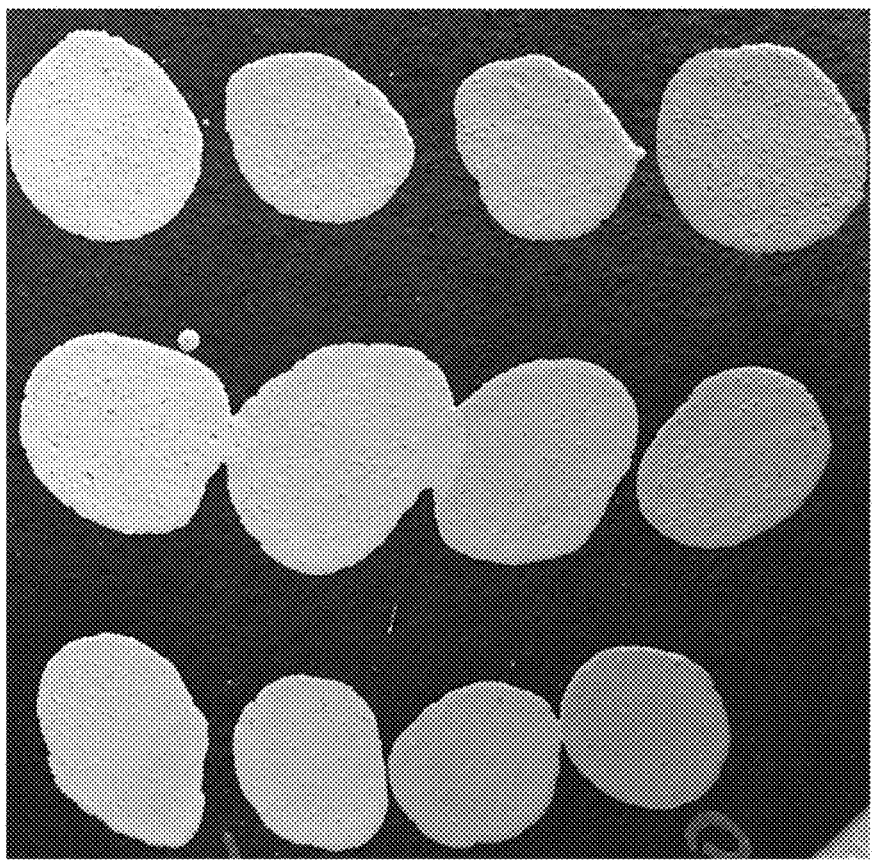
FIGS. 2A, 2B, 2C, and 2D illustrate example pigmented titanium dioxide asphalt-based sealcoat compositions using varying levels of titanium dioxide and pigments in blue (e.g., PB15.3), IR reflective black (e.g., PBR29), red (e.g., PR202), and green (e.g., PG7), in accordance with some embodiments of the present disclosure.
Figure 2A:
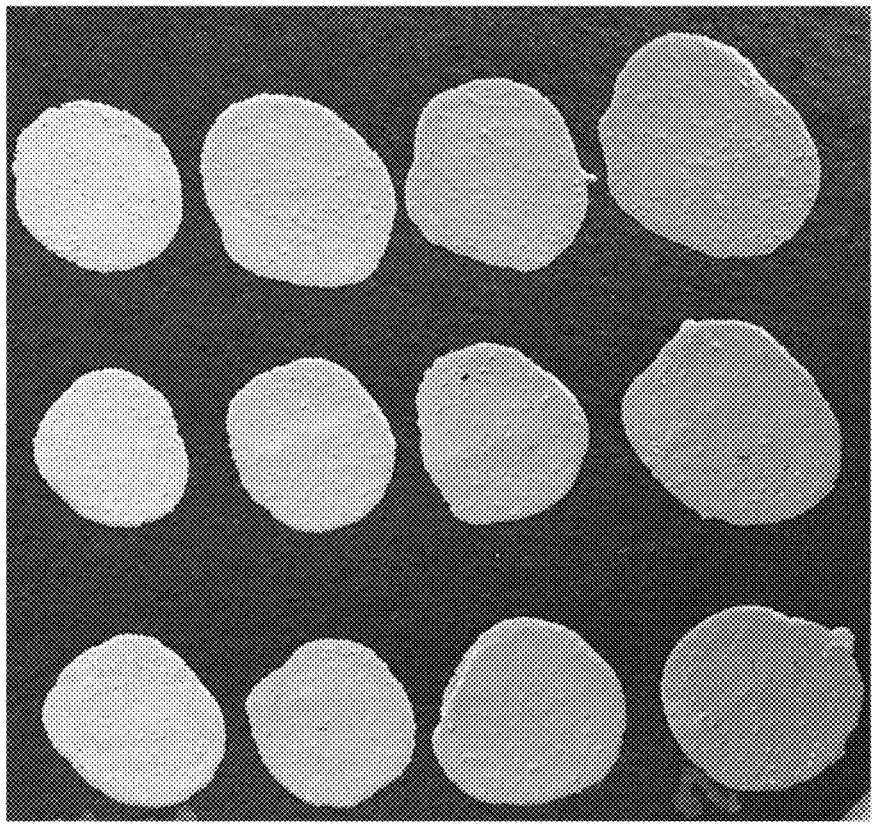
Figure 2D:
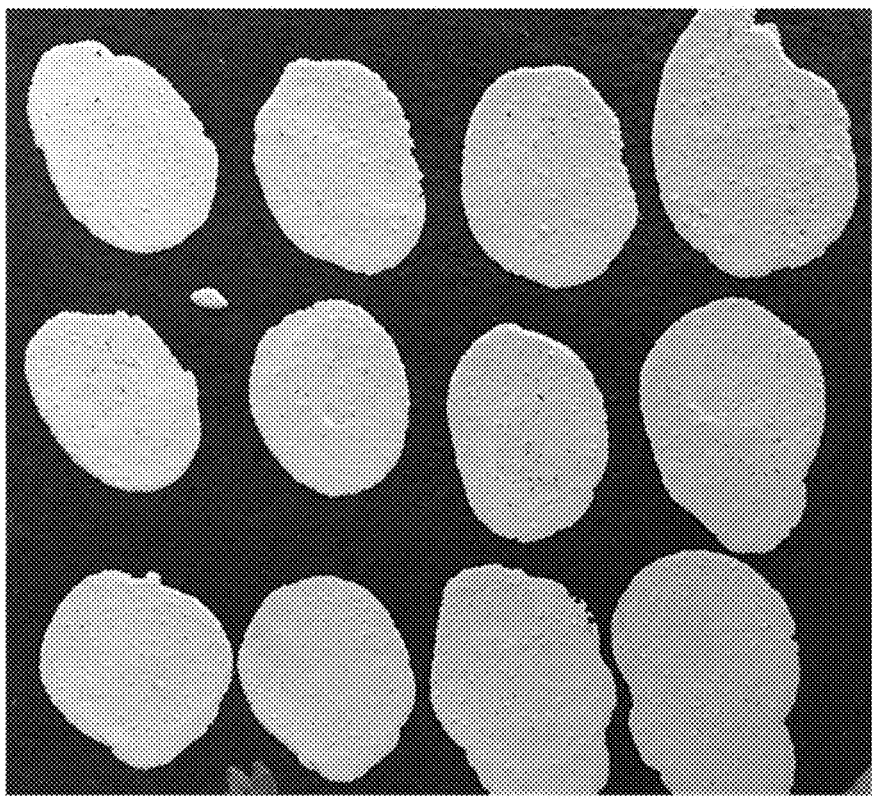
Figure 2C:
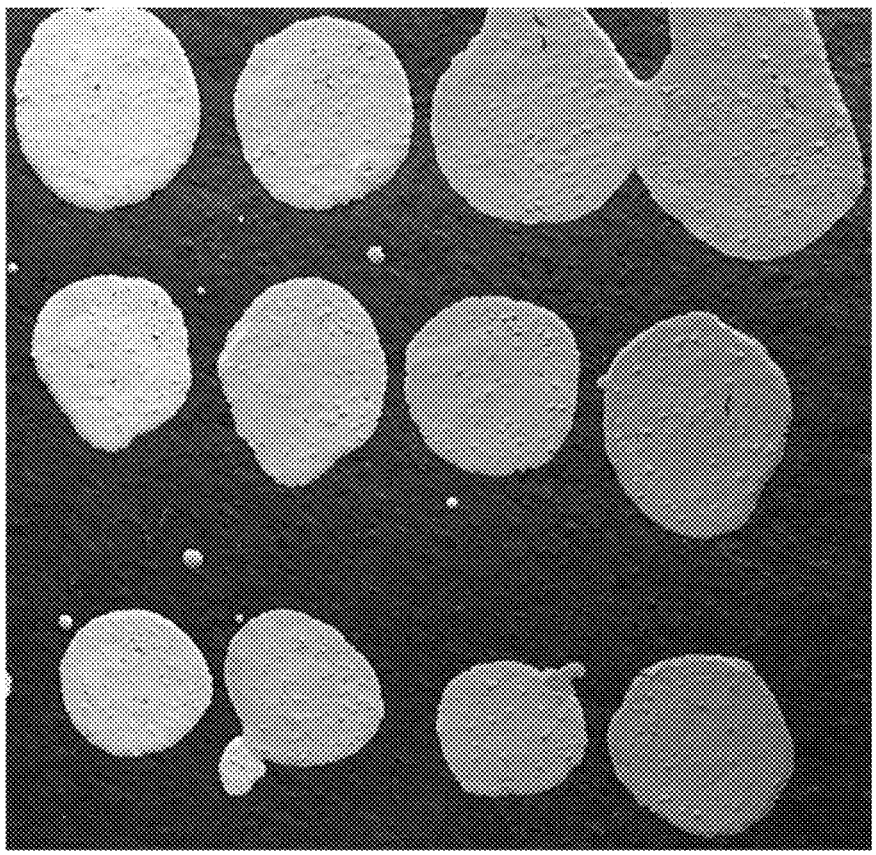

FIGS. 2A-2D illustrate a variety of tints and shades obtained for four example colors (blue, black, red, and green). In particular, higher amounts by weight of a respective pigment in the final pigmented composition can be used to increase the intensity or saturation of the respective color. For example, varying shades were obtained using from 1% to 10% by weight of a blue organic pigment (e.g., copper phthalocyanine, color index PB15.3) (FIG. 2A), an IR reflective black inorganic pigment (e.g., chrome iron brown hematite, color index PBR29) (FIG. 2B), a red pigment (e.g., color index PR202) (FIG. 2C), and a green organic pigment (e.g., phthalocyanine green, color index PG7) (FIG. 2D). For each respective color, all shades corresponding to each combination of titanium dioxide and pigment loadings had an SRI above 34, thus satisfying the minimum LEED certification requirements of SRI 33.

Example 3—Anti-Skid Properties of Asphalt Compositions in Accordance with the Present Disclosure An asphalt-based sealcoat composition was prepared in accordance with an embodiment of the present disclosure and applied to a residential paved surface. A Locked Wheel Skid Test (LWST) was performed in accordance with ASTM E27406, using modified testing speeds that were lower than those used for standard highway tests to account for the lower speeds used on residential pavements. Skid number (SN40R) outputs from the LWST exceeded 30 with a target above 35, which equated to a dynamic friction test (DFT) value of at least 0.45. Accordingly, the asphalt-based sealcoat composition was deemed to meet and surpass requirements for pavement maintenance applications within the testing region (Los Angeles).

CLAUSES

Clause 1. An asphalt-based sealcoat composition comprising an asphalt emulsion, water, an extender, a polymer, clay, a colorant, and a plurality of titanium oxide (TiO2) particles present in an amount of about 10% to about 60% by weight.

Clause 2. The composition of clause 1, wherein the titanium oxide ($TiO_2$) particles are present in an amount of from about 21% to about 60% by weight.

Clause 3. The composition of clause 1 or clause 2, wherein the $TiO_2$ particles are present in an amount of from about 25% to about 50% by weight.

Clause 4. The composition of any one of clauses 1-3, wherein the $TiO_2$ particles are present in an amount of from about 25% to about 40% by weight.

Clause 5. The composition of any one of clauses 1-4, wherein the $TiO_2$ particles are present in an amount of from about 25% to about 30% by weight.

Clause 6. The composition of any one of clauses 1-5, wherein the $TiO_2$ particles are present in an amount of about 26% to about 28% by weight.

Clause 7. The composition of any one of clauses 1-6, wherein the $TiO_2$ particles are doped.

Clause 8. The composition of any one of clauses 1-7, wherein the doped $TiO_2$ particles are modified with sulfur, vanadium, zinc, silver, aluminum, copper, iron, manganese, nickel, chromium, tin, barium, strontium, magnesium, cobalt, and/or nitrogen.

Clause 9. The composition of any one of clauses 1-8, wherein the asphalt emulsion is present in an amount of from about 5% to about 40% by weight.

Clause 10. The composition of any one of clauses 1-9, wherein the asphalt emulsion is present in an amount of from about 10% to about 35% by weight.

Clause 11. The composition of any one of clauses 1-10, wherein the asphalt emulsion present in an amount of from about 15% to about 30% by weight.

Clause 12. The composition of any one of clauses 1-11, wherein the asphalt emulsion is present in an amount of from about 15% to about 25% by weight.

Clause 13. The composition of any one of clauses 1-12, wherein the asphalt emulsion is present in an amount of from about 20% to about 24% by weight.

Clause 14. The composition of any one of clauses 1-13, wherein the asphalt emulsion is present in an amount of about 20.5 to about 22.5% by weight.

Clause 15. The composition of any one of clauses 1-14, wherein the asphalt emulsion is selected from the group consisting of CSS-1h, CSS-1, SS-1h, SS-1, and clay-based emulsions, and a mixture thereof.

Clause 16. The composition of any one of clauses 1-15, wherein the water is present in an amount of from about 15% to about 45% by weight.

Clause 17. The composition of any one of clauses 1-16, wherein the water is present in an amount of from about 18% to about 35% by weight.

Clause 18. The composition of any one of clauses 1-17, wherein the water is present in an amount of from about 20% to about 30% by weight Clause 19. The composition of any one of clauses 1-18, wherein the water is present in an amount of from about 20% to about 25% by weight.

Clause 20. The composition of any one of clauses 1-19, wherein the water is present in an amount of about 20.5% to about 23% by weight.

Clause 21. The composition of any one of clauses 1-20, wherein the polymer is present in an amount of from about 1% to about 35% by weight.

Clause 22. The composition of any one of clauses 1-21, wherein the polymer is present in an amount of from about 2% to about 30% by weight.

Clause 23. The composition of any one of clauses 1-22, wherein the polymer is present in an amount of from about 3% to about 25% by weight.

Clause 24. The composition of any one of clauses 1-23, wherein the polymer is present in an amount of from about 4% to about 20% by weight.

Clause 25. The composition of any one of clauses 1-24, wherein the polymer is present in an amount of from about 4.5% to about 16% by weight.

Clause 26. The composition of any one of clauses 1-25, wherein the polymer is present in an amount of from about 5% to about 10% by weight.

Clause 27. The composition of any one of clauses 1-26, wherein the polymer is present in an amount of from about 6% to about 8% by weight.

Clause 28. The composition of any one of clauses 1-27, wherein the polymer is present in an amount of about 6.5% to about 7.8% by weight.

Clause 29. The composition of any one of clauses 1-28, wherein the polymer is selected from the group consisting of acrylic copolymer, vinyl acrylic, acrylic latex, polyurethane, SBR (styrene-buladiene rubber), SBS (styrene-butadiene-styrene), polychloroprene, polyvinyl acetate, polyvinyl acetate ether, polyvinyl alcohols, parboxylic acid, synthetic Rubber, natural rubber, recycled tire rubber, LDP (low density polyethylene), EVA (ethylene vinyl acetate), nitrile latex, DuPont Elvaloy Polymer Modifier, and a mixture thereof.

Clause 30. The composition of any one of clauses 1-29, wherein the polymer emulsion comprises acrylic copolymer.

Clause 31. The composition of any one of clauses 1-30, wherein the polymer is a polymer emulsion.

Clause 32. The composition of any one of clauses 1-31, wherein the clay is present in an amount of from about 1% to about 10% by weight.

Clause 33. The composition of any one of clauses 1-32, wherein the clay is present in an amount of from about 2% to about 8% by weight.

Clause 34. The composition of any one of clauses 1-33, wherein the clay is present in an amount of from about 3% to about 6% by weight.

Clause 35. The composition of any one of clauses 1-34, wherein the clay is present in an amount of from about 4% to about 5% by weight.

Clause 36. The composition of any one of clauses 1-35, wherein the clay is present in an amount of from about 4% to about 4.5% by weight.

Clause 37. The composition of any one of clauses 1-36, wherein the clay is selected from the group consisting of bentonite clay, ball clay, fire clay, sepiolite clay, illite, montmorillonite, hawthorn clay, American colloid clay, hickory clay, Lincoln clay, and a mixture thereof.

Clause 38. The composition of any one of clauses 1-37, wherein the clay is sepiolite clay.

Clause 39. The composition of any one of clauses 1-38, further comprising sand present in an amount of about 5% to about 20% by weight.

Clause 40. The composition of clause 39, wherein the sand is present in an amount of from about 8% to about 15% by weight.

Clause 41. The composition of clause 39 or clause 40, wherein the sand is present in an amount of from about 9% to about 12% by weight.

Clause 42. The composition of any one of clauses 39-41, wherein the sand is present in an amount of from about 10% to about 11.5% by weight.

Clause 43. The composition of any one of clauses 39-42, wherein the sand has a particle size mesh from about 16 to about 300.

Clause 44. The composition of any one of clauses 39-43, wherein the sand has a particle size mesh from about 30 to about 280.

Clause 45. The composition of any one of clauses 39-44, wherein the sand has a particle size mesh from about 60 to about 260.

Clause 46. The composition of any one of clauses 39-45, wherein the sand has a particle size mesh from about 80 to about 240.

Clause 47. The composition of any one of clauses 39-46, wherein the sand has a particle size mesh from about 100 to about 220.

Clause 48. The composition of any one of clauses 39-47, wherein the sand has a particle size mesh of about 200.

Clause 49. The composition of any one of clauses 1-48, wherein the extender is present in an amount of from about 0.5% to about 15% by weight.

Clause 50. The composition of any one of clauses 1-49, wherein the extender is present in an amount of from about 1% to about 10% by weight.

Clause 51. The composition of any one of clauses 1-50, wherein the extender is present in an amount of from about 2% to about 8% by weight.

Clause 52. The composition of any one of clauses 1-51, wherein the extender is present in an amount of from about 2.5% to about 5% by weight.

Clause 53. The composition of any one of clauses 1-52, wherein the extender is present in an amount of from about 3% to about 4% by weight.

Clause 54. The composition of any one of clauses 1-53, wherein the extender is selected from the group consisting of marble white, granulated calcium carbonate, kaolin, and kaolinite, imerys talcs, Grace SYLOWHITE™, Burgess Pigment Company kaolins, and any mixture thereof.

Clause 55. The composition of any one of clauses 1-54, wherein the extender is granulated calcium carbonate.

Clause 56. The composition of any one of clauses 1-55, further comprising fiber present in an amount of from about 0.1% to about 5% by weight.

Clause 57. The composition of clause 56, wherein the fiber is present in an amount of from about 0.3% to about 3% by weight.

Clause 58. The composition of clause 56 or clause 57, wherein the fiber is present in an amount of from about 0.5% to about 2% by weight.

Clause 59. The composition of any one of clauses 56-58, wherein the fiber is present in an amount of from about 0.5% to about 1% by weight.

Clause 60. The composition of any one of clauses 56-59, wherein the fiber is obtained from recycled materials.

Clause 61. The composition of any one of clauses 56-60, wherein the fiber is recycled paper.

Clause 62. The composition of any one of clauses 1-61, further comprising an aggregate present in an amount of from about 0.1% to about 25% by weight.

Clause 63. The composition of clause 62, wherein the aggregate is present in an amount of from about 0.5% to about 20% by weight.

Clause 64. The composition of clause 62 or clause 63, wherein the aggregate is present in an amount of from about 0.9% to about 15% by weight.

Clause 65. The composition of any one of clauses 62-64, wherein the aggregate is present in an amount of from about 6% to about 8% by weight.

Clause 66. The composition of any one of clauses 62-65, wherein the aggregate is selected from the group consisting of slate, baghouse fines (rock dust), fly ash, silica sand, calcium carbonite, clay, paper fiber, fiberglass fiber, limestone aggregate, copper slag, recycled roofing shingles, granite aggregate, ground tire rubber, ground up tennis balls, recycled cardboard, recycled glass, wood chips, wood fiber, scrabbled stone, pumice, basaltic aggregate, perlite, vermiculite, marble white, calcinated bauxite, and any combination thereof.

Clause 67. The composition of any one of clauses 62-66, wherein the aggregate is limestone aggregate.

Clause 68. The composition of any one of clauses 1-67, further comprising biocide.

Clause 69. The composition of clause 68, wherein the biocide is present in an amount of from about 0.01% to about 5% by weight.

Clause 70. The composition of clause 68 or clause 69, wherein the biocide is present in an amount of from about 0.1% to about 2% by weight.

Clause 71. The composition of any one of clauses 68-70, wherein the biocide is present in an amount of from about 0.2% to about 0.6% by weight.

Clause 72. The composition of any one of clauses 1-71, comprising an asphalt emulsion in an amount of from about 20.5% to about 22.5% by weight, water in the amount of from about 20.5% to about 23% by weight, clay in an amount of from about 4% to about 4.5% by weight, fiber in an amount of from about 0.5% to about 1% by weight, polymer emulsion in an amount of from about 12% to about 16% by weight, an extender in an amount of from about 3% to about 4% by weight, an aggregate in an amount of from about 6% to about 8% by weight, and TiO2 in an amount of between about 25% and 30% by weight, wherein the clay comprises sepiolite clay, the polymer emulsion comprises acrylic copolymer, the extender comprises granulated calcium carbonate, and the aggregate comprises limestone aggregate.

Clause 73. The composition of any one of clauses 1-72, wherein the colorant is present in an amount of from about 0.001% to about 50% by weight.

Clause 74. The composition of any one of clauses 1-73, wherein the colorant is present in an amount of from about 0.001% to about 1% by weight.

Clause 75. The composition of any one of clauses 1-74, wherein the colorant is present in an amount of from about 0.01% to about 0.5% by weight.

Clause 76. The composition of any one of clauses 1-75, wherein the colorant is selected from the group consisting of pigment, paint, ink, dye, and powder.

Clause 77. The composition of any one of clauses 1-76, wherein the colorant is organic or inorganic.

Clause 78. The composition of any one of clauses 1-77, wherein the composition has a color selected from the group consisting of red, orange, yellow, green, blue, violet, brown, black, and white.

Clause 79. The composition of any one of clauses 1-78, wherein the composition is red.

Clause 80. The composition of clause 79, wherein the composition has a Pantone color selected from the group consisting of Pantone 169-Pantone 171, Pantone 176-Pantone 227, Pantone 483-Pantone 485, Pantone 490-Pantone 510, Pantone 670-Pantone 680, Pantone 691-Pantone 711, Pantone 805-Pantone 806, Pantone 1765-Pantone 1955, Pantone 2365-Pantone 2385, Pantone 4985-Pantone 5035, and RAL 3000-RAL 3033.

Clause 81. The composition of any one of clauses 1-78, wherein the composition is orange.

Clause 82. The composition of clause 81, wherein the composition has a Pantone color selected from the group consisting of Pantone 148-Pantone 154, Pantone 156-Pantone 168, Pantone 172-Pantone 175, Pantone 470-Pantone 475, Pantone 486-Pantone 489, Pantone 712-Pantone 721, Pantone 804, Pantone 811, Pantone 1205-Pantone 1685, and RAL 2000-RAL 2013.

Clause 83. The composition of any one of clauses 1-78, wherein the composition is yellow.

Clause 84. The composition of clause 83, wherein the composition has a Pantone color selected from the group consisting of Pantone 100-Pantone 147, Pantone 155, Pantone 379-Pantone 380, Pantone 386-Pantone 388, Pantone 393-Pantone 399, Pantone 454-Pantone 461, Pantone 585-Pantone 620, Pantone 803, Pantone 809-Pantone 810, Pantone 3935-Pantone 3985, and RAL 1000-RAL 1037.

Clause 85. The composition of any one of clauses 1-78, wherein the composition is green.

Clause 86. The composition of clause 85, wherein the composition has a Pantone color selected from the group consisting of Pantone 315-Pantone 316, Pantone 321-Pantone 324, Pantone 327-Pantone 378, Pantone 381-Pantone 385, Pantone 389-Pantone 392, Pantone 553-Pantone 584, Pantone 621-Pantone 627, Pantone 802, Pantone 3385-Pantone 3435, Pantone 5463-Pantone 5747, Pantone 7478-Pantone 7498, and RAL 6000-RAL 6038.

Clause 87. The composition of any one of clauses 1-78, wherein the composition is blue.

Clause 88. The composition of clause 87, wherein the composition has a Pantone color selected from the group consisting of Pantone 277-Pantone 314, Pantone 317-Pantone 320, Pantone 325-Pantone 326, Pantone 532-Pantone 552, Pantone 628-Pantone 662, Pantone 801, Pantone 808, Pantone 2702-Pantone 2708, Pantone 2717-Pantone 2718, Pantone 2727-Pantone 2728, Pantone 2747-Pantone 2748, Pantone 2757-Pantone 2758, Pantone 2767-Pantone 2768, Pantone 2905-Pantone 3165, Pantone 3242-Pantone 3278, Pantone 5395-Pantone 5435, Pantone 7453-Pantone 7477, Pantone 7541-Pantone 7547, and RAL 5000-RAL 5026.

Clause 89. The composition of any one of clauses 1-78, wherein the composition is purple.

Clause 90. The composition of clause 89, wherein the composition has a Pantone color selected from the group consisting of Pantone 228-Pantone 275, Pantone 511-Pantone 531, Pantone 663-Pantone 669, Pantone 681-Pantone 690, Pantone 807, Pantone 813-Pantone 814, Pantone 2395-Pantone 2695, Pantone 2715, Pantone 2725, Pantone 2735-Pantone 2746, Pantone 5115-Pantone 5315, and RAL 4001-RAL 4012.

Clause 91. The composition of any one of clauses 1-77, wherein the composition has a color selected from the group consisting of color index PW7, PBR29, PB28, PY74, PY184, P073, PR254, PV23, PR101, PR112, P036, PB15.6, PB15.3, PG7, PY138, PY154, PY110, PR168, PR122, PY42, PG17, and PBk11.

Clause 92. The composition of any one of clauses 1-77, wherein the composition is grey.

Clause 93. The composition of any one of clauses 1-92, further comprising a dispersant present in an amount of about 0.01% to about 10% by weight.

Clause 94. The composition of clause 93, wherein the dispersant is present in an amount of from about 0.05% to about 3% by weight.

Clause 95. The composition of clause 93 or clause 94, wherein the dispersant is present in an amount of from about 0.09% to about 1% by weight.

Clause 96. The composition of any one of clauses 93-95, wherein the dispersant is present in an amount of from about 0.1% to about 0.5% by weight.

Clause 97. The composition of any one of clauses 93-96, wherein the dispersant is selected from the group consisting of polyacrylic acid, copolymers, polyurethanes, polyacrylates, star-shaped dispersing polymers, block copolymers, controlled free radical polymerization (CFRP), and amines.

Clause 98. The composition of any one of clauses 93-97, wherein the dispersant is 2-amino-2-methyl-1-propanol.

Clause 99. The composition of any one of clauses 1-98, further comprising a plasticizer present in an amount of about 0.1% to about 20% by weight.

Clause 100. The composition of clause 99, wherein the plasticizer is present in an amount of from about 0.5% to about 10% by weight.

Clause 101. The composition of clause 99 or clause 100, wherein the plasticizer is present in an amount of from about 1% to about 5% by weight.

Clause 102. The composition of any one of clauses 99-101, wherein the plasticizer is present in an amount of from about 1.2% to about 3% by weight.

Clause 103. The composition of any one of clauses 99-102, wherein the plasticizer is selected from the group consisting of low molecular weight ortho phthalates, high molecular weight ortho phthalates, trimellitates, adipates, sebacates, glycerol triacetate, alkyl citrates, azelates, dibenzoates, terephthalates, gluterates, organophosphates, polycarboxylate ether, polycarboxylate, sulfonated naphthalene condensate, and sulfonated melamine formaldehyde.

Clause 104. The composition of any one of clauses 99-103, wherein the plasticizer is a low volatile organic compound (VOC) plasticizer.

Clause 105. The composition of any one of clauses 1-104, wherein the asphalt-based sealcoat composition is highly solar reflective.

Clause 106. The composition of any one of clauses 1-105, wherein the asphalt-based sealcoat has a SR (Solar Reflectivity) #of at least about 0.10.

Clause 107. The composition of any one of clauses 1-106, wherein the asphalt-based sealcoat has a SR #of at least about 0.20.

Clause 108. The composition of any one of clauses 1-107, wherein the asphalt-based sealcoat has a SR #of at least about 0.30.

Clause 109. The composition of any one of clauses 1-108, wherein the asphalt-based sealcoat has a SR #of at least about 0.33.

Clause 110. The composition of any one of clauses 1-107, wherein the asphalt-based sealcoat has a SR #of from about 0.20 to about 0.60.

Clause 111. The composition of any one of clauses 1-110, wherein the asphalt-based sealcoat has an SRI (Solar Reflective Index) #of at least about 10.

Clause 112. The composition of any one of clauses 1-111, wherein the asphalt-based sealcoat has an SRI #of at least about 20.

Clause 113. The composition of any one of clauses 1-112, wherein the asphalt-based sealcoat has an SRI #of at least about 30.

Clause 114. The composition of any one of clauses 1-113, wherein the asphalt-based sealcoat has an SRI #of at least about 33.

Clause 115. The composition of any one of clauses 1-112, wherein the asphalt-based sealcoat has an SRI #from about 20 to about 60.

Clause 116. The composition of any one of clauses 1-115, wherein the asphalt-based sealcoat has an emissivity of at least about 0.70.

Clause 117. The composition of any one of clauses 1-116, wherein the asphalt-based sealcoat has an emissivity of at least about 0.80.

Clause 118. The composition of any one of clauses 1-117, wherein the asphalt-based sealcoat has an emissivity of at least about 0.90.

Clause 119. The composition of any one of clauses 1-118, wherein the asphalt-based sealcoat has an emissivity of at least about 0.92.

Clause 120. The composition of any one of clauses 1-116, wherein the asphalt-based sealcoat has an emissivity of from about 0.70 to about 0.99.

Clause 121. The composition of any one of clauses 1-120, wherein the asphalt-based sealcoat composition reduces surface temperatures of asphalt treated with the asphalt-based sealcoat composition compared to asphalt not treated with asphalt-based sealcoat composition.

Clause 122. The composition of any one of clauses 1-121, wherein the TiO2 particles comprise an anatase powder form of TiO2.

Clause 123. The composition of any one of clauses 1-121, wherein the TiO2 particles comprise a brookite powder form of TiO2.

Clause 124. The composition of any one of clauses 1-121, wherein the TiO2 particles comprise a rutile powder form of TiO2.

Clause 125. The composition of any one of clauses 1-124, wherein each respective TiO2 particle in the plurality of TiO2 particles comprises a modifier.

Clause 126. The composition of clause 125, wherein the modifier is an aluminum hydroxide coating.

Clause 127. The composition of any one of clauses 1-126, wherein each respective TiO2 particle in the plurality of TiO2 particles has a size of no more than 20 microns.

Clause 128. The composition of any one of clauses 1-127, wherein each respective TiO2 particle in the plurality of TiO2 particles has a size of no more than 10 microns.

Clause 129. The composition of any one of clauses 1-128, wherein each respective TiO2 particle in the plurality of TiO2 particles has a size of no more than 5 microns, no more than 1 micron, or no more than 0.1 microns.

Clause 130. The composition of any one of clauses 1-126, wherein each respective TiO2 particle in the plurality of TiO2 particles has a size of from 0.001 to 1 microns, from 1 to 5 microns, or from 5 to 10 microns.

Clause 131. The composition of any one of clauses 1-130, further comprising an asphalt reinforcement component.

Clause 132. The composition of clause 131, wherein the asphalt reinforcement component is selected from the group consisting of mineral asphaltenes, clarified asphalt, bio-based asphalt-like binders, bio-rejuvenators, and tire rubber modification.

Clause 133. The composition of any one of clauses 1-132, wherein the asphalt-based sealcoat composition reduces pollutants.

Clause 134. The composition of clause 133, wherein the asphalt-based sealcoat composition reduces atmospheric pollutants including an amount of nitrogen oxides (NOx) and volatile organic compounds (VOC) via photocatalytic reactions.

Clause 135. The composition of any one of clauses 1-134, wherein the asphalt-based sealcoat composition is highly solar reflective and reduces asphalt surface temperatures and pollutants.

Clause 136. The composition of any one of clauses 1-135, wherein the asphalt-based sealcoat composition has a SR (Solar Reflectivity) #of at least about 0.33 and reduces asphalt surface temperatures and pollutants.

Clause 137. The composition of any one of clauses 1-136, wherein the asphalt-based sealcoat has a skid number (SN40R) of at least about 25.

Clause 138. The composition of any one of clauses 1-137, wherein the asphalt-based sealcoat has an SN40R of at least about 30.

Clause 139. The composition of any one of clauses 1-138, wherein the asphalt-based sealcoat has an SN40R of at least about 35.

Clause 140. The composition of any one of clauses 1-139, wherein the asphalt-based sealcoat has a dynamic friction test (DFT) value of at least about 0.35.

Clause 141. The composition of any one of clauses 1-140, wherein the asphalt-based sealcoat has a DFT value of at least about 0.40.

Clause 142. The composition of any one of clauses 1-141, wherein the asphalt-based sealcoat has a DFT value of at least about 0.45.

Clause 143. The composition of any one of clauses 1-142, further comprising a dirt-resistance additive.

Clause 144. The composition of clause 143, wherein the dirt-resistance additive is selected from the group consisting of colloidal silica, methyl-o-benzoyl benzoate (MBB), silane, and epoxy-silane crosslinking additive.

Clause 145. The composition of any one of clauses 1-144, wherein the $TiO_2$ particles comprise visual and infrared-reflective $TiO_2$ particles.

Clause 146. The composition of any one of clauses 1-145, wherein the $TiO_2$ particles comprise photocatalytic $TiO_2$ particles.

Clause 147. The composition of any one of clauses 1-146, wherein the asphalt-based sealcoat composition is self-cleaning.

Clause 148. A method for treating an asphalt surface, the method comprising applying an amount of an asphalt-based sealcoat composition of any one of clauses 1-147 to an upper surface of the asphalt surface.

Clause 149. The method of clause 148, wherein at the time of application the asphalt-based sealcoat composition is diluted with 1% to 50% additional water.

Clause 150. The method of clause 148 or clause 149, wherein at the time of application the asphalt-based sealcoat composition is diluted with 10% to 30% additional water.

Clause 151. The method of any one of clauses 148-150, wherein at the time of application the asphalt-based sealcoat composition is diluted with 15% to 25% additional water.

Clause 152. The method of any one of clauses 148-151, wherein at the time of application the asphalt-based sealcoat composition is diluted with about 20% additional water.

Clause 153. The method of any one of clauses 148-152, wherein the colorant is added to the asphalt-based sealcoat composition at the time of application.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An asphalt-based sealcoat composition comprising an asphalt emulsion, water, an extender, a polymer, clay, a brown or black inorganic pigment present in an amount of from 0.001% to 50% by weight, and a plurality of titanium oxide ($TiO_2$) particles present in an amount of about 10% to about 60% by weight, wherein:
   (i) the brown or black inorganic pigment is infrared (IR) or near-infrared (NIR) reflective,
   (ii) the plurality of $TiO_2$ particles comprises visual and infrared-reflective $TiO_2$ particles having a first particle size of from 2 microns to 20 microns,
   (iii) the asphalt-based sealcoat composition is grey, and
   (iv) the asphalt-based sealcoat composition has a solar reflectivity number of at least 0.33 and a solar reflective index number of at least 33.

2. The composition of claim 1, wherein the $TiO_2$ particles are doped with one or more modifiers selected from the group consisting of sulfur, vanadium, zinc, silver, aluminum, copper, iron, manganese, nickel, chromium, tin, barium, strontium, magnesium, cobalt, boron, molybdenum, tungsten, phosphorus, platinum, gold, and nitrogen.

3. The composition of claim 1, wherein the asphalt emulsion is present in an amount of from about 5% to about 40% by weight, and wherein the asphalt emulsion is selected from the group consisting of CSS-1h, CSS-1, SS-1h, SS-1, CRS-2, a clay-based emulsion, and a mixture thereof.

4. The composition of claim 1, wherein the water is present in an amount of from about 15% to about 45% by weight, or from about 20% to about 30% by weight.

5. The composition of claim 1, wherein the polymer is present in an amount of from about 1% to about 35% by weight, and wherein the polymer is selected from the group consisting of acrylic copolymer, vinyl acrylic, acrylic latex, polyurethane, SBR (styrene-buladiene rubber), SBS (styrene-butadiene-styrene), polychloroprene, polyvinyl acetate, polyvinyl acetate ether, polyvinyl alcohols, parboxylic acid, synthetic Rubber, natural rubber, recycled tire rubber, LDP (low density polyethylene), EVA (ethylene vinyl acetate), nitrile latex, and a mixture thereof.

6. The composition of claim 1, wherein the clay is present in an amount of from about 1% to about 10% by weight, and wherein the clay is selected from the group consisting of bentonite clay, ball clay, fire clay, sepiolite clay, illite, montmorillonite, hawthorn clay, American colloid clay, hickory clay, Lincoln clay, and a mixture thereof.

7. The composition of claim 1, further comprising sand present in an amount of about 5% to about 20% by weight, wherein the sand has a particle size mesh from about 16 to about 300.

8. The composition of claim 1, wherein the extender is present in an amount of from about 0.5% to about 15% by weight, and wherein the extender is selected from the group consisting of marble white, granulated calcium carbonate, kaolin, and kaolinite, imerys talcs, sodium magnesium aluminum silicate, and any mixture thereof.

9. The composition of claim 1, further comprising fiber present in an amount of from about 0.1% to about 5% by weight, or from about 0.5% to about 2% by weight.

10. The composition of claim 1, further comprising an aggregate present in an amount of from about 0.1% to about 25% by weight, wherein the aggregate is selected from the group consisting of slate, baghouse fines (rock dust), fly ash, silica sand, calcium carbonite, clay, paper fiber, fiberglass fiber, limestone aggregate, copper slag, recycled roofing shingles, granite aggregate, ground tire rubber, ground up tennis balls, recycled cardboard, recycled glass, wood chips, wood fiber, scrabbled stone, pumice, basaltic aggregate, perlite, vermiculite, marble white, calcinated bauxite, and any combination thereof.

11. The composition of claim 1, further comprising biocide present in an amount of from about 0.01% to about 5% by weight, a dispersant present in an amount of from about 0.01% to about 10% by weight, and a plasticizer present in an amount of about 0.1% to about 20% by weight, wherein:
   the dispersant is selected from the group consisting of polyacrylic acid, copolymers, polyurethanes, polyacrylates, star-shaped dispersing polymers, block copolymers, and amines, and
   the plasticizer is selected from the group consisting of ortho phthalates, trimellitates, adipates, sebacates, glycerol triacetate, alkyl citrates, azelates, dibenzoates, terephthalates, gluterates, organophosphates, polycarboxylate ether, polycarboxylate, sulfonated naphthalene condensate, and sulfonated melamine formaldehyde.

12. The composition of claim 1, wherein the plurality of $TiO_2$ particles comprises $TiO_2$ particles selected from the group consisting of an anatase powder form of $TiO_2$, a brookite powder form of $TiO_2$, and a rutile powder form of $TiO_2$.

13. The composition of claim 1, wherein each respective $TiO_2$ particle in the plurality of $TiO_2$ particles comprises an aluminum hydroxide coating modifier, and wherein each respective TiO$_2$ particle in the plurality of TiO$_2$ particles has a size of from about 0.001 to about 1 microns, from about 0.5 to about 5 microns, or from about 5 to about 15 microns.

14. The composition of claim 1, further comprising:
an asphalt reinforcement component selected from the group consisting of mineral asphaltenes, clarified asphalt, bio-based asphalt-like binders, bio-rejuvenators, and tire rubber modification, and
a dirt-resistance additive selected from the group consisting of colloidal silica, methyl-o-benzoyl benzoate (MBB), silane, and epoxy-silane crosslinking additive.

15. The composition of claim 1, wherein the asphalt-based sealcoat composition reduces surface temperatures of asphalt treated with the asphalt-based sealcoat composition compared to asphalt not treated with asphalt-based sealcoat composition, and further reduces atmospheric pollutants including an amount of nitrogen oxides (NOx) and volatile organic compounds (VOC) via photocatalytic reactions.

16. The composition of claim 1, wherein the asphalt-based sealcoat has a skid number (SN40R) of at least about 25, and a dynamic friction test (DFT) value of at least about 0.35.

17. The composition of claim 1, wherein the plurality of TiO$_2$ particles further comprises photocatalytic TiO$_2$ particles having a second particle size of from about 1 nm to about 1000 nm.

18. A method for treating an asphalt surface, the method comprising:
applying an amount of the asphalt-based sealcoat composition of claim 1 to an upper surface of the asphalt surface, wherein, at the time of application, the asphalt-based sealcoat composition is diluted with 1% to 50% additional water.

19. The method of claim 18, wherein the brown or black inorganic pigment is added to the asphalt-based sealcoat composition at the time of application.

20. The composition of claim 1, wherein the brown or black inorganic pigment is present in an amount of from about 1% to about 10% by weight.

21. The composition of claim 1, wherein the brown or black inorganic pigment has a color index of PBR29.

22. The composition of claim 21, wherein the brown or black inorganic pigment comprises chrome iron brown hematite.

23. The composition of claim 17, wherein the first particle size of the visual and infrared-reflective TiO$_2$ particles has a first distribution with a first peak at about 10 microns, and the second particle size of the photocatalytic TiO$_2$ particles have a second distribution with a second peak at about 50 nm.

* * * * *